(12) United States Patent
Thompson et al.

(10) Patent No.: US 9,656,771 B2
(45) Date of Patent: May 23, 2017

(54) PACKAGING LOADER ASSEMBLY

(71) Applicant: Delkor Systems, Inc., St. Paul, MN (US)

(72) Inventors: Ronald Scott Thompson, Hugo, MN (US); Adam Mark Koller, Minneapolis, MN (US)

(73) Assignee: Delkor Systems, Inc., St. Paul, MN (US)

( * ) Notice: Subject to any disclaimer, the term of this patent is extended or adjusted under 35 U.S.C. 154(b) by 531 days.

(21) Appl. No.: 14/212,524

(22) Filed: Mar. 14, 2014

(65) Prior Publication Data

US 2014/0260113 A1 Sep. 18, 2014

Related U.S. Application Data

(60) Provisional application No. 61/852,174, filed on Mar. 15, 2013.

(51) Int. Cl.
| | |
|---|---|
| *B65B 5/10* | (2006.01) |
| *B65B 5/08* | (2006.01) |
| *B25J 15/00* | (2006.01) |
| *B65B 35/38* | (2006.01) |
| *B65B 35/58* | (2006.01) |

(52) U.S. Cl.
CPC ............. *B65B 5/08* (2013.01); *B25J 15/0061* (2013.01); *B65B 35/38* (2013.01); *B65B 35/58* (2013.01)

(58) Field of Classification Search
CPC .. B65B 5/00; B65B 5/08; B65B 35/00; B65B 35/36; B65B 35/38
USPC ............... 53/247, 473, 475, 313, 314, 331.5
See application file for complete search history.

(56) References Cited

U.S. PATENT DOCUMENTS

| | | | | |
|---|---|---|---|---|
| 3,694,993 | A * | 10/1972 | East ........................ | B65B 21/04 414/592 |
| 4,599,845 | A * | 7/1986 | Luoni ..................... | B65B 35/16 53/247 |
| 4,646,509 | A * | 3/1987 | Tribert .................... | B65B 19/34 53/236 |
| 4,765,119 | A * | 8/1988 | Aidlin .................... | B67B 3/2073 53/308 |
| 5,473,855 | A * | 12/1995 | Hidding ................ | B65B 7/2835 53/314 |
| 7,251,921 | B2 * | 8/2007 | Galimberti ................ | B67B 3/28 53/317 |

* cited by examiner

*Primary Examiner* — Gloria R Weeks
*Assistant Examiner* — William A Weller
(74) *Attorney, Agent, or Firm* — Beck Tysver Evans, PLLC

(57) ABSTRACT

A packaging loader for loading products into packaging has a conveyor, a collator, and a nesting assembly. The conveyor conveys products to the collator, where the products are collected and, subsequently, transferred to the nesting assembly. The nesting assembly rearranges at least some of the products for placement into the packaging. Once the products have been properly arranged by the nesting assembly, they are placed within the packaging. The process repeats, as desired, to arrange one or more layers of products within the packaging.

4 Claims, 65 Drawing Sheets

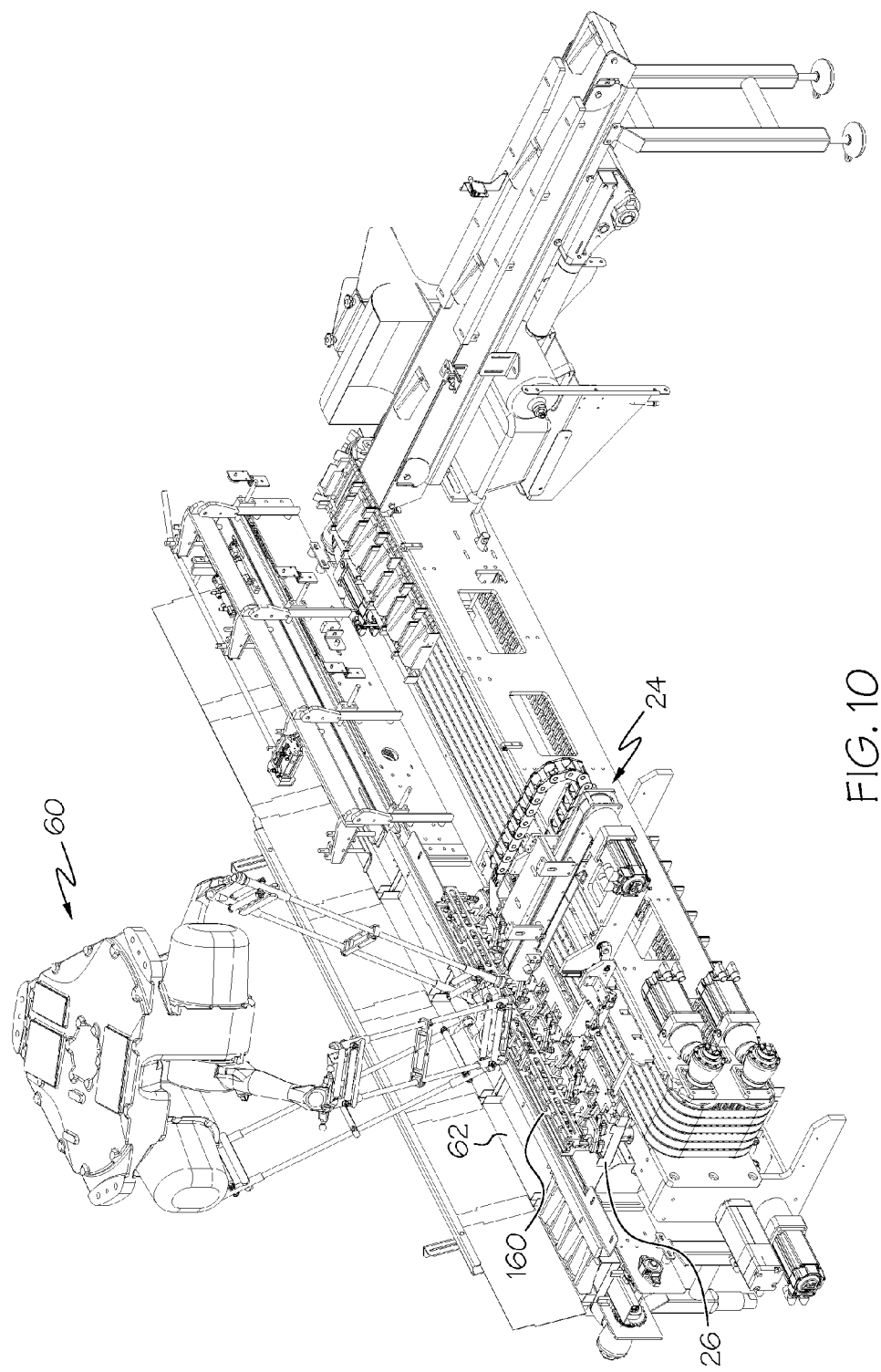

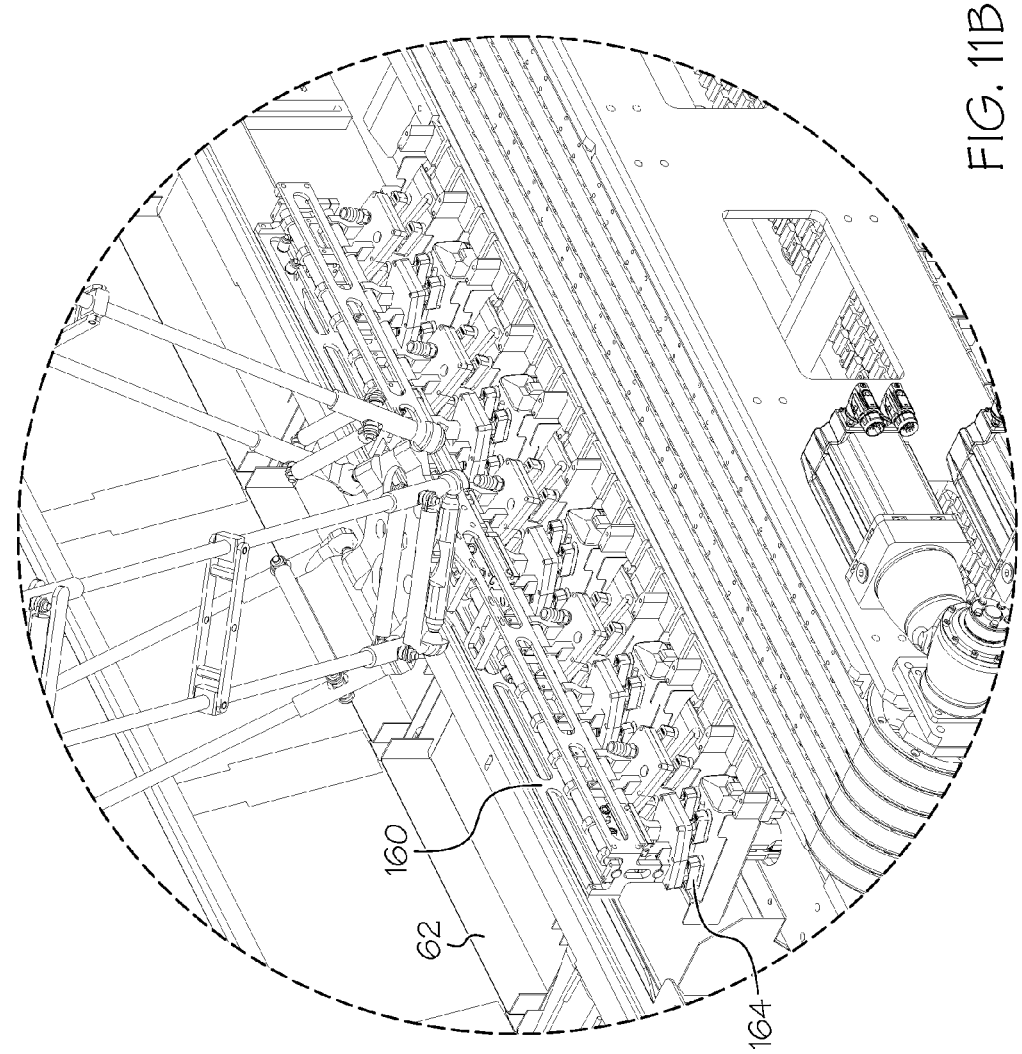

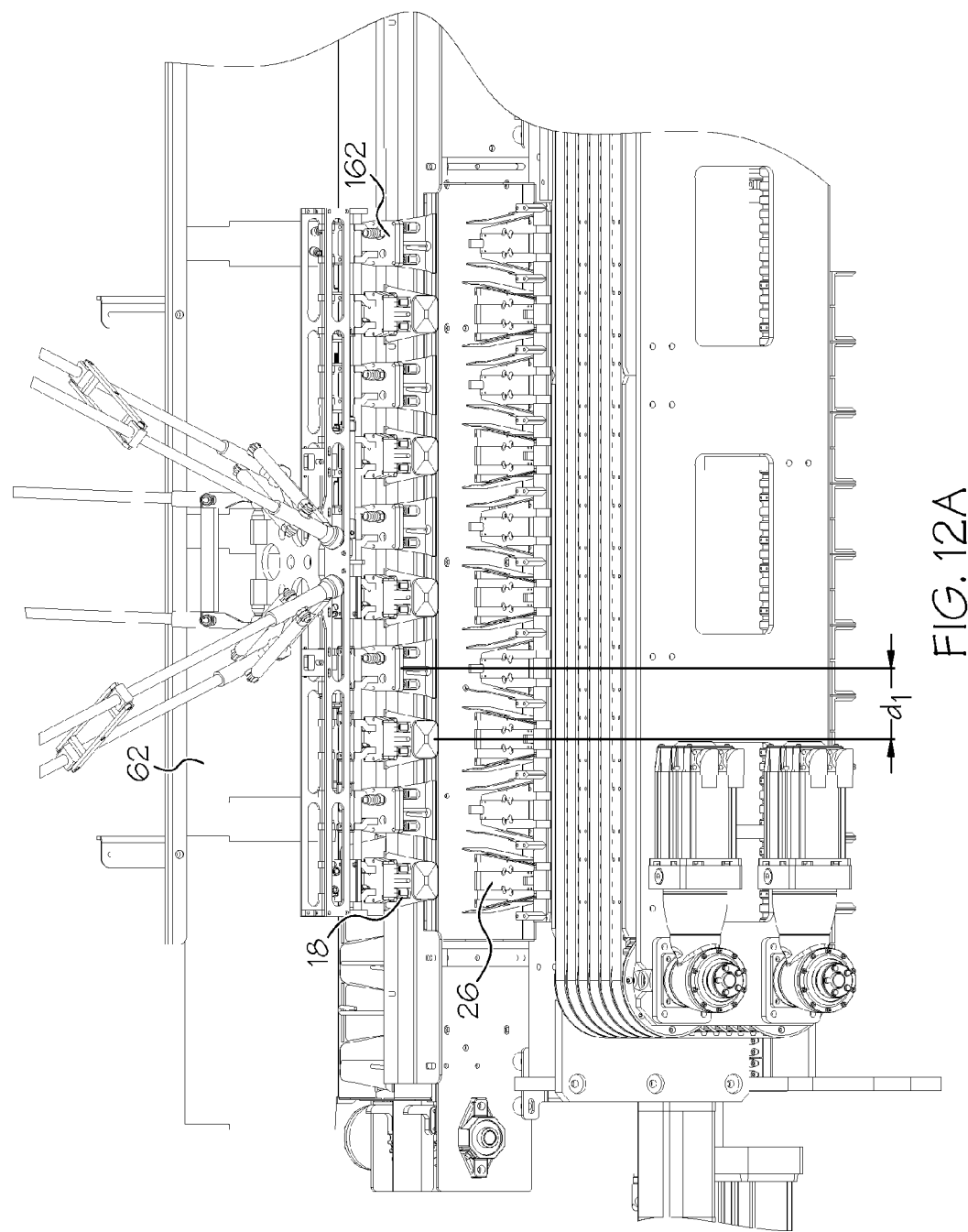

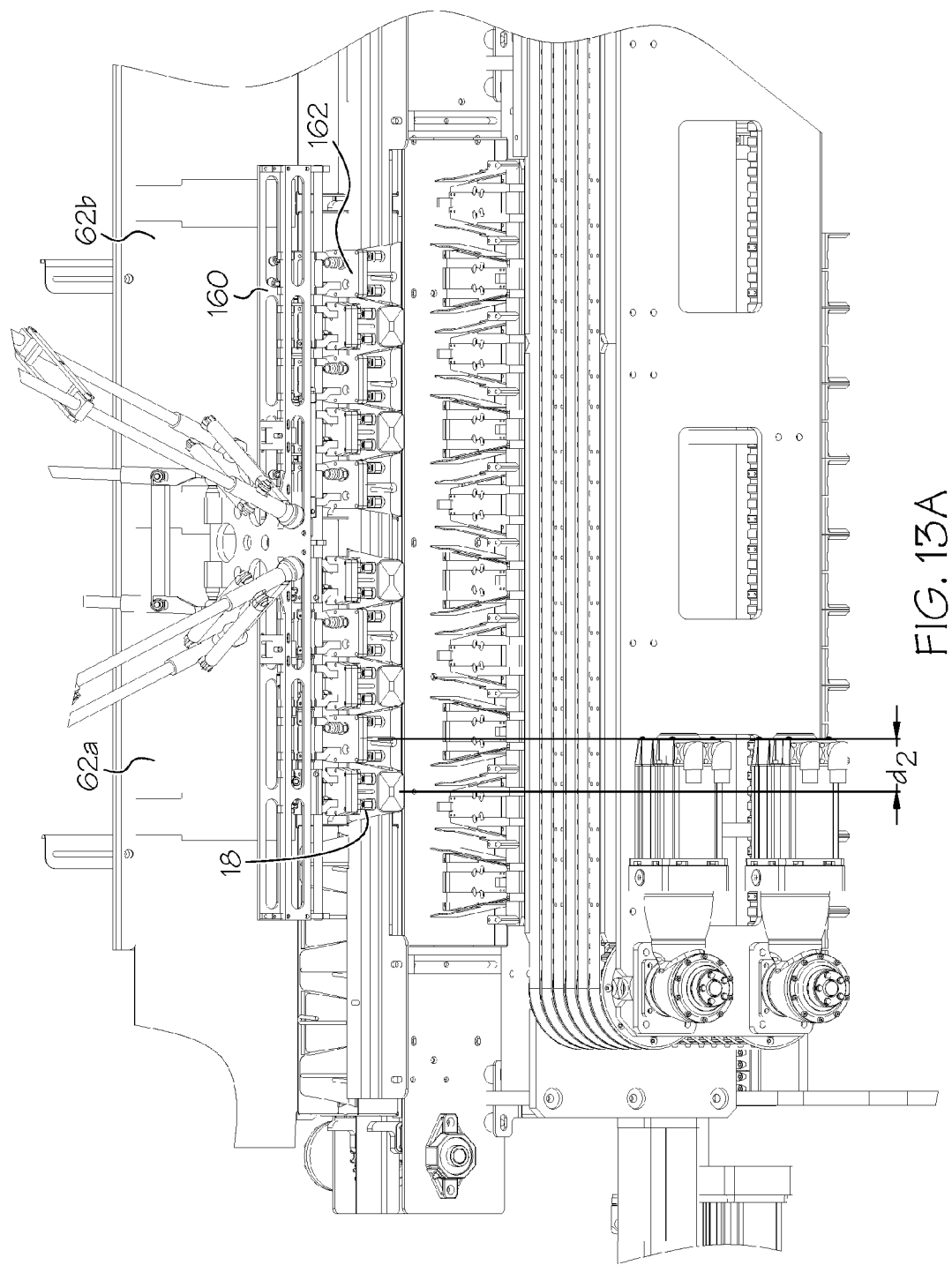

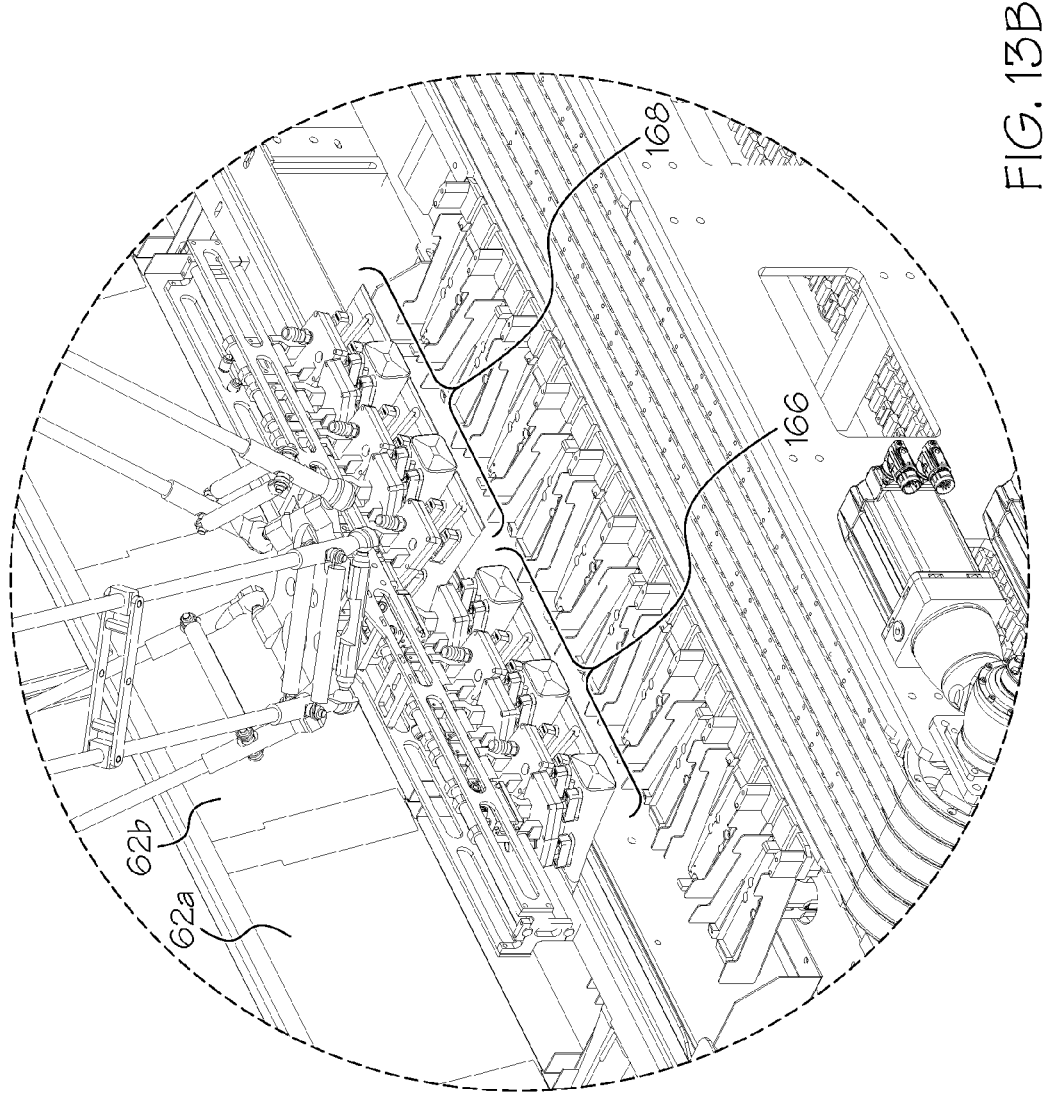

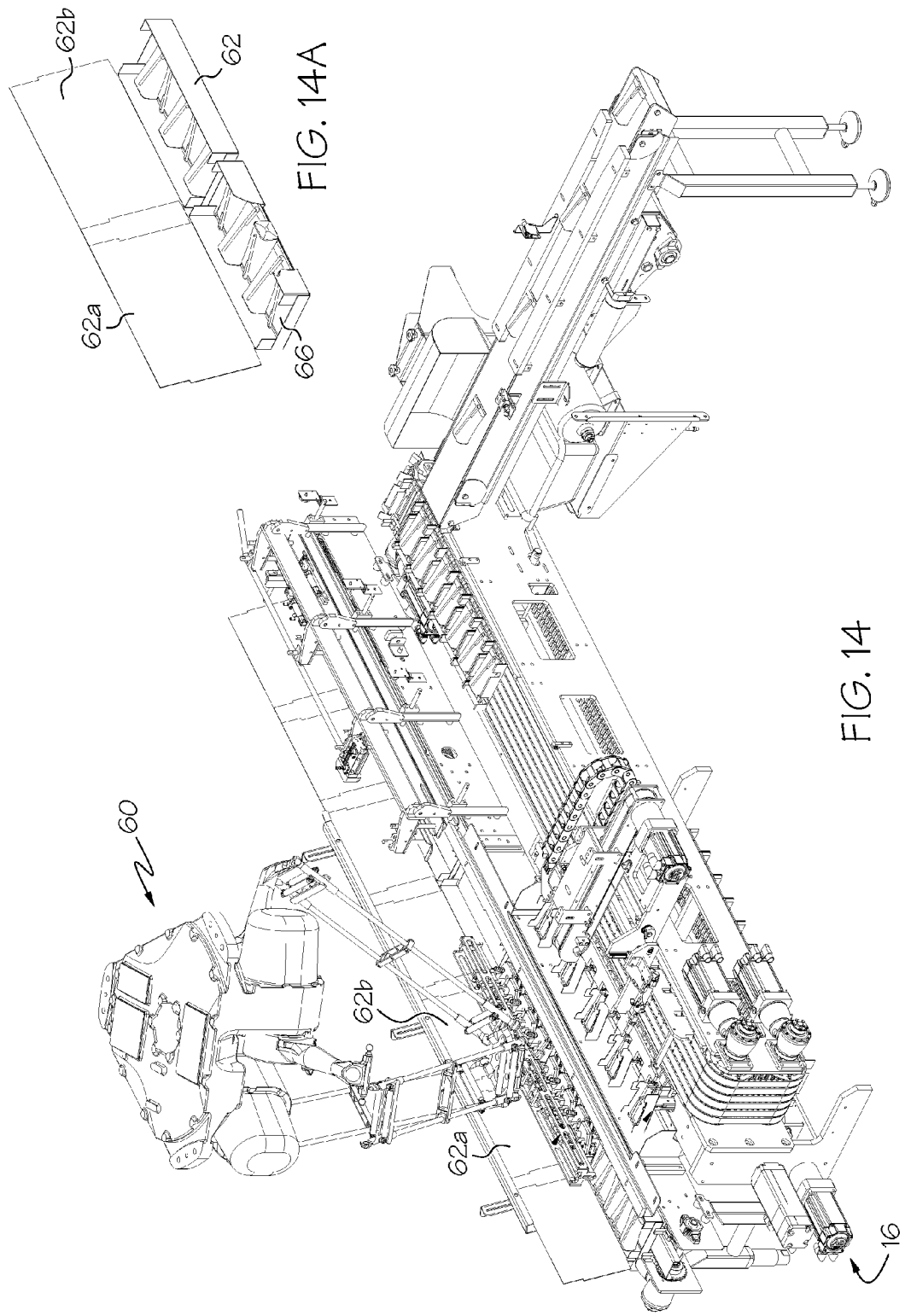

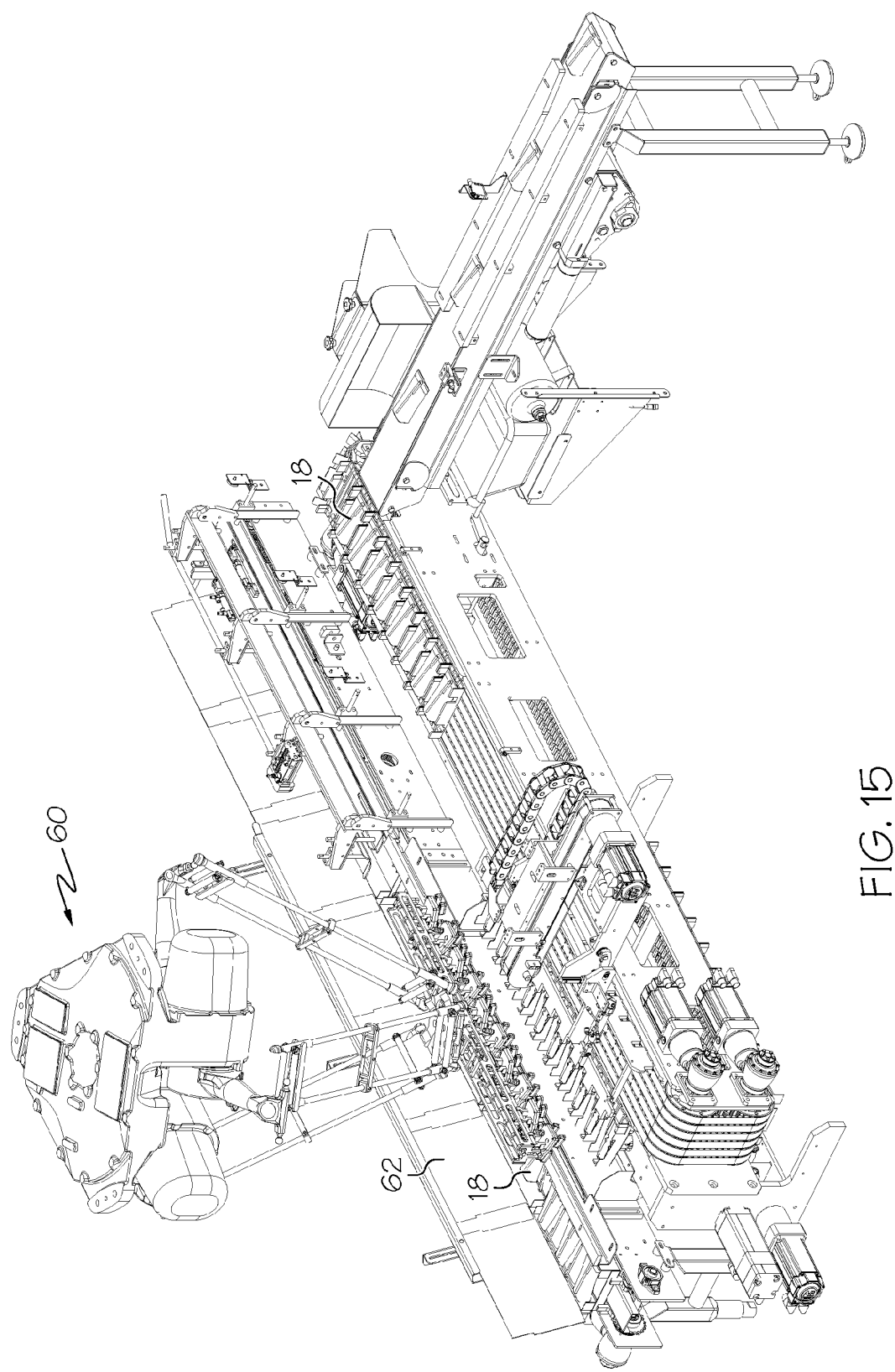

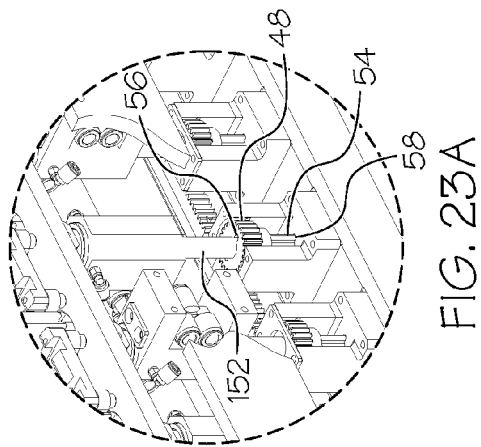
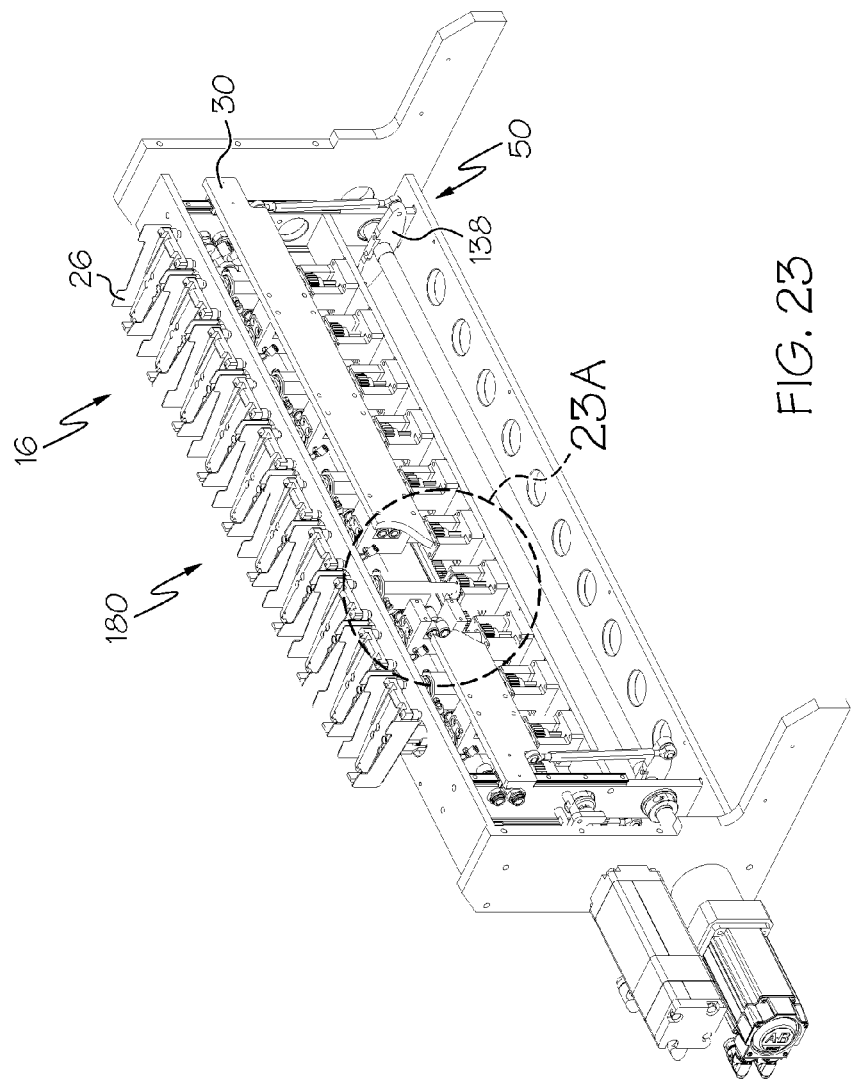

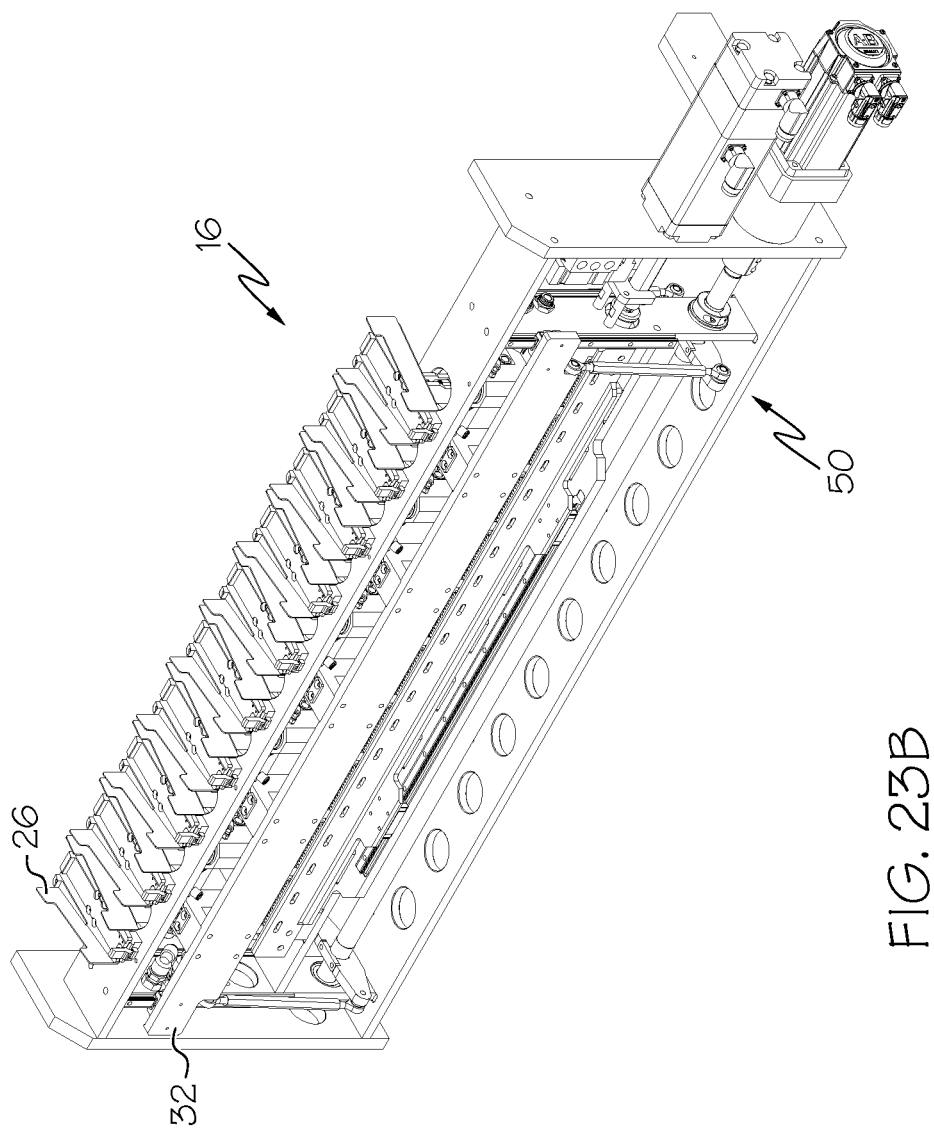

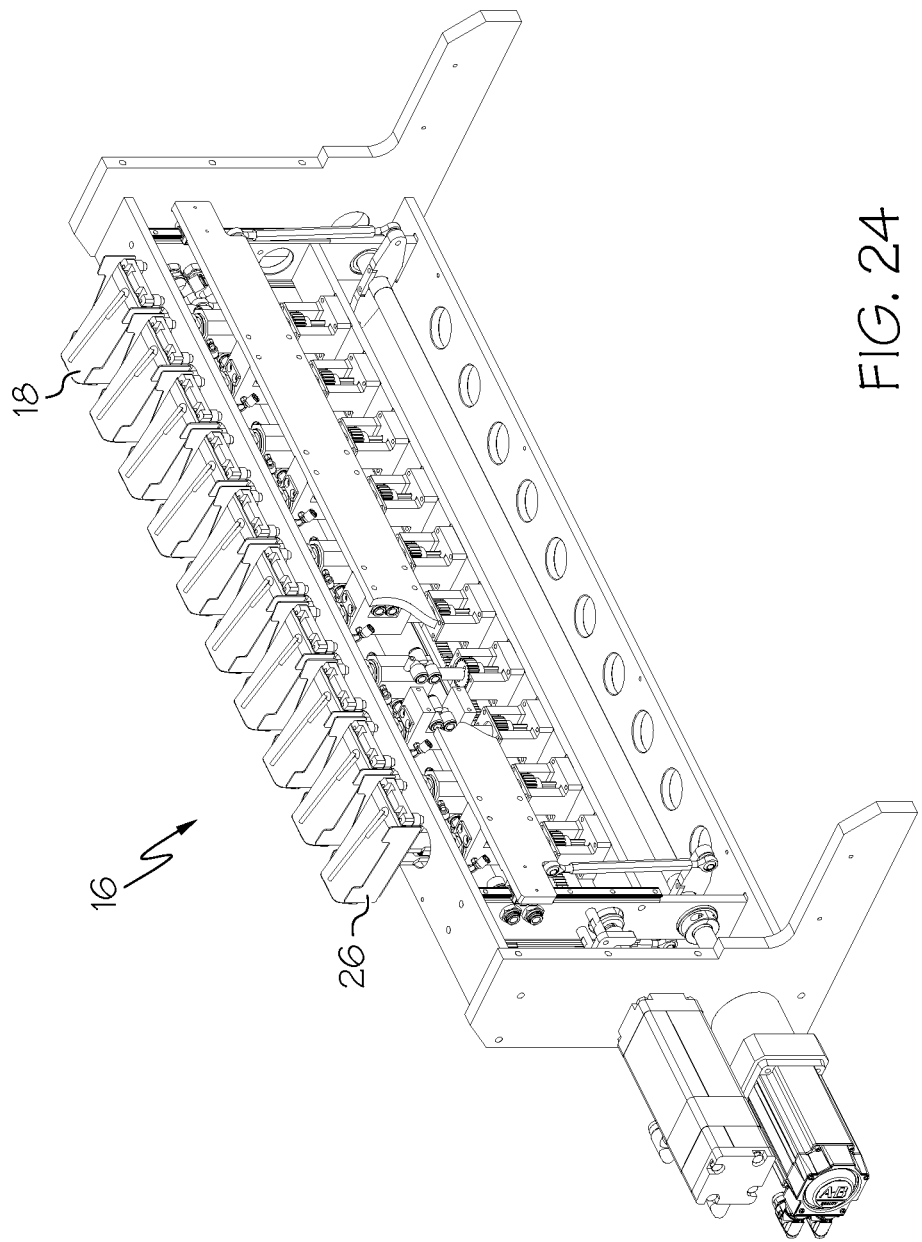

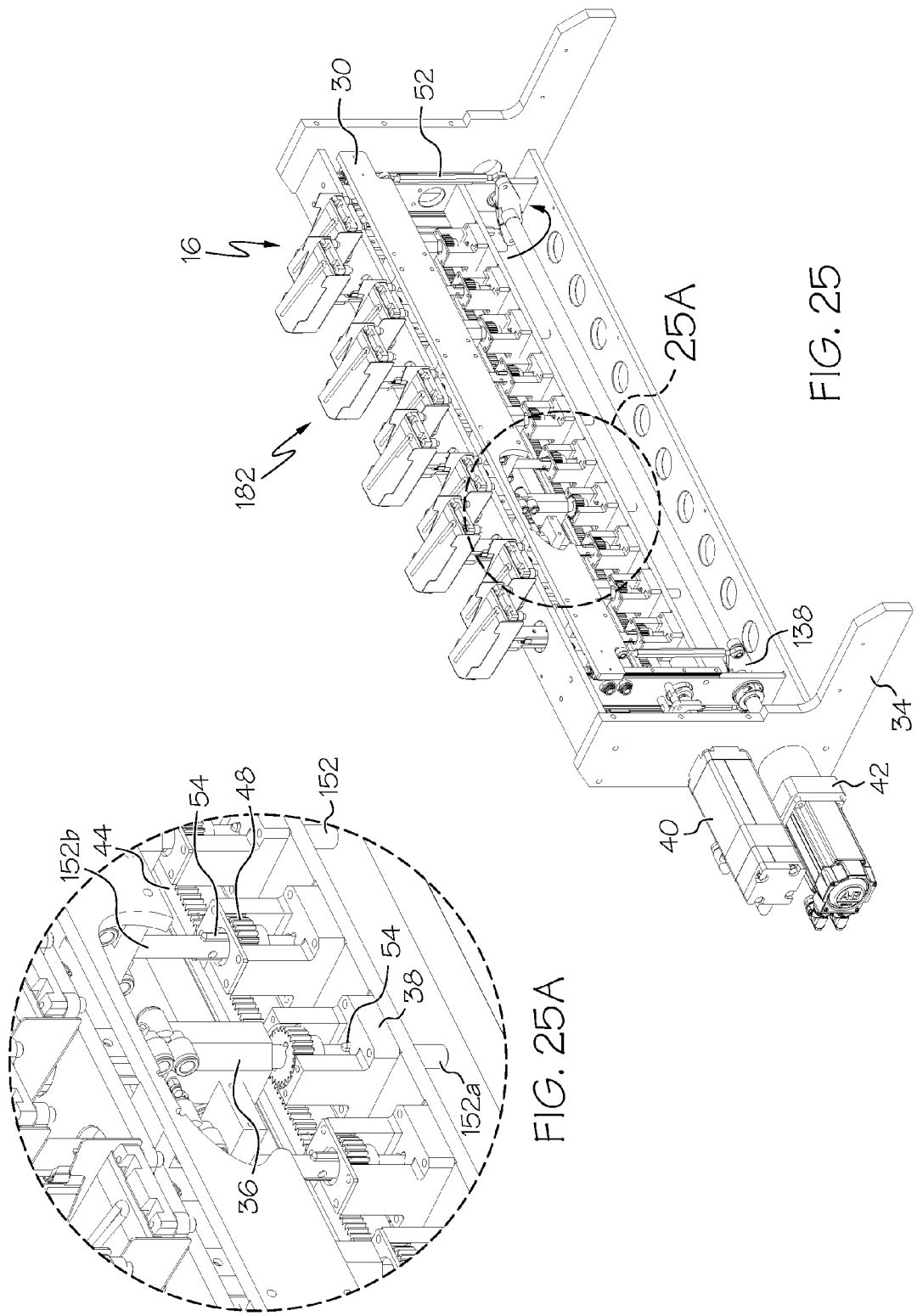

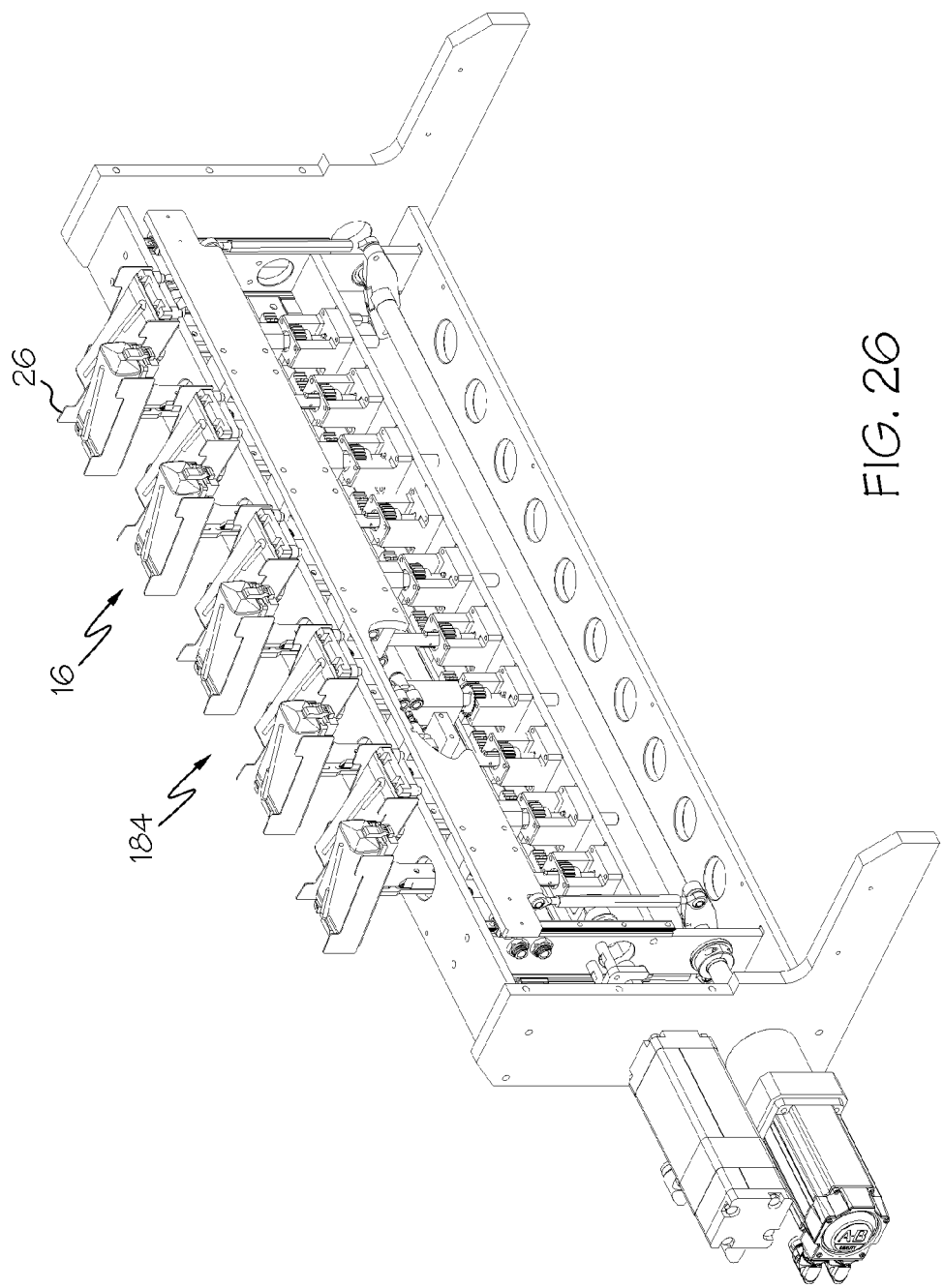

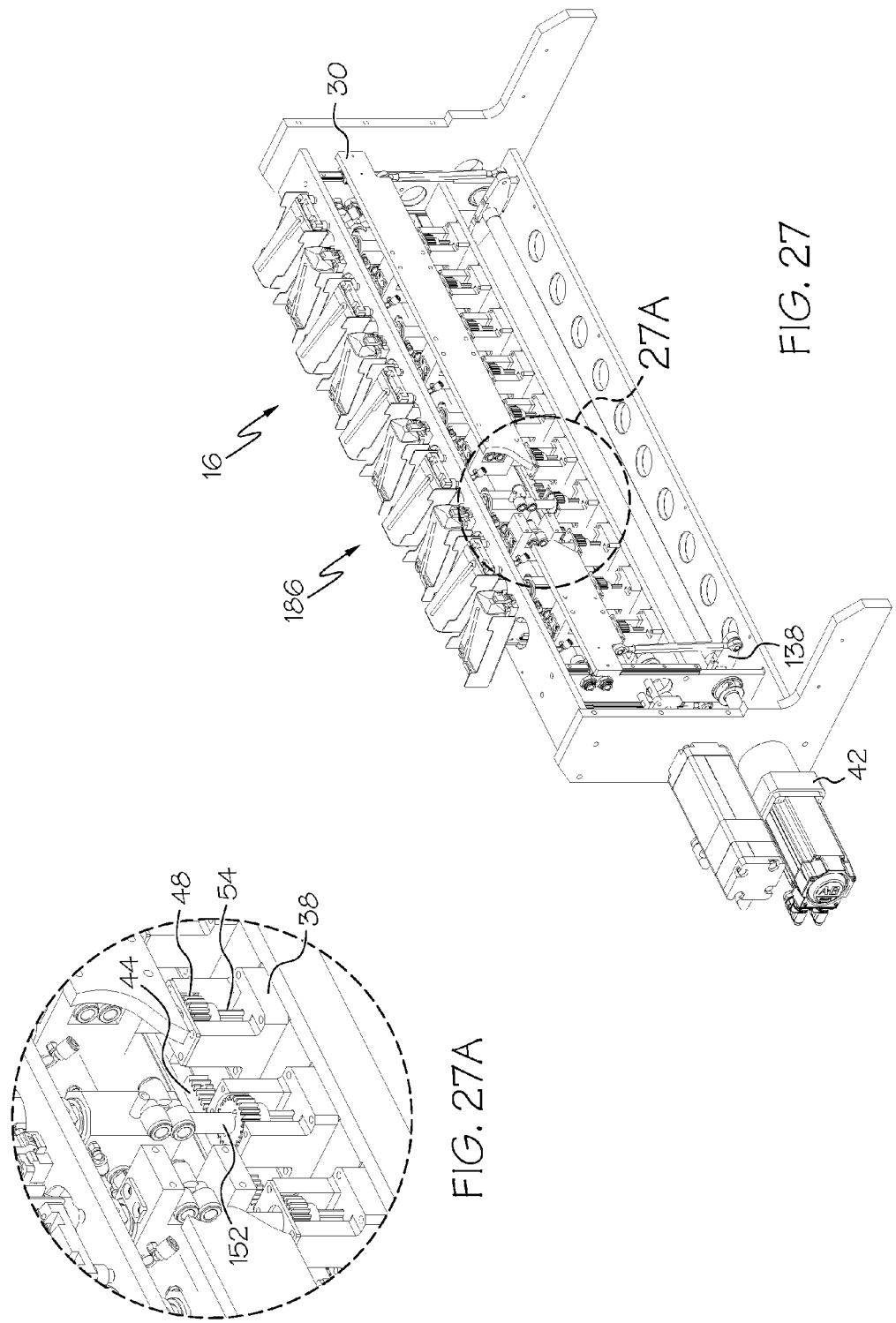

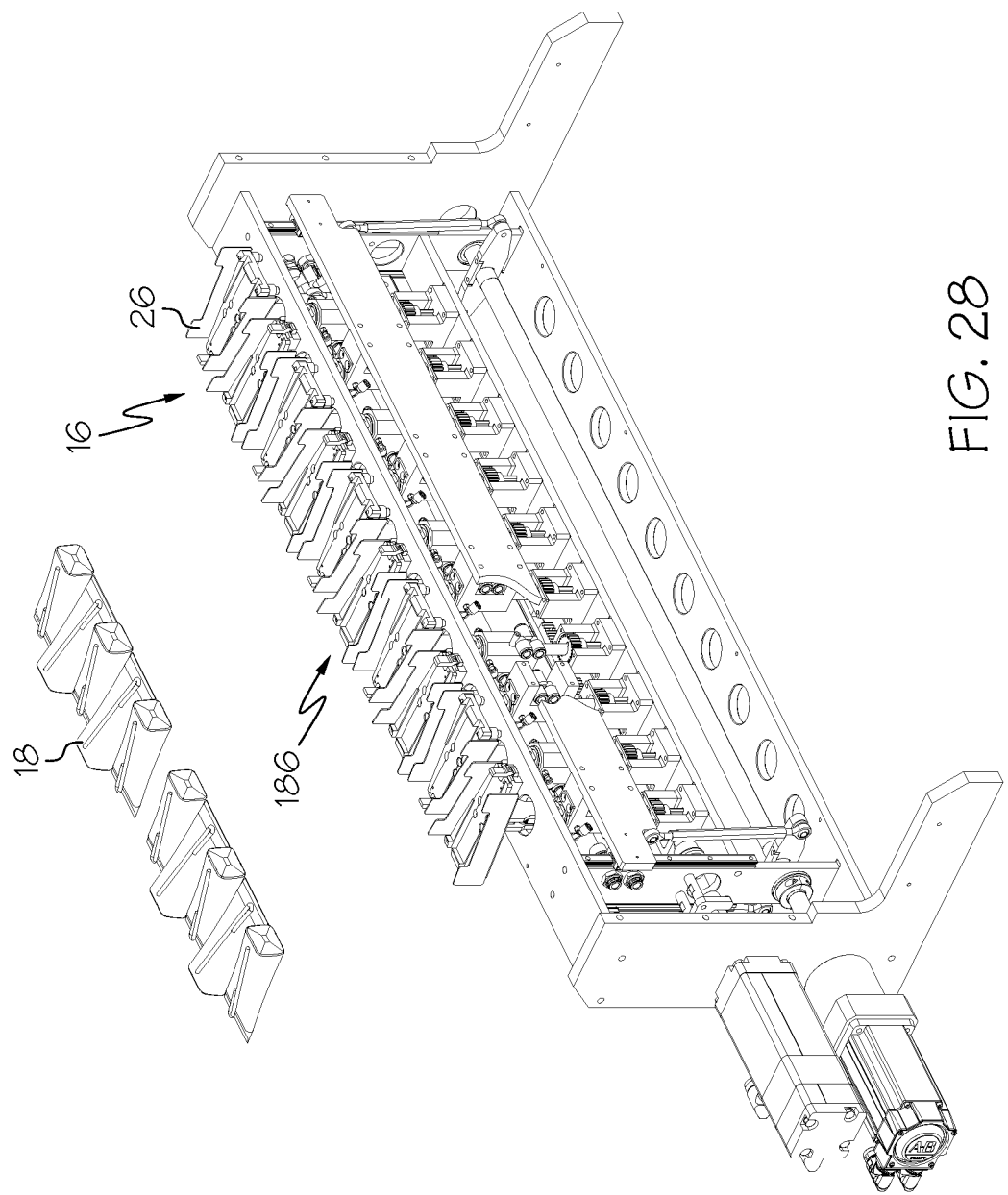

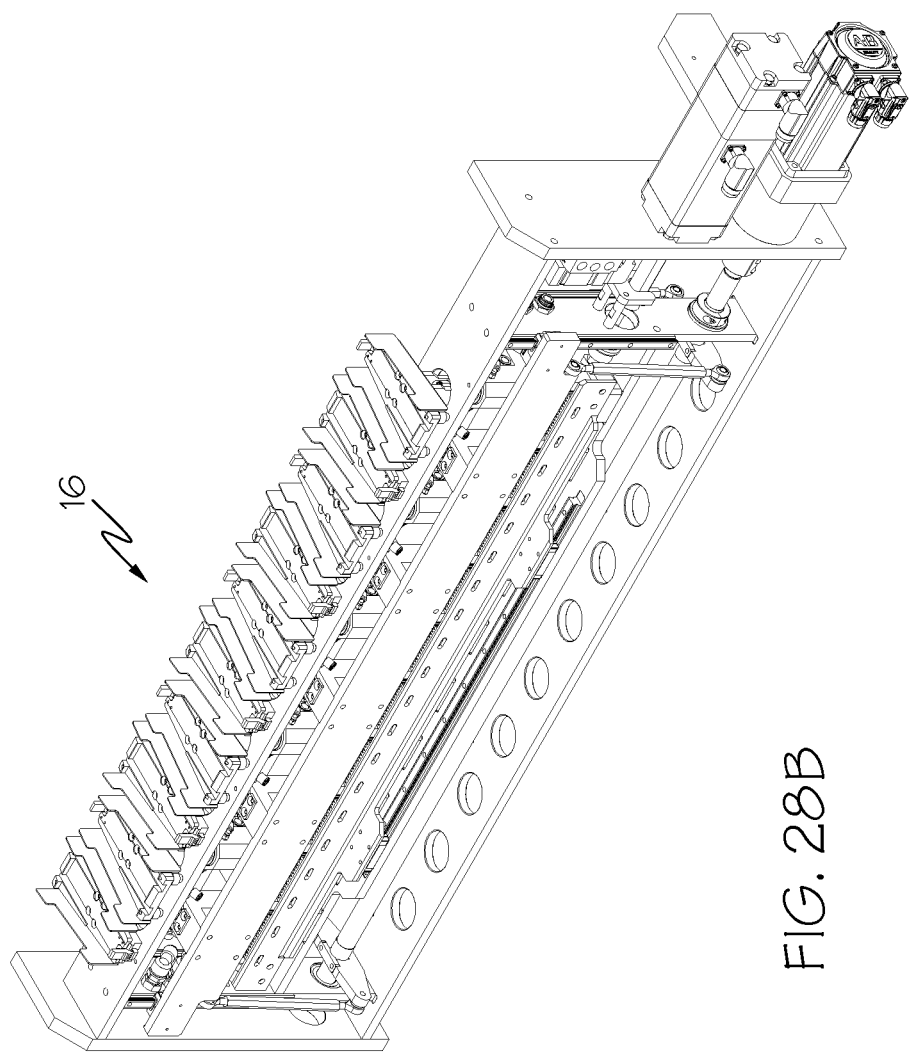

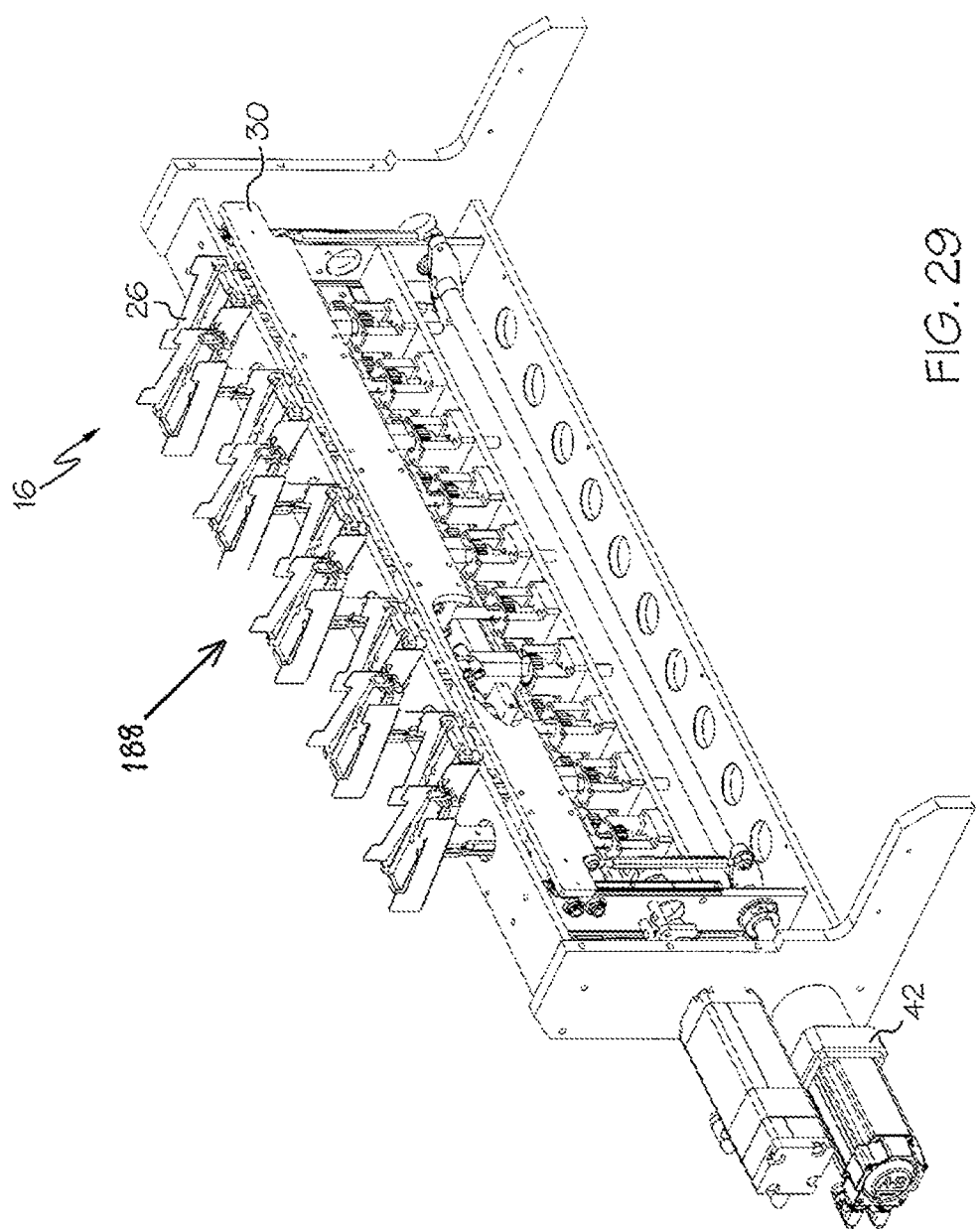

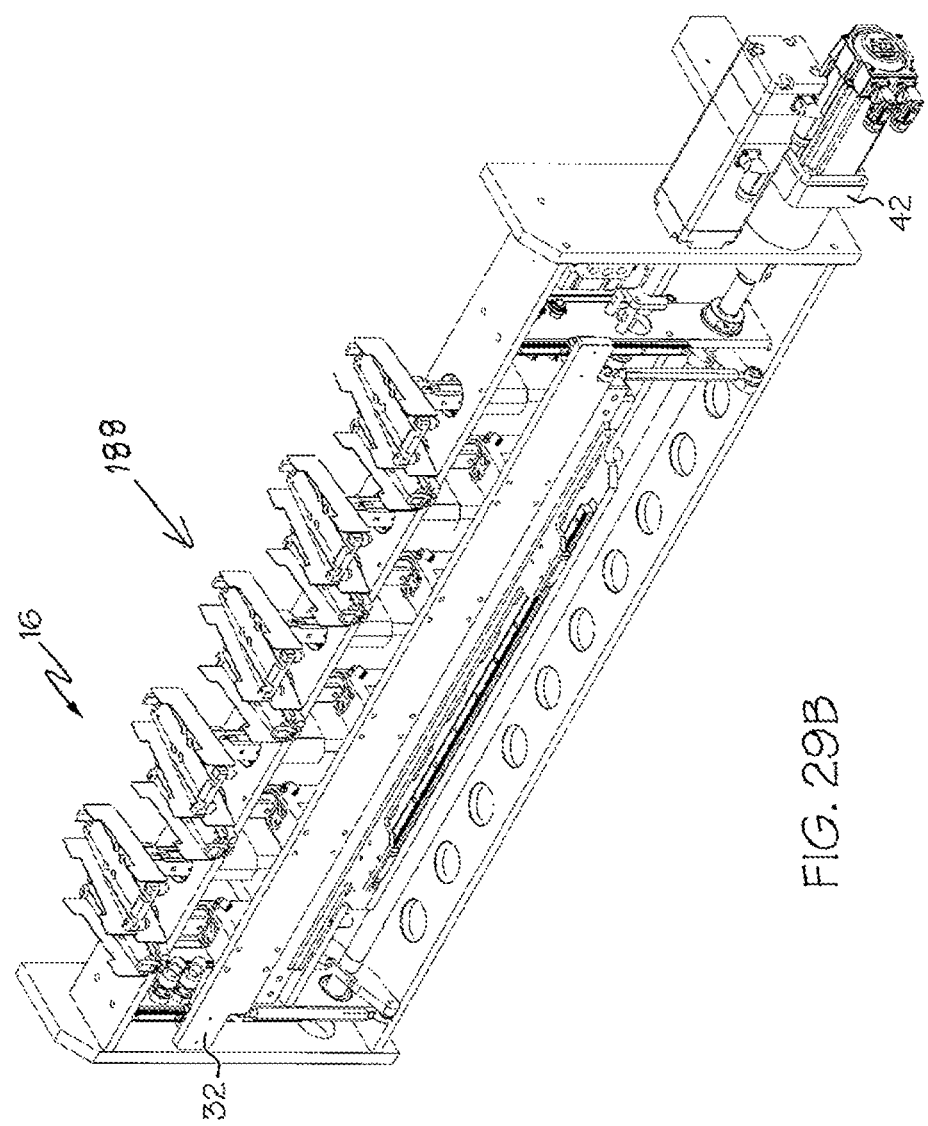

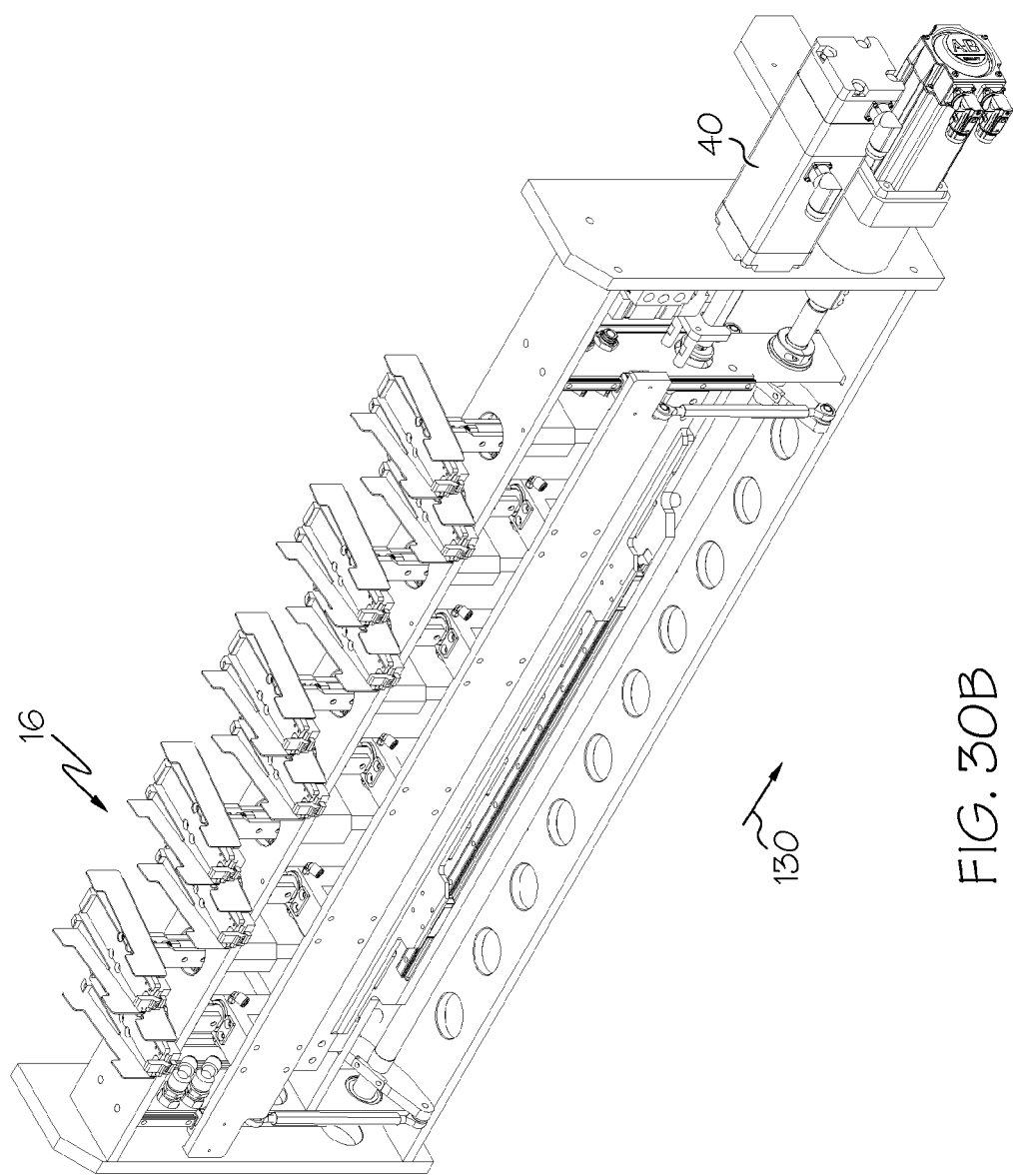

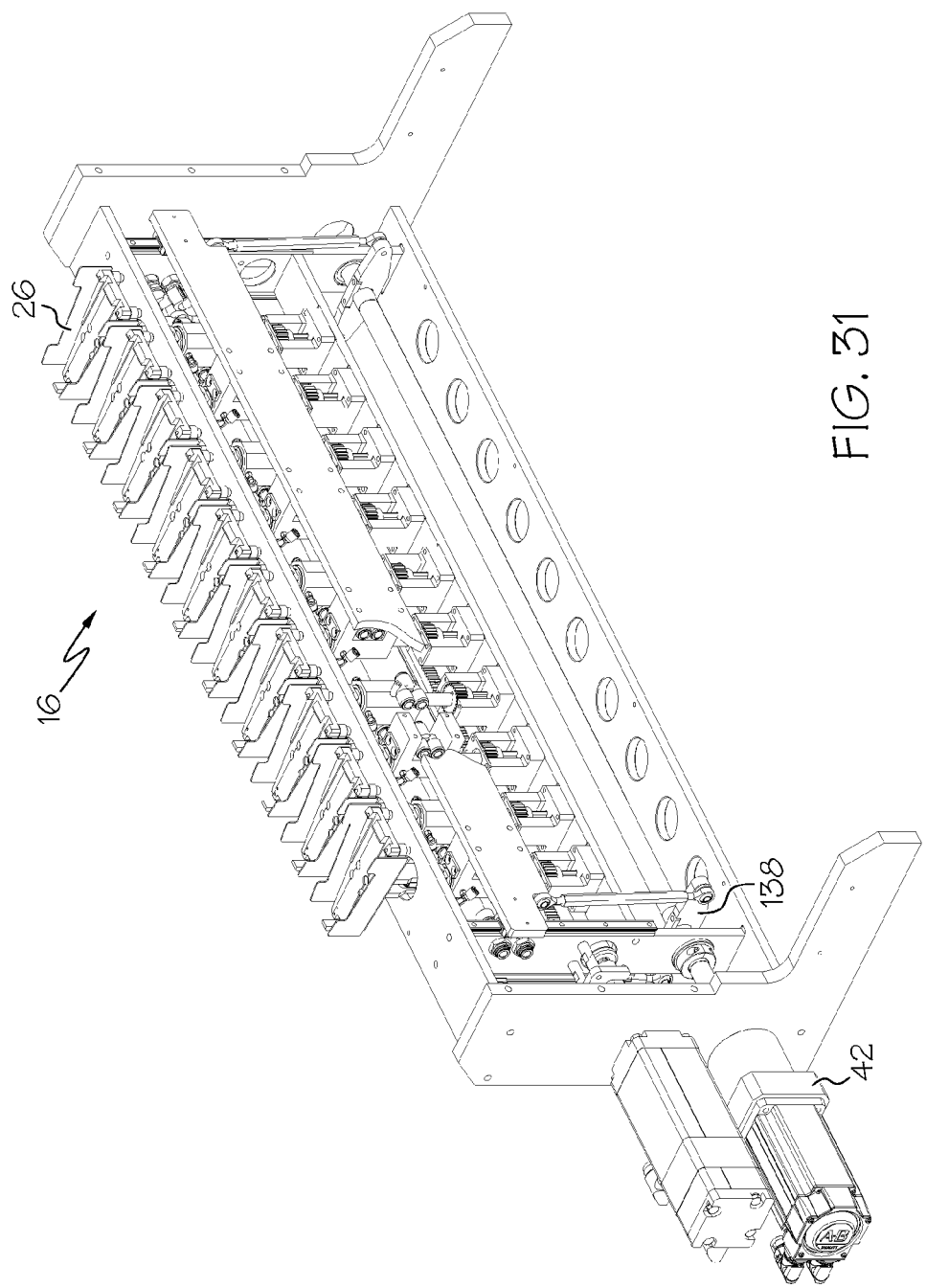

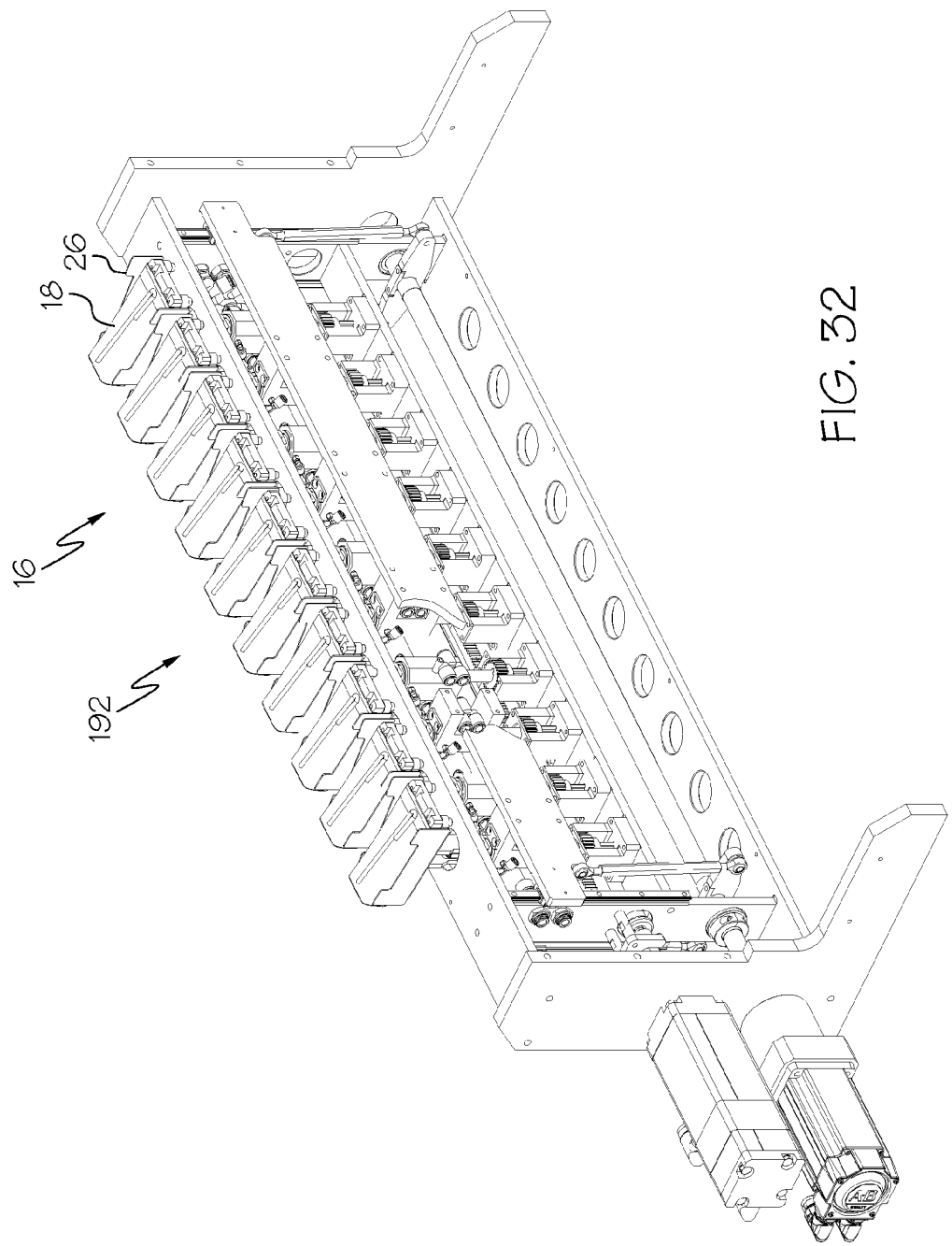

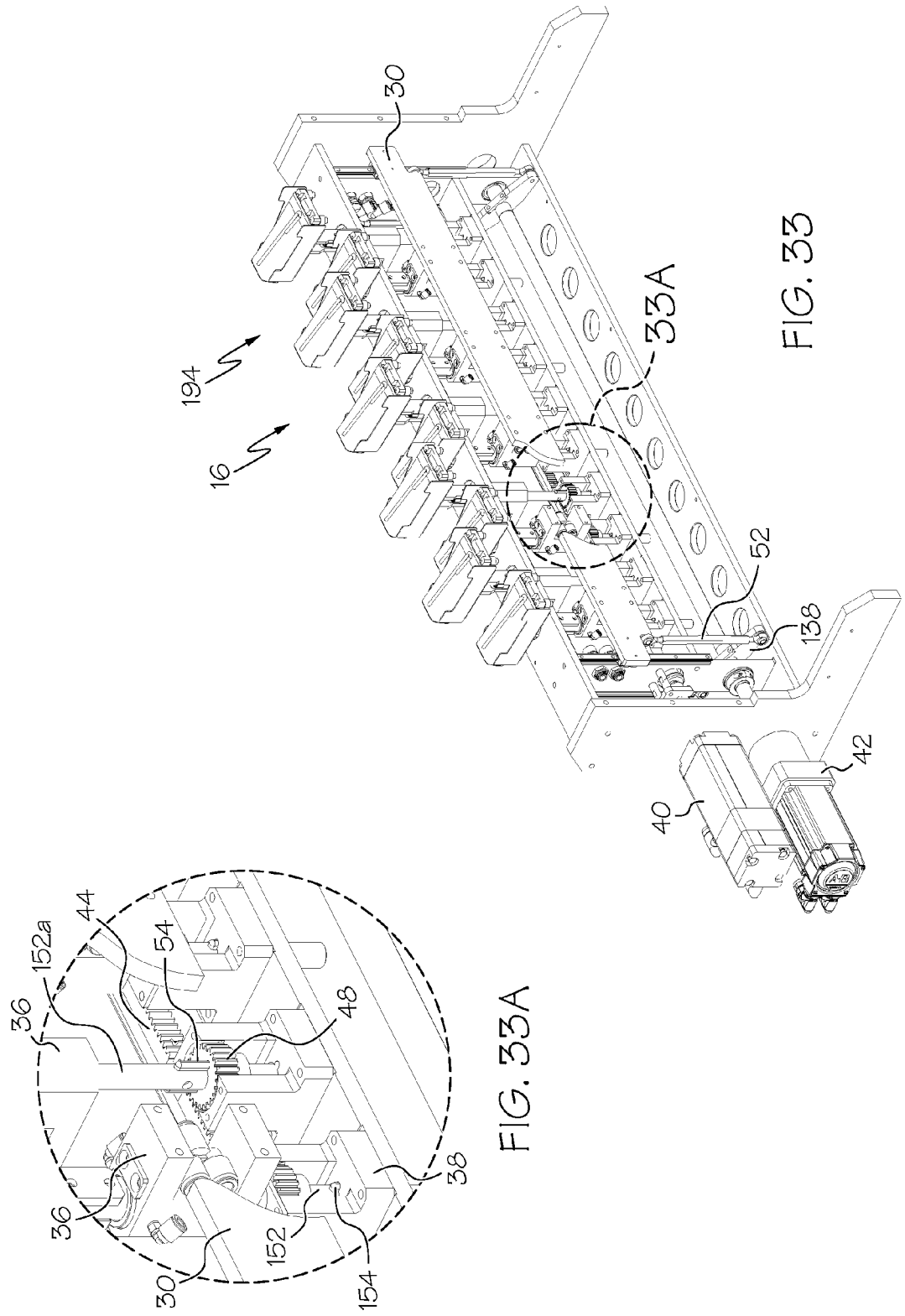

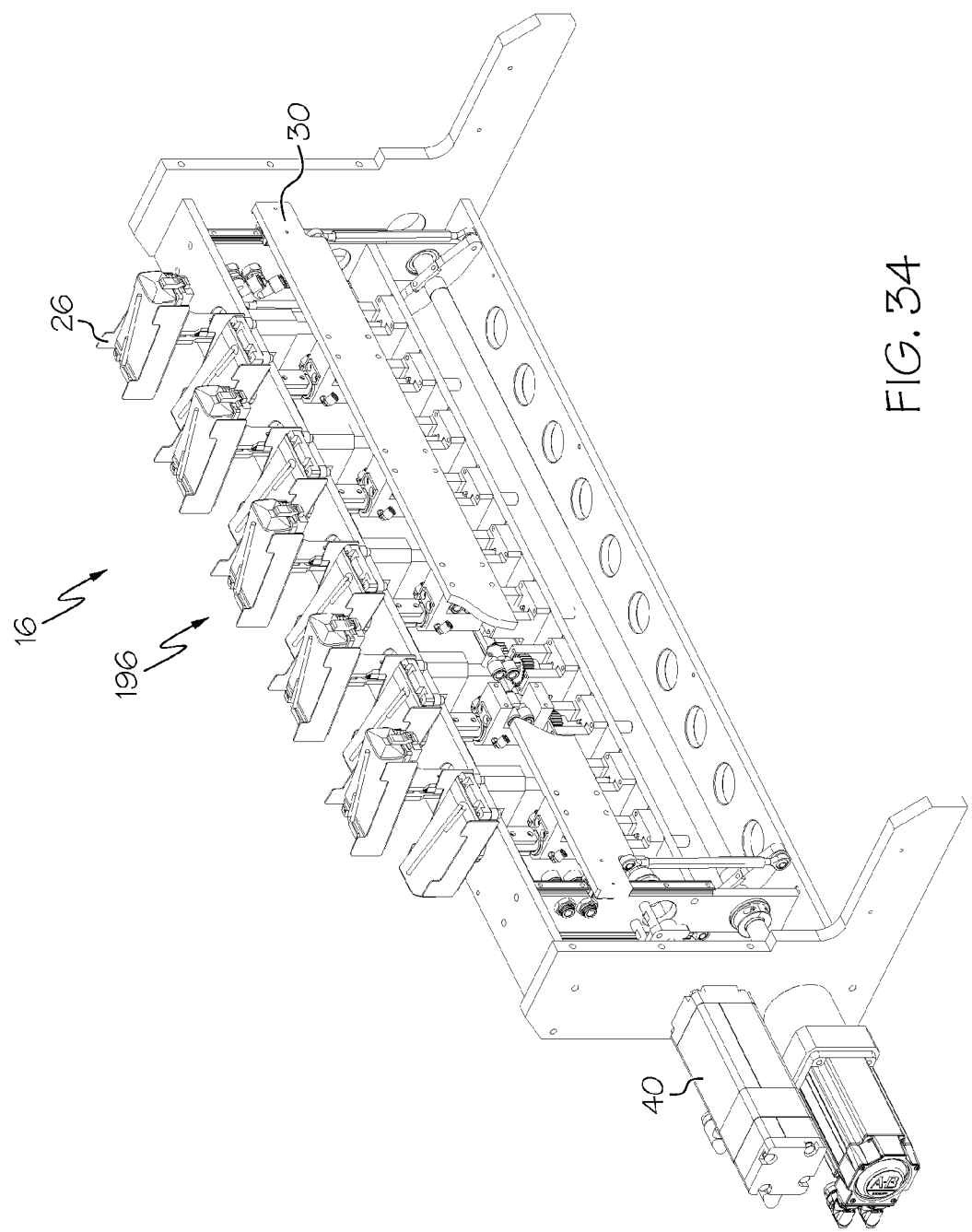

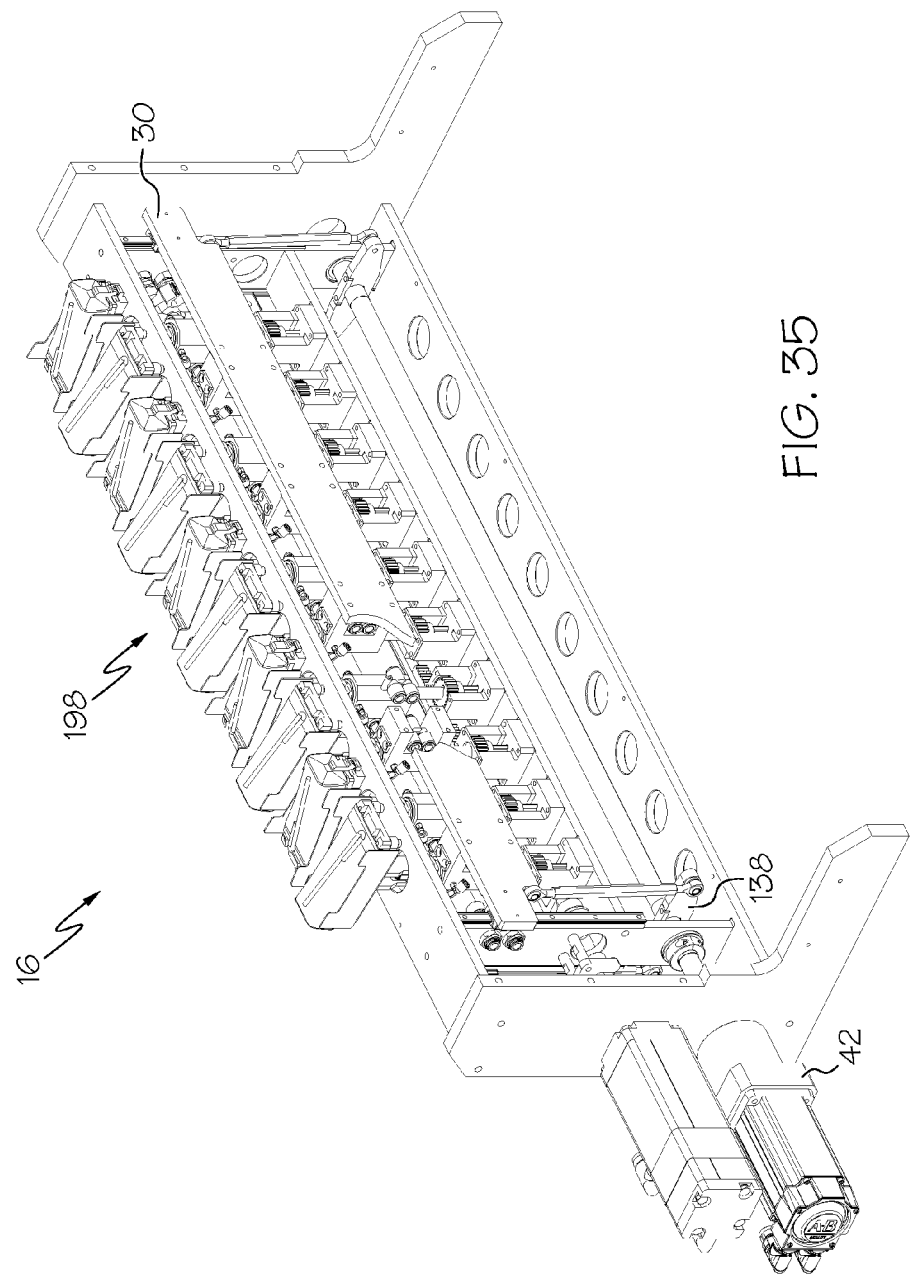

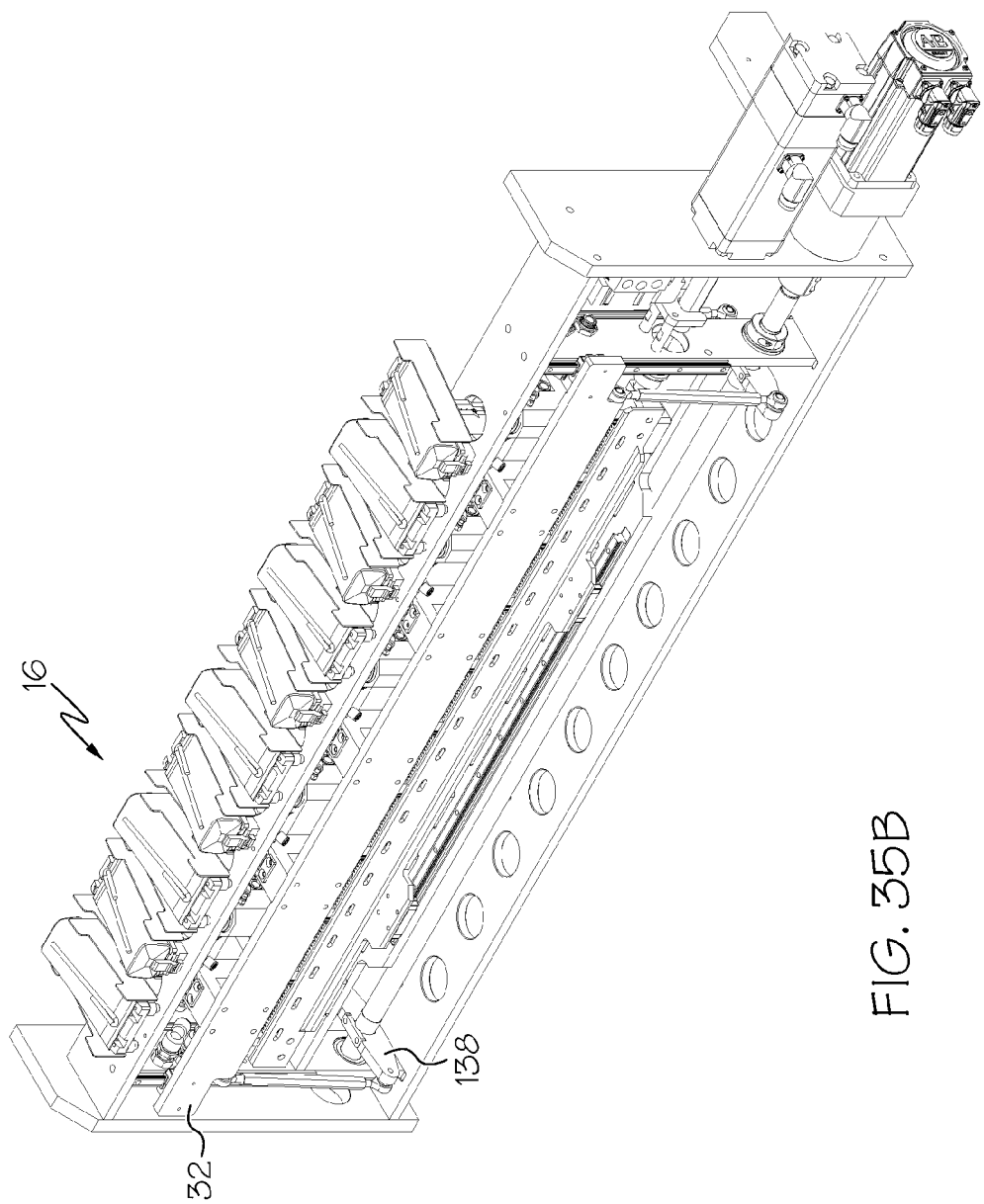

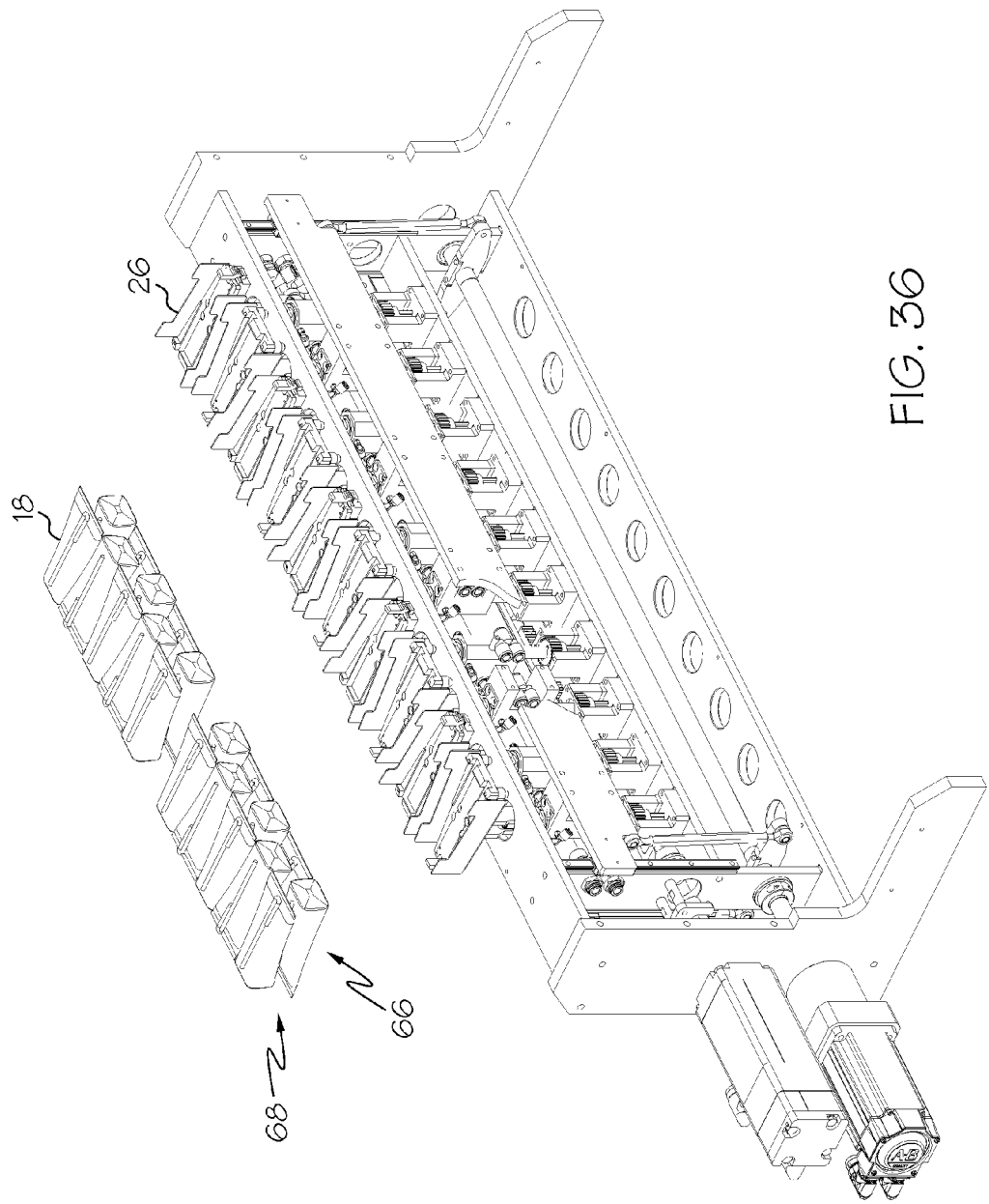

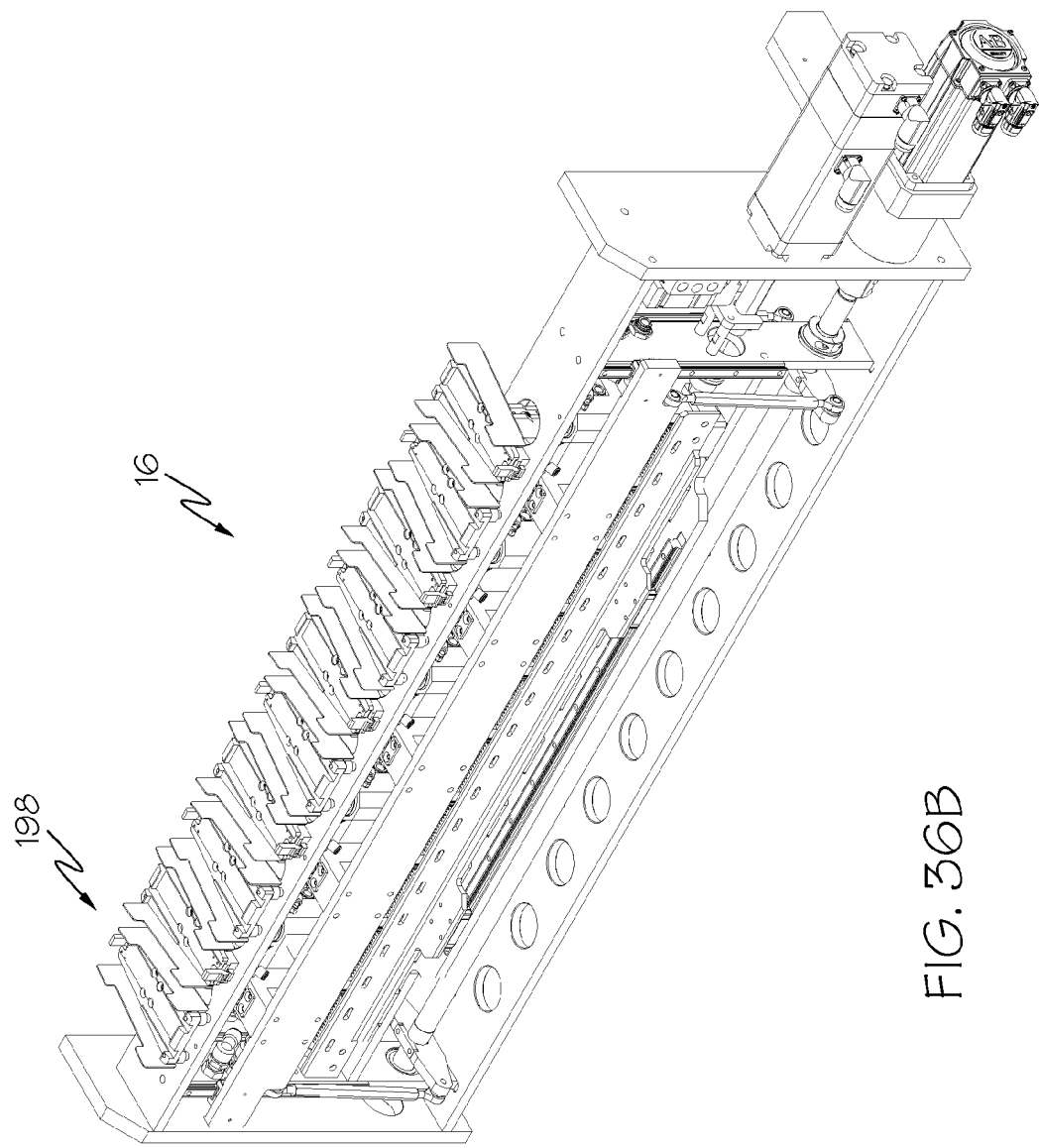

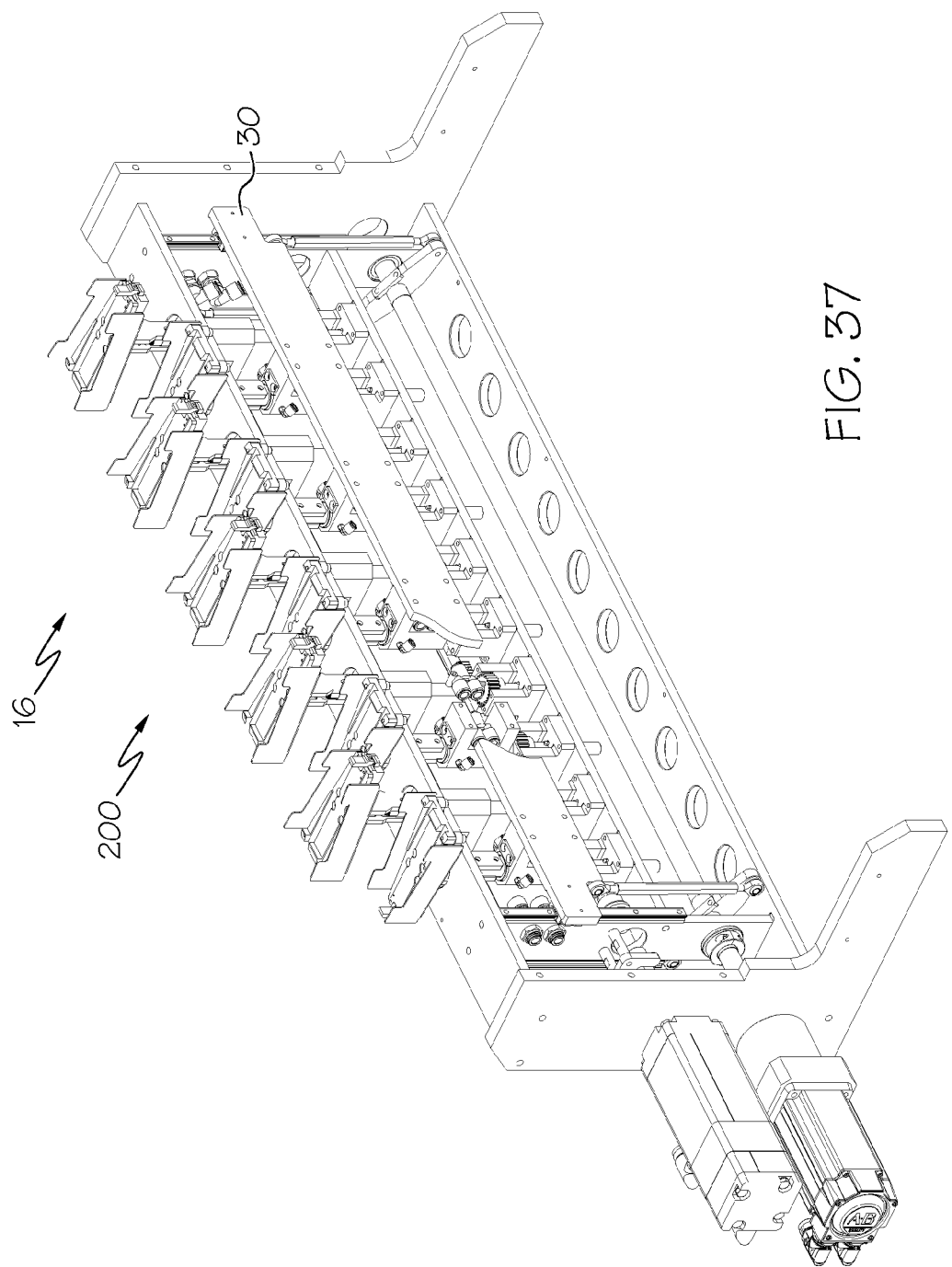

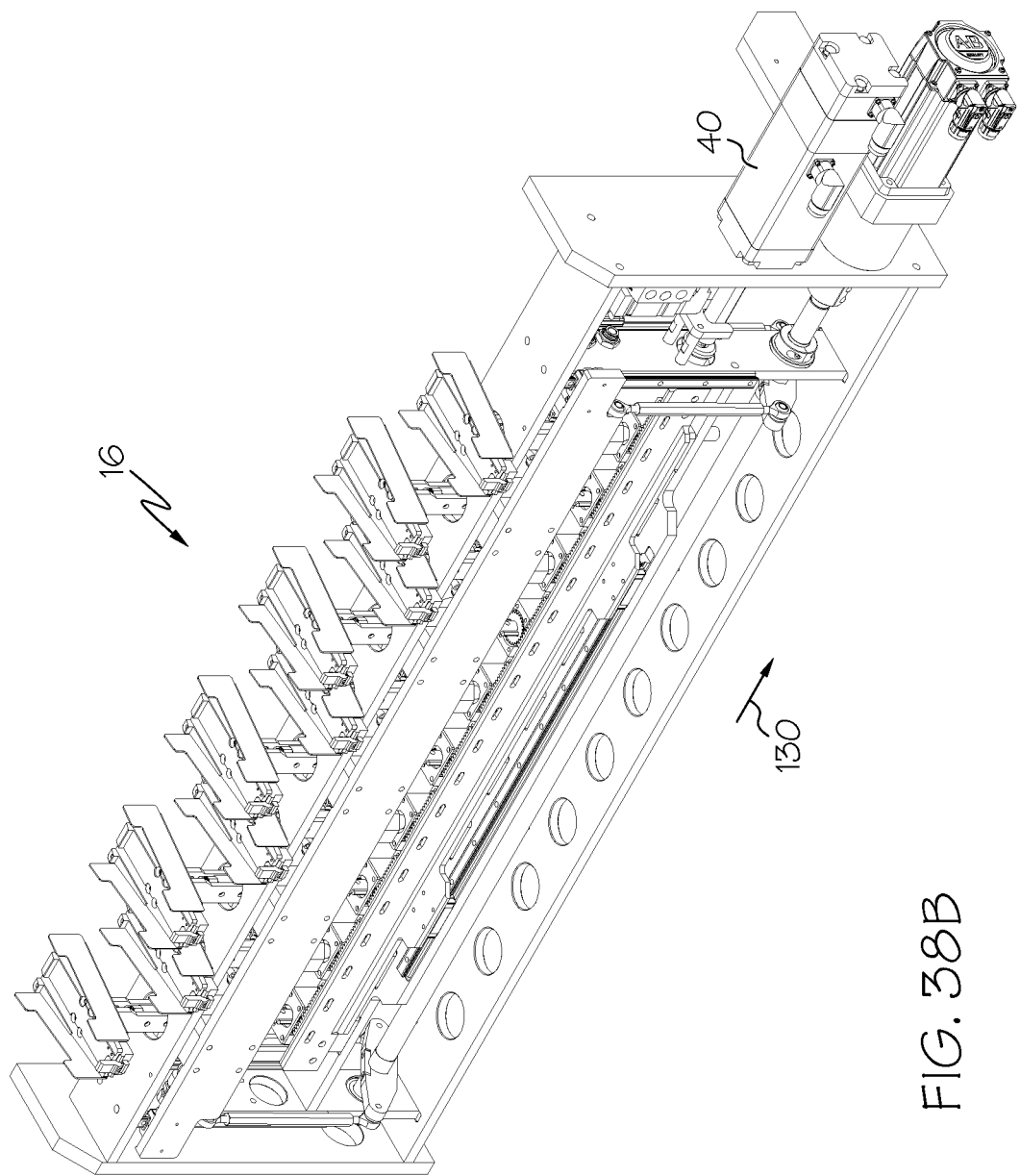

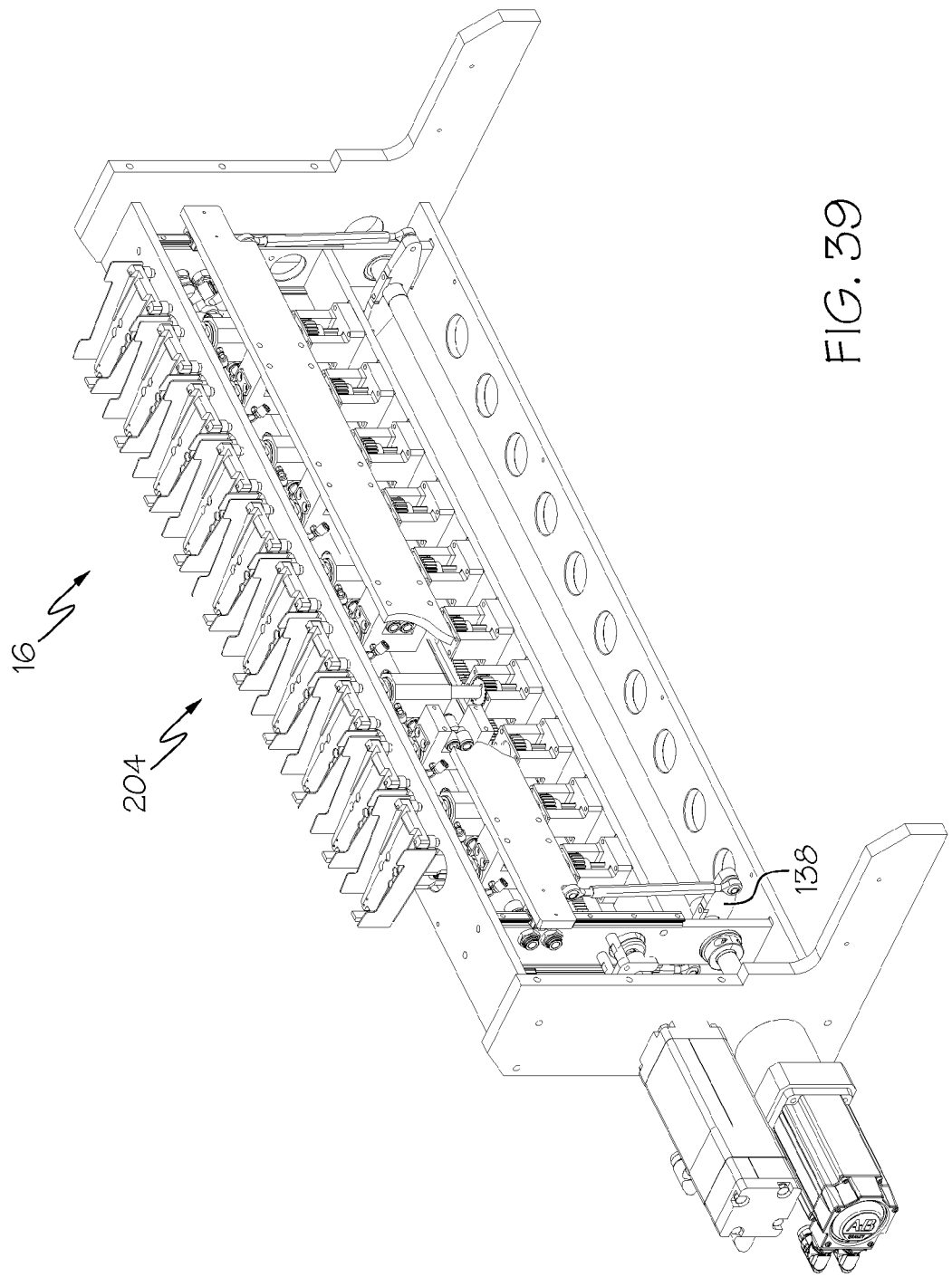

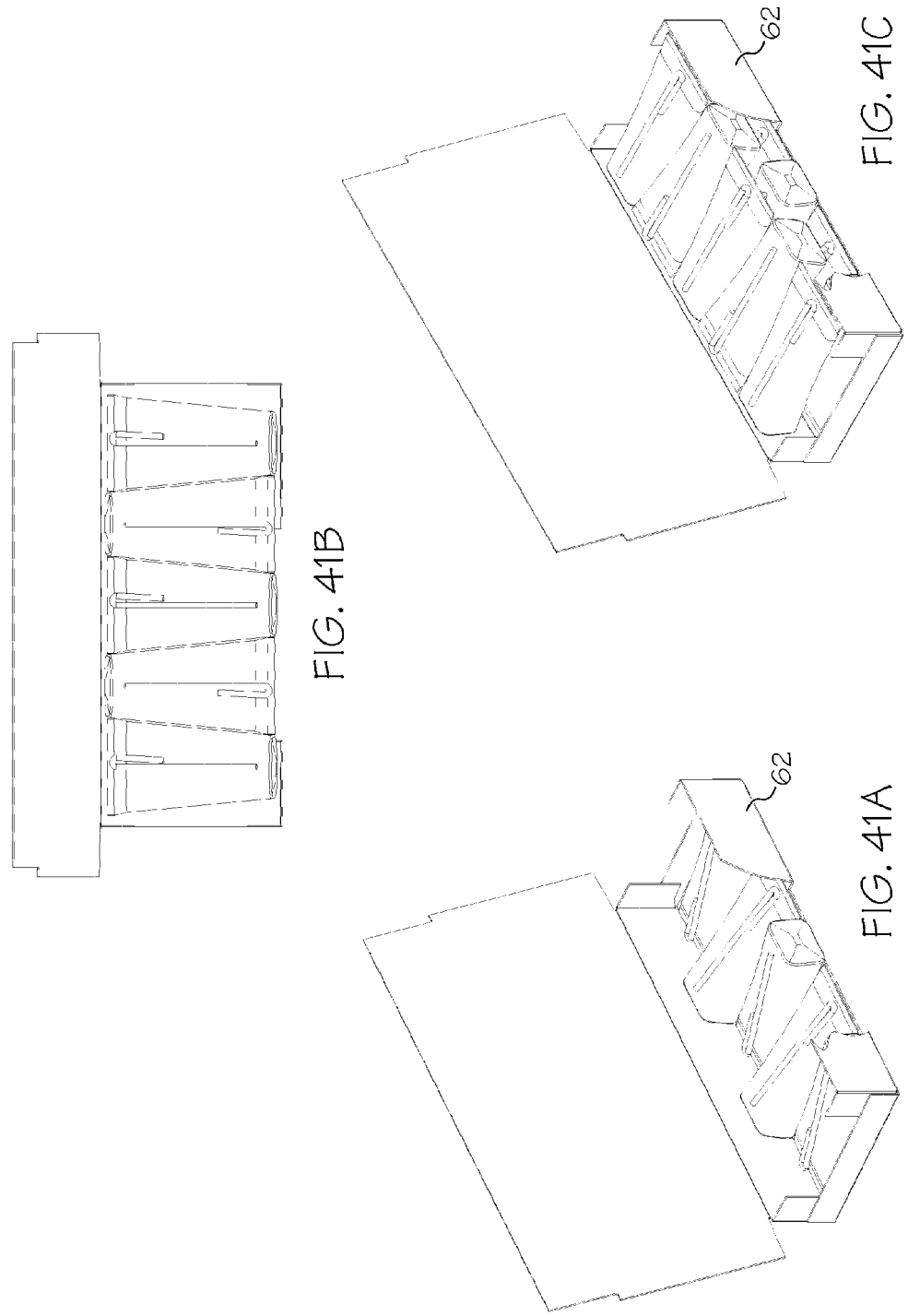

PACKAGING LOADER ASSEMBLY

CROSS-REFERENCE TO RELATED APPLICATIONS

This Application claims the benefit of and priority to U.S. Provisional Application No. 61/852,174, filed Apr. 9, 2013, which is herein incorporated by reference.

STATEMENT REGARDING FEDERALLY SPONSORED RESEARCH

Not Applicable.

BACKGROUND OF THE INVENTION

Various types of packaging assemblies are known in the art. Existing assemblies, however, lack the ability to quickly and efficiently package products having non-standard or non-cuboid shapes. Consequently, there remains a need in the packaging industry to efficiently package products having non-standard or non-cuboid shapes. In particular, there remains a need to reorient the product in a reliable manner so that it can be packaged.

All U.S. patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. §1.72. The abstract is not intended to be used for interpreting the scope of the claims.

SUMMARY OF THE INVENTION

In some embodiments, a packaging loader assembly comprises a frame, a plurality of product nests, a plurality of spindles, a plurality of pinion gears, a rack, and a rack drive mounted to the frame. The spindles are attached to at least some of the product nests and the pinion gears are selectively rotatably coupled to the spindles. The rack has gear teeth thereon, and the gear teeth are engaged to the pinion gears. The rack drive is attached to the rack.

In some embodiments, the packaging loader assembly further comprises a front lift plate and a plurality of mounting blocks attached to the front lift plate. At least some of the spindles extend through the mounting blocks.

In some embodiments, the packaging loader assembly further comprises a rocker drive. The rocker drive is attached to the frame and is configured to raise the front lift plate.

In some embodiments, the packaging loader further comprises a back lift plate and a plurality of mounting blocks attached to the back lift plate. The rocker drive is configured to raise the back lift plate.

In some embodiments, the spindles comprise drive keys and the pinion gears define pinion gear keyways. The pinion gears are rotatably coupled to the spindles when the drive keys engage the pinion gear keyways.

In some embodiments, the packaging loader assembly further comprises a plurality of guide blocks attached to the frame.

In some embodiments, the guide blocks define guide block keyways and the spindles comprise drive keys. The drive keys are at least partially insertable into the guide block keyways.

In some embodiments, a method of packaging products comprises providing a packaging loader, packaging, and a plurality of products. The packaging loader comprises an assembly for reorienting at least some of the products. The method further comprises placing products in the assembly, rotating at least some of the products via the assembly, removing the rotated products from the assembly, and placing the products in the packaging.

In some embodiments, the products are arranged in the assembly in a plurality of adjacent product nests and the product nests are aligned with one another in a row. In some embodiments, the method step of rotating at least some of the products comprises rotating every-other product nest in the row of products nests.

In some embodiments, the method comprises placing a first layer of products in the packaging and placing a second layer of products in the packaging.

In some embodiments, the products of the first layer of products have a different orientation within the packaging than the products of the second layer of products.

In some embodiments, the packaging loader further comprises a rack drive, a rack having a plurality of teeth, a plurality of pinion gears, a plurality of spindles, and a plurality of product nests. In some embodiments, the method step of rotating at least some of the products via the assembly comprises moving the rack with the rack drive, rotating the pinion gears with the rack, rotating the spindles with the pinion gears, and rotating at least some of the products with the product nests, which are attached to the spindles.

In some embodiments, the method further comprises raising at least some of the products within the assembly prior to rotating them.

In some embodiments, the method further comprises lowering at least some of the products with the assembly.

In some embodiments, a packaging loader for loading products into packaging comprises a collator, a cross pusher, and a nesting assembly. The cross pusher is attached to the collator and the nesting assembly is adjacent to the cross pusher. The nesting assembly comprises a plurality of product nests, a plurality of spindles attached to the product nests, and a drive motor. The drive motor is selectively coupled to at least some of the spindles and is configured to rotate the spindles when selectively coupled thereto. The product nests are arranged adjacent to one another in a row.

In some embodiments, the collator comprises a plurality of collator chains.

In some embodiments, the cross pusher comprises a pusher member. The pusher member is configured to move the products from the collator to the nesting assembly.

In some embodiments, the packaging loader further comprises a robot or x-y loader. The robot or x-y loader is configured to move the product from the nesting assembly to the packaging.

In some embodiments, the packaging loader further comprises a pacing conveyor. The pacing conveyor is adjacent to the collator.

In some embodiments, the pacing conveyor is configured to move products onto to the collator.

BRIEF DESCRIPTION OF THE SEVERAL VIEWS OF THE DRAWING(S)

FIGS. 1-10 show a packaging loader 10 in ten different stages.

FIGS. 11A and 11B show detailed views of a portion of the packaging loader of FIG. 1.

FIGS. 12A and 12B show detailed views of a portion of the packaging loader of FIG. 1, in a stage subsequent to that of FIGS. 11A and 11B.

FIGS. 13A and 13B show detailed views of a portion of the packaging loader of FIG. 1, in a stage subsequent to that of FIGS. 12A and 12B.

FIG. 14 shows the packaging loader 10 of FIG. 1 in another stage.

FIG. 14A shows packaging 62 having therein a layer of products 18.

FIGS. 15-20 show the packaging loader 10 of FIG. 1 in additional stages.

FIG. 20A shows the packaging 62 having therein two layers of products 18.

FIG. 23 shows a view of front of the nesting assembly 16.

FIG. 23A shows a detailed view of a portion of the nesting assembly 16 of FIG. 23.

FIG. 23B shows a view of the back of the nesting assembly 16.

FIG. 24 shows a view of front of the nesting assembly 16.

FIG. 25 shows a view of front of the nesting assembly 16.

FIG. 25A shows a detailed view of a portion of the nesting assembly 16 of FIG. 25.

FIG. 26 shows a view of front of the nesting assembly 16.

FIG. 27 shows a view of front of the nesting assembly 16.

FIG. 27A shows a detailed view of a portion of the nesting assembly 16 of FIG. 27.

FIG. 28 shows a view of front of the nesting assembly 16.

FIG. 28B shows a view of the back of the nesting assembly 16.

FIG. 29 shows a view of front of the nesting assembly 16.

FIG. 29B shows a view of the back of the nesting assembly 16.

FIG. 30B shows a view of the back of the nesting assembly 16.

FIG. 31 shows a view of front of the nesting assembly 16.

FIG. 32 shows a view of front of the nesting assembly 16.

FIG. 33 shows a view of front of the nesting assembly 16.

FIG. 33A shows a detailed view of a portion of the nesting assembly 16 of FIG. 33.

FIG. 34 shows a view of front of the nesting assembly 16.

FIG. 35 shows a view of front of the nesting assembly 16.

FIG. 35B shows a view of the back of the nesting assembly 16.

FIG. 36 shows a view of front of the nesting assembly 16.

FIG. 36B shows a view of the back of the nesting assembly 16.

FIG. 37 shows a view of front of the nesting assembly 16.

FIG. 38B shows a view of the back of the nesting assembly 16.

FIG. 39 shows a view of front of the nesting assembly 16.

FIG. 41A shows an embodiment of the packaging 62 having therein a first layer of product.

FIG. 41B shows a top view of the embodiment of FIG. 41A.

FIG. 41C shows an embodiment of the packaging 62 having therein first and second layers of product.

DETAILED DESCRIPTION OF THE INVENTION(S)

Figure 1:
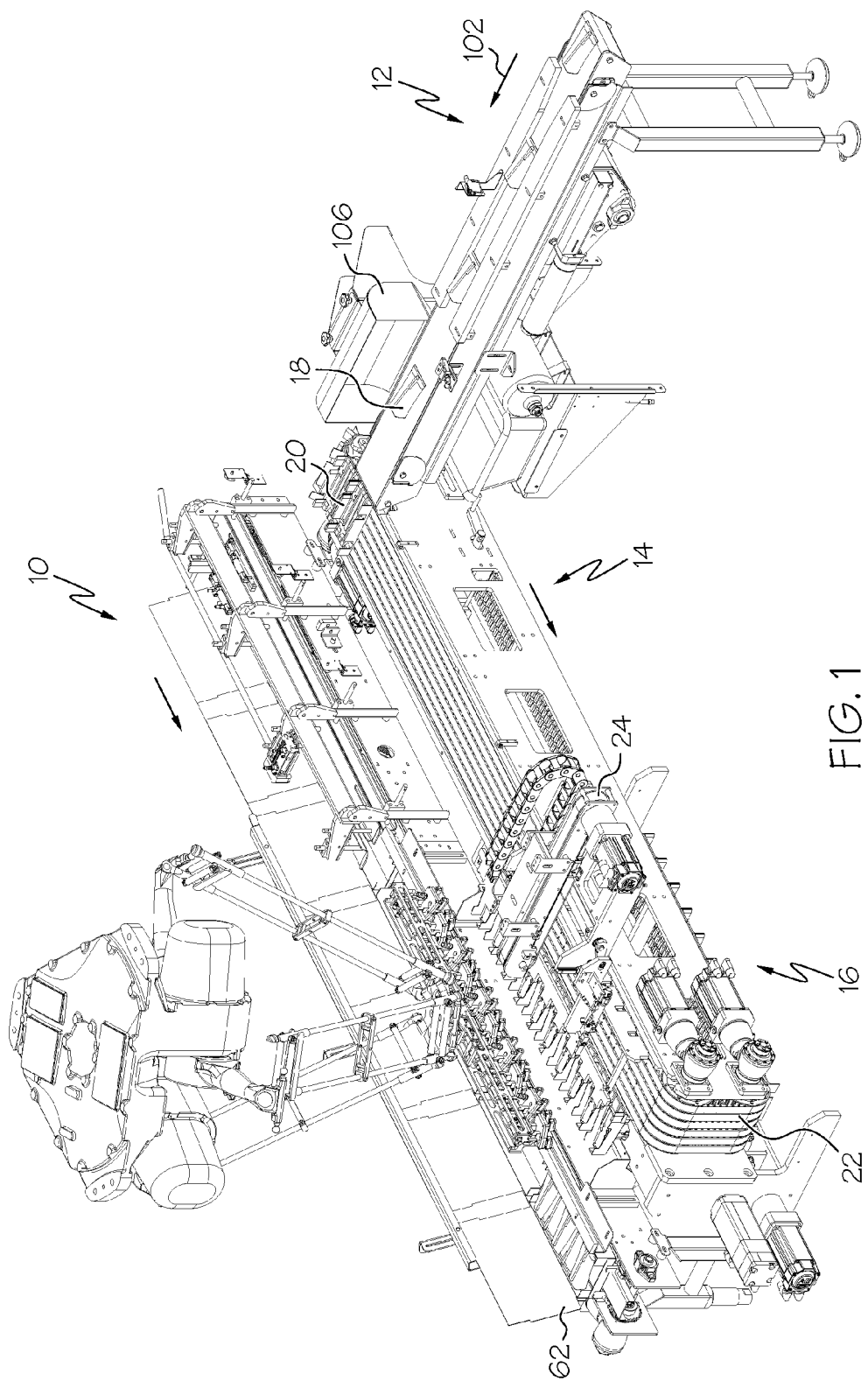

With regard to FIG. 1, a packaging loader 10 loads product 18 into packaging 62. In some embodiments, the packaging loader 10 includes a pacing conveyor 12, a collator 14, and a nesting assembly 16.

The pacing conveyor 12 moves product 18 into a product carrier 20. In some embodiments, the product 18 is moved along the pacing conveyor 12 in a single file manner in the direction of arrow 102. Additionally, in some embodiments, adjacent product 18 is spaced along the pacing conveyor 12 at a predetermined distance. If the distance between adjacent products 18 is too small, as determined by a sensor (e.g., a photo electric sensor), the improperly spaced product can be removed from the pacing conveyor 12 via an air blast or pusher into chute 106. In some embodiments, an air blast is directed or the pusher (not shown) moves generally perpendicularly to the direction of travel of the product 18 along the pacing conveyor 12.

Figure 2:
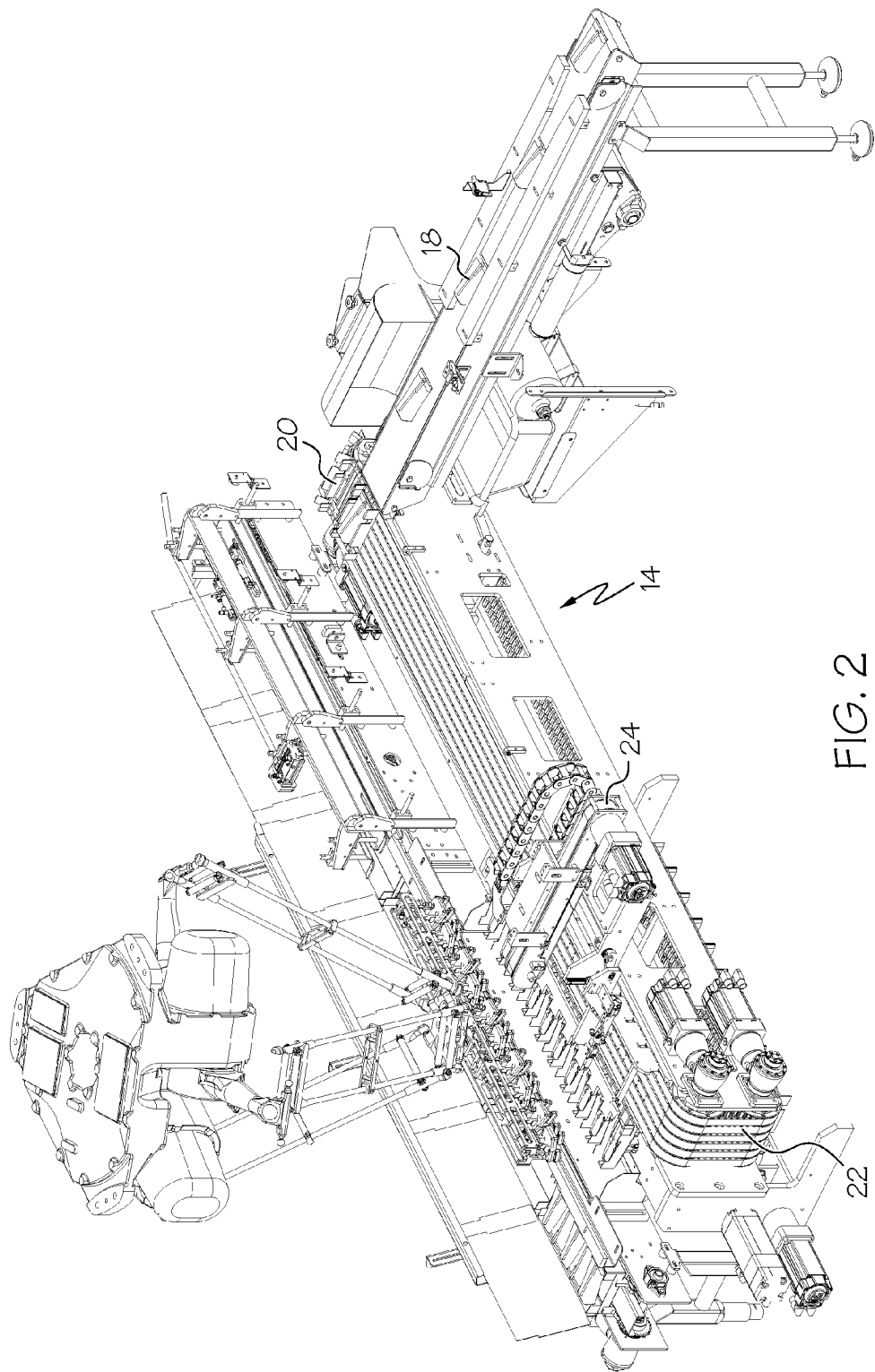
Figure 3:
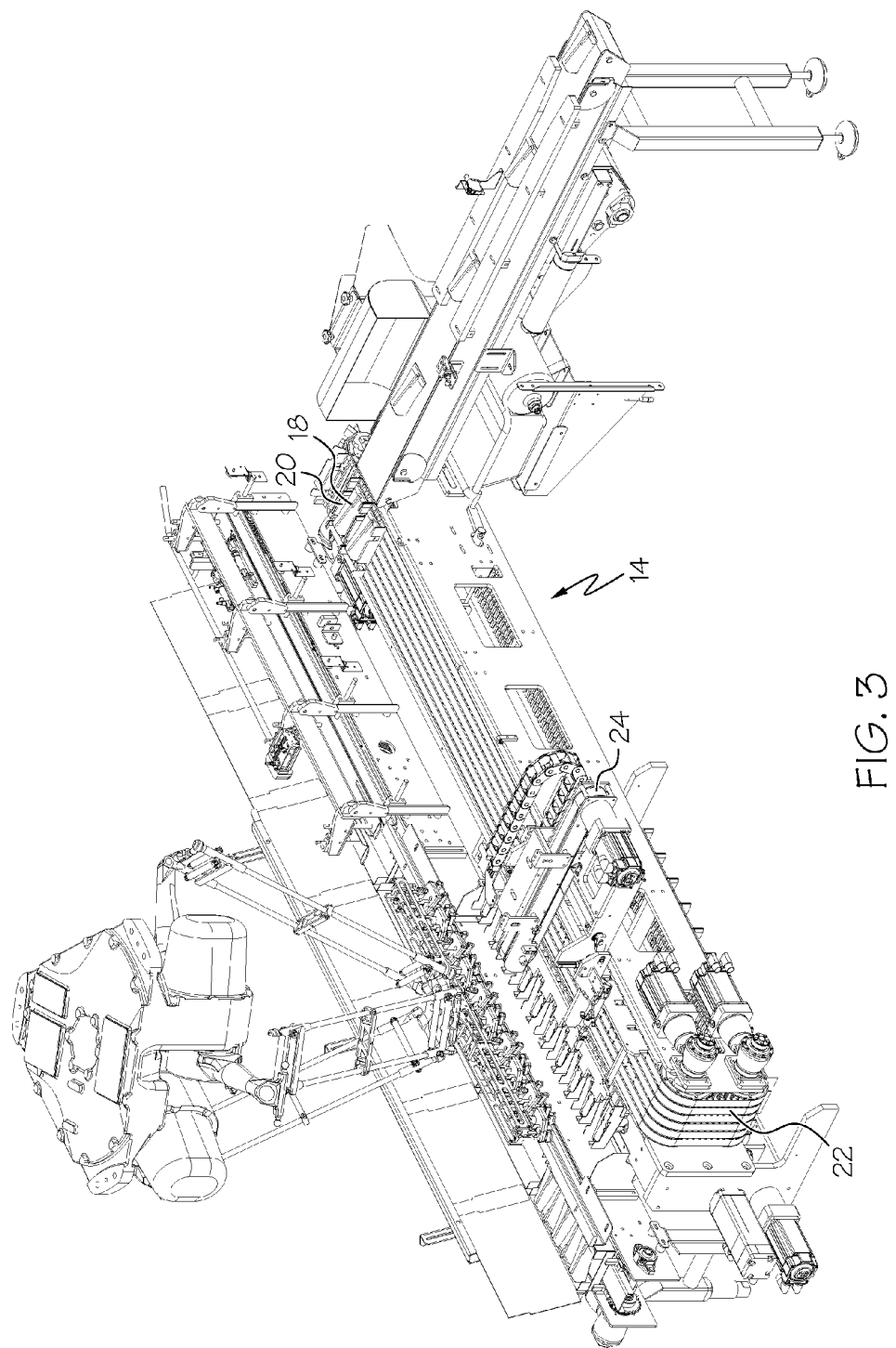
Figure 4:
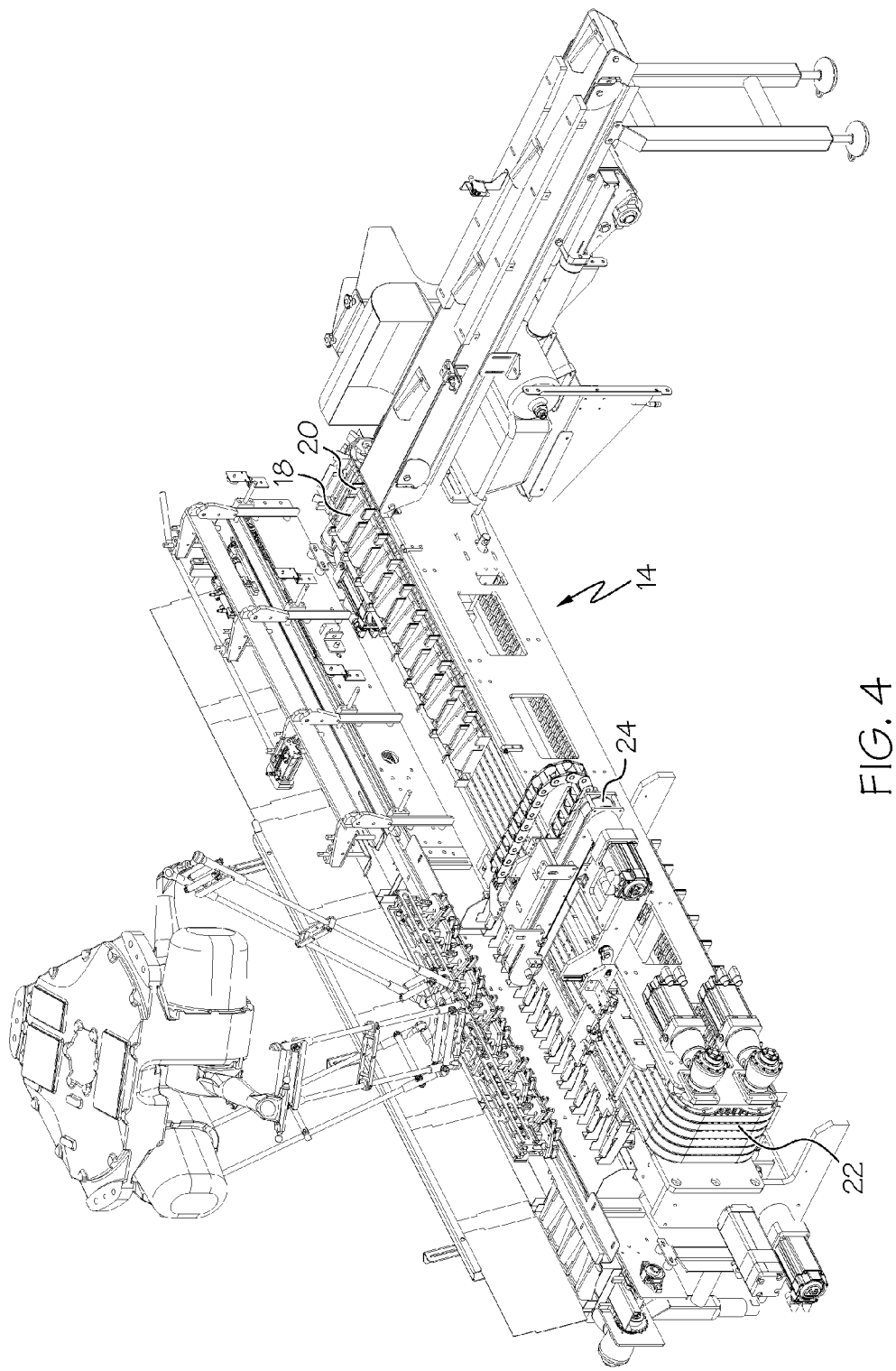

The non-rejected product 18 continues to move along the pacing conveyor 12 until it arrives at the collator 14, as shown in FIG. 2. Upon arriving at the collator 14, the product 18 is directed into an awaiting product carrier 20. The product carriers 20 are attached to collator chains 22, at least some of which are independently movable from one another. In some embodiments, for example, the collator 14 comprises at least three collator chains 22. In this way, and as described in greater detail below, one collator chain 22 can be positioning a product carrier 20 to receive product 18 from the pacing conveyor 12, while a second collator chain 22, and associated product carrier(s) 22, can be located at the cross pusher 24, and a third collator chain 22 can be returning to the beginning of the cycle to receive product 18 within the product carriers. As shown in FIGS. 3 and 4, the collator 14, via collator chains 22, in turn, indexes the product carriers 20 so that they are spaced apart as desired.

Figure 5:
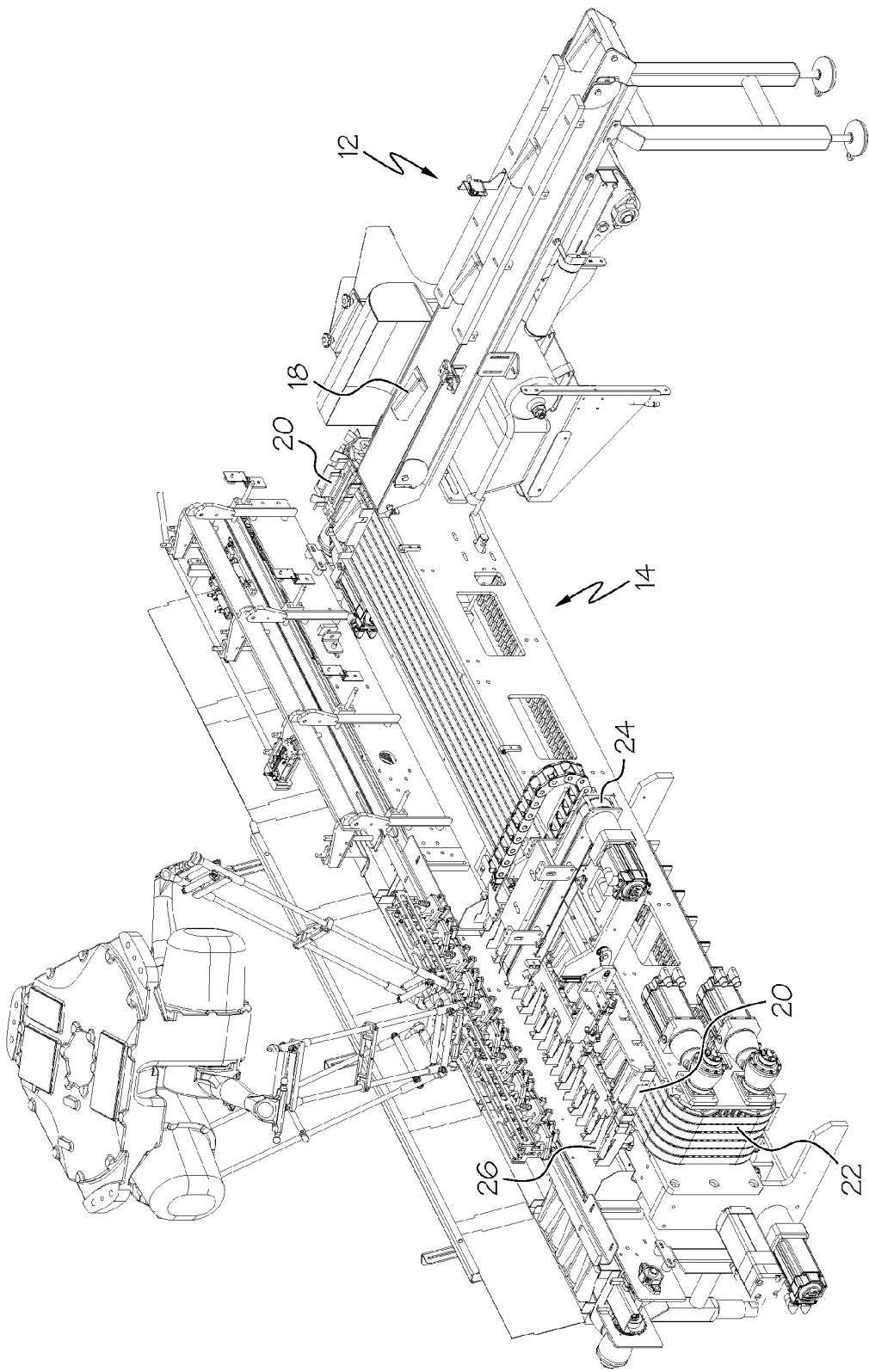

With further regard to FIGS. 3 and 4, the collator 14 collects a batch of product carriers 20, having product 18 therein, and moves the product carriers 20 via collator chains 22 from the pacing conveyor 12 along the length of the collator 14. With particular regard to FIG. 4, in some embodiments, the collator 14 collects a batch of ten product carriers 20 before moving them, together, to the cross pusher 24, as shown in FIG. 5. Although shown as collecting a batch of ten product carriers 20 before moving them, any suitable number could be collected and moved together, for example, 2, 3, 4, 5, 6 7, 8, etc. In some embodiments, however, and depending upon the final packaging pattern, some of the product carriers 20 may not have a product 18 therein.

Figure 6:
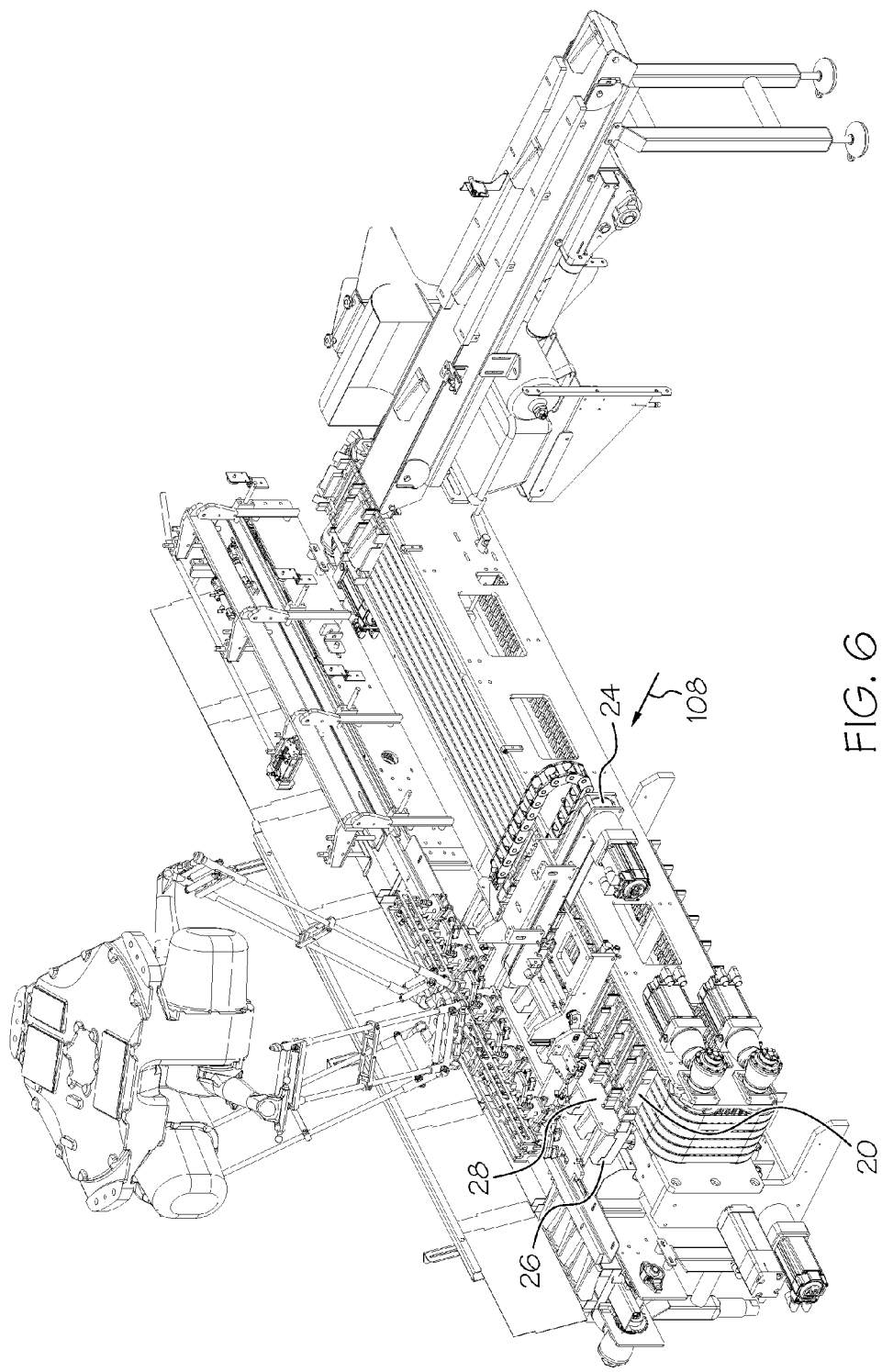
Figure 7:
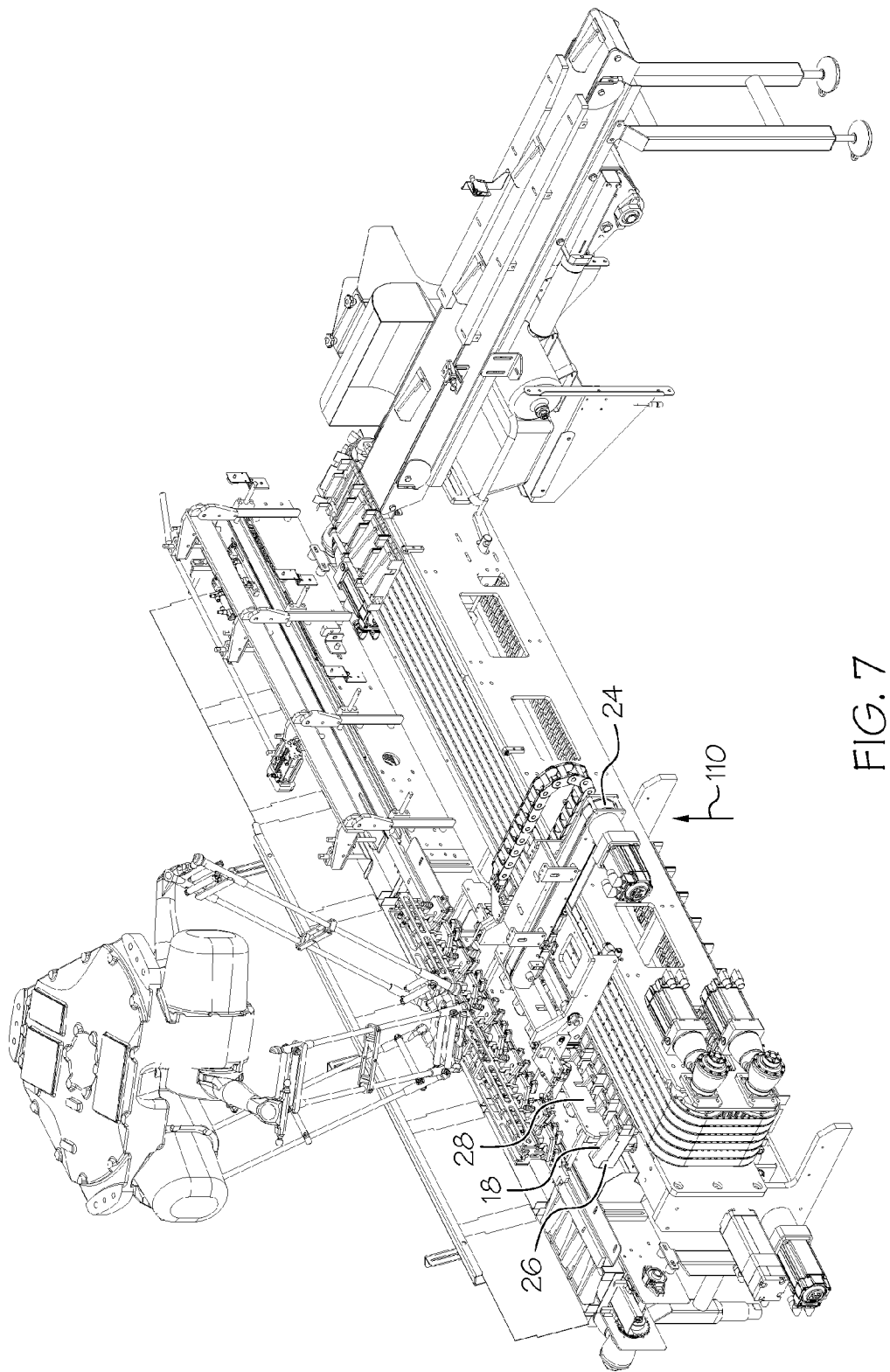
Figure 8:
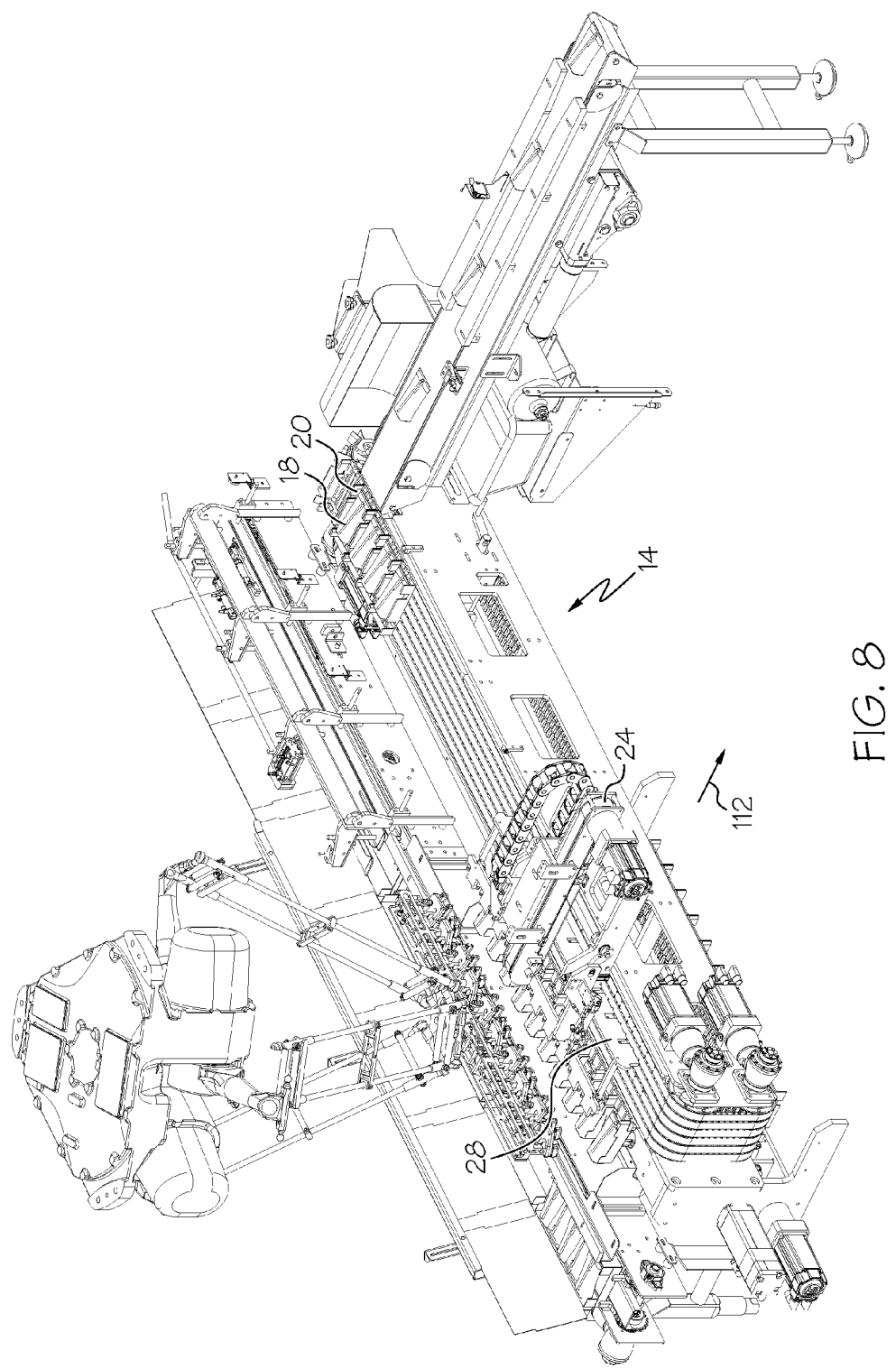

As further shown in FIG. 5, as the collator 14 moves the batch of ten product carriers 20 to the cross pusher 24, another collator chain 22 moves one of the product carriers 20 to the pacing conveyor 12 to receive product 18. Upon arriving at the cross pusher 24, the product 18 is pushed out of the product carrier 20 and into the product nest 26 by the cross pusher 24, as shown in FIG. 6. As further shown in FIGS. 6 and 40A-40B, the cross pusher 24 has a pusher member 28 that pushes the product 18 in the direction of arrow 108. After pushing the product 18 into the product nest 26, the pusher member 28 is raised, moving in the direction of arrow 110, as shown in FIGS. 7 and 40C. Next, as shown in FIGS. 8 and 40D, the pusher member 28 is retracted, moving in the direction of arrow 112. Meanwhile, the pacing conveyor 12 continues to move products 18 into the product carriers 20, in conjunction with the collator 14.

Figure 9:
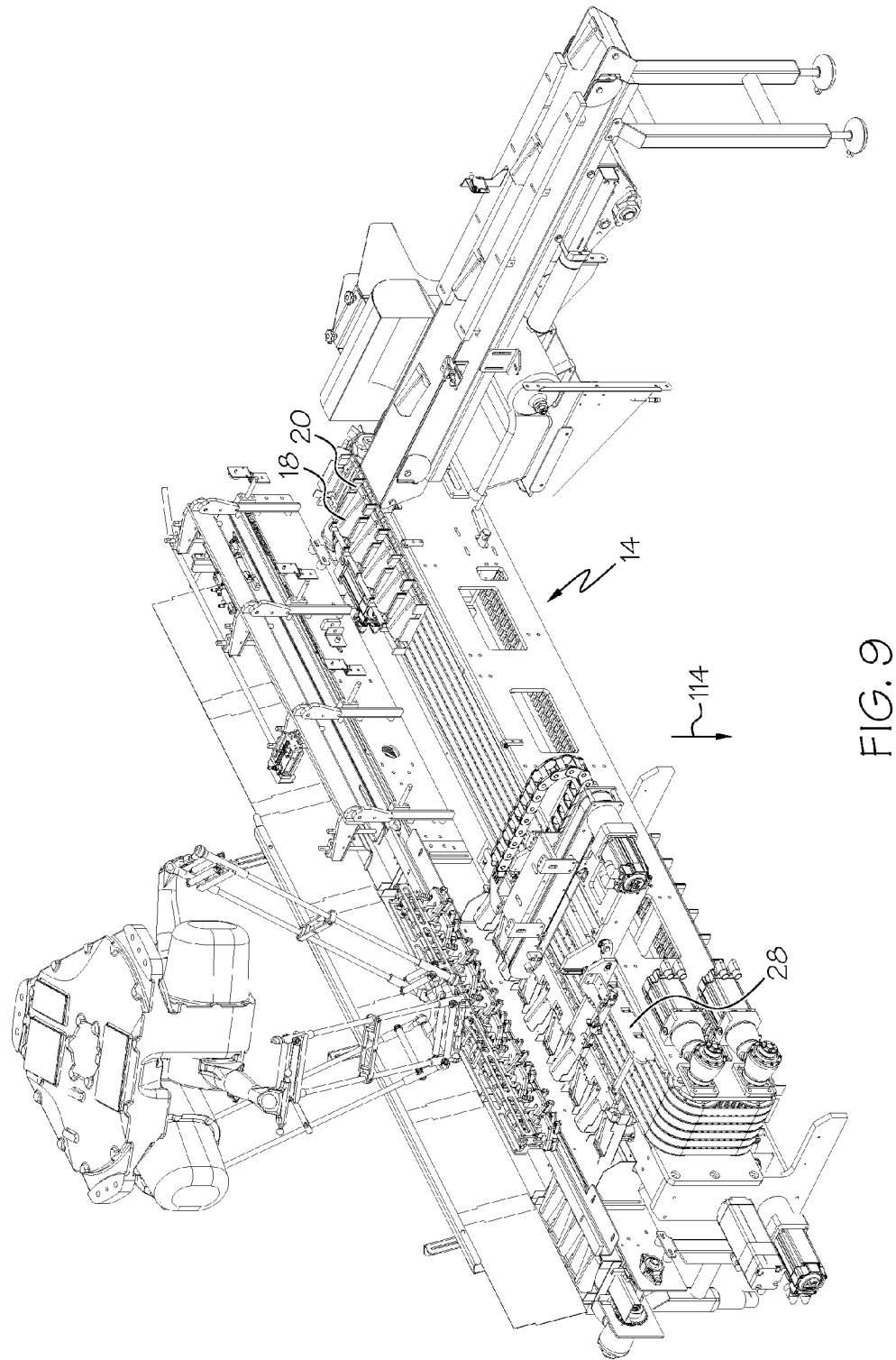
Figure 40B:
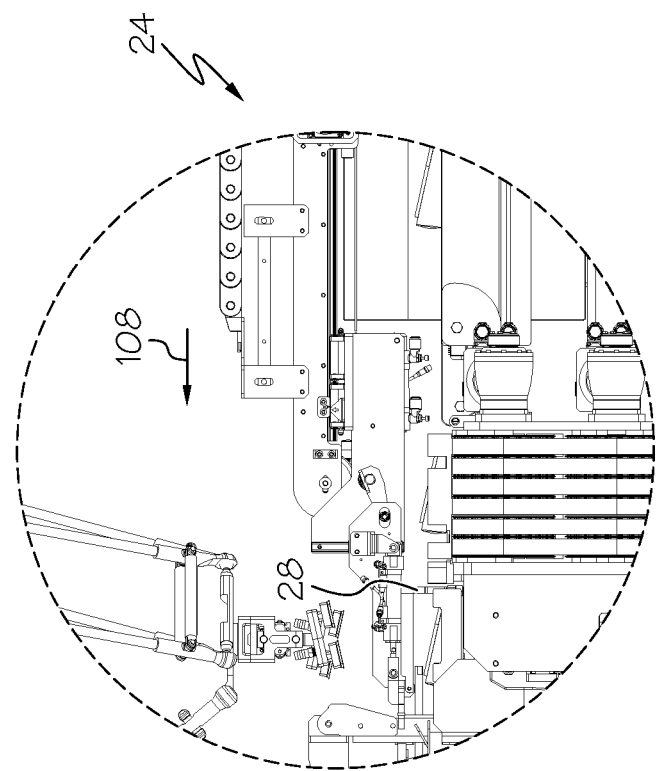
FIGS. 40A-40E show detailed side views of the cross pusher 24 in various states.
Figure 40A:
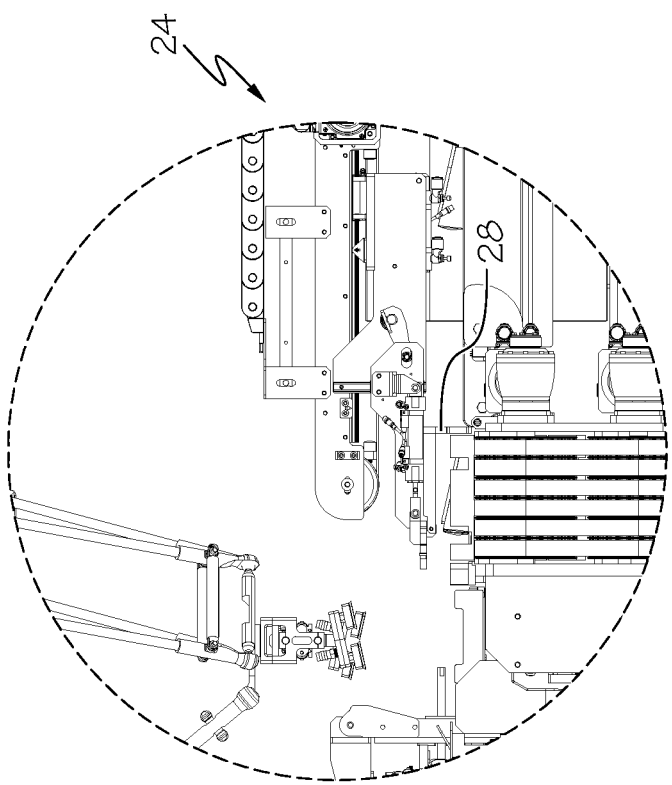
Figure 40D:
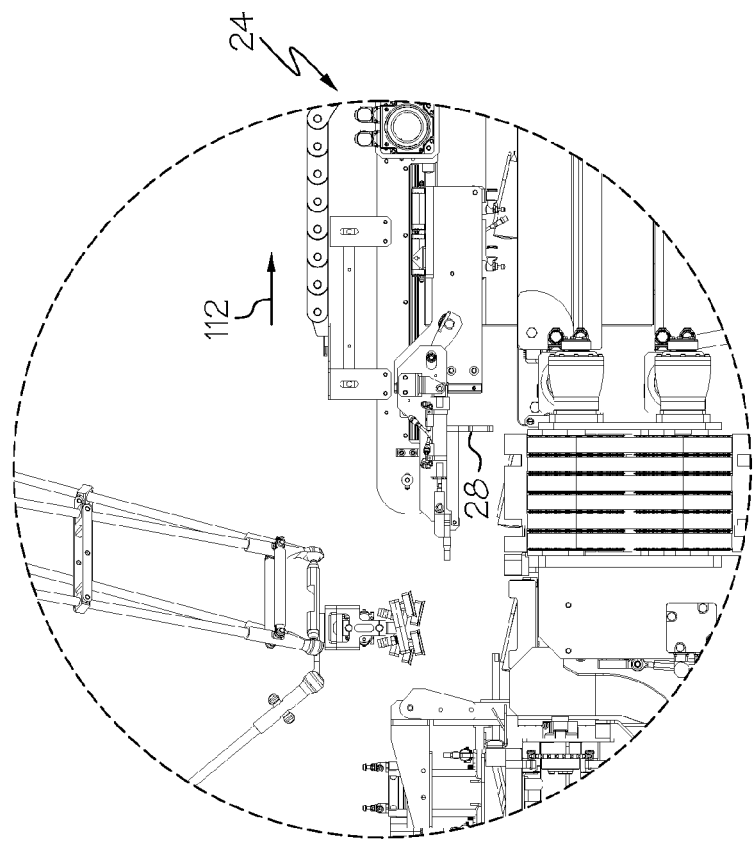
Figure 40C:
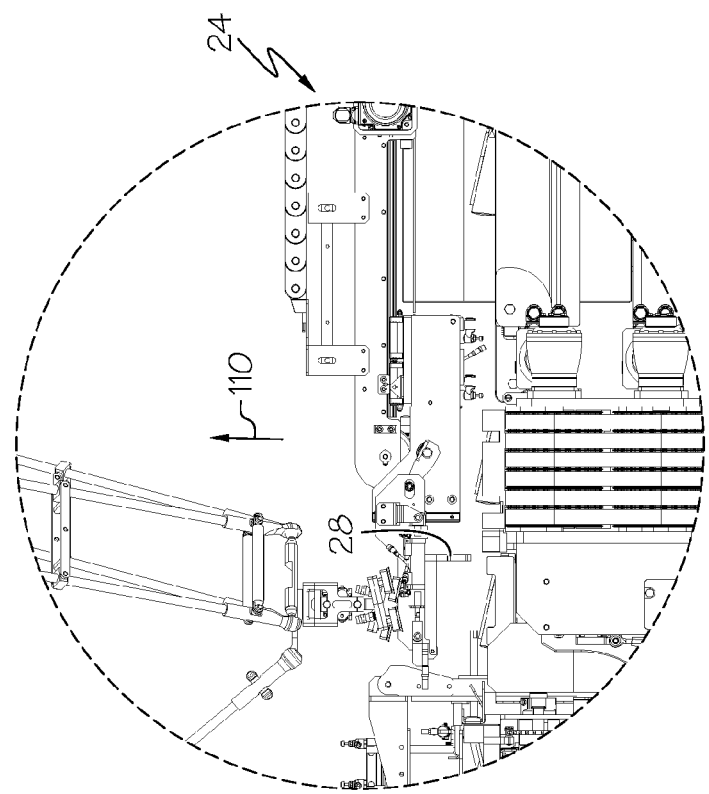
Figure 40E:
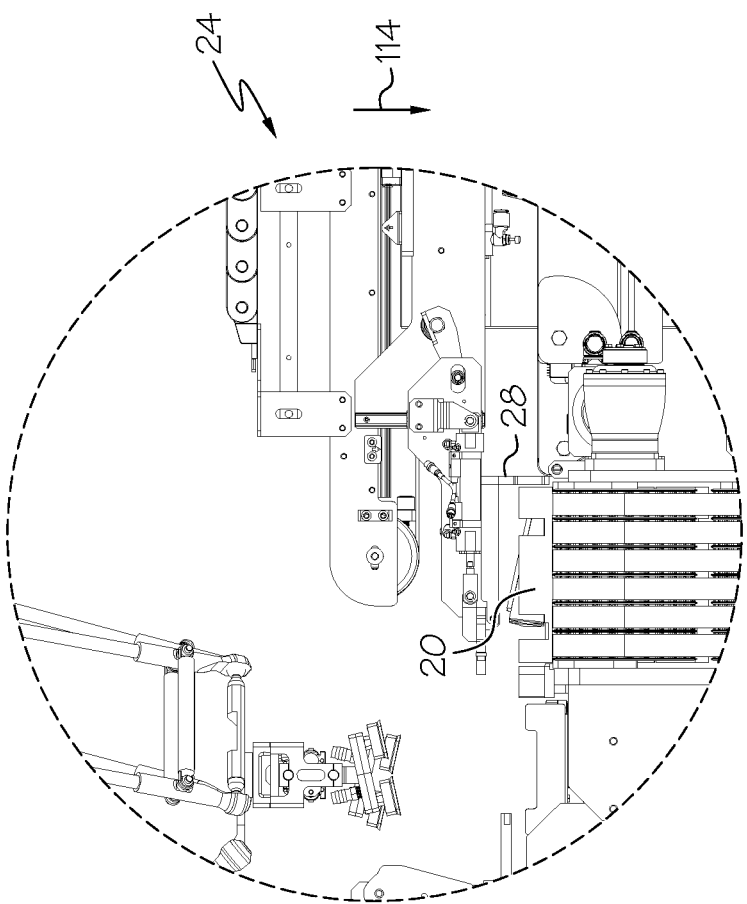

Turning to FIGS. 9 and 40E, after the pusher member 28 has been retracted, it moves downwardly, in the direction of arrow 114, where it awaits the delivery of the next batch of product carriers 20.

Once the product 18 has been moved to the product nest 26 via the pusher member 28, as shown in FIGS. 40A and 40B, the product nest 26 reorients the product 18, as will now be described with respect to FIGS. 22-39.

Figure 22A:
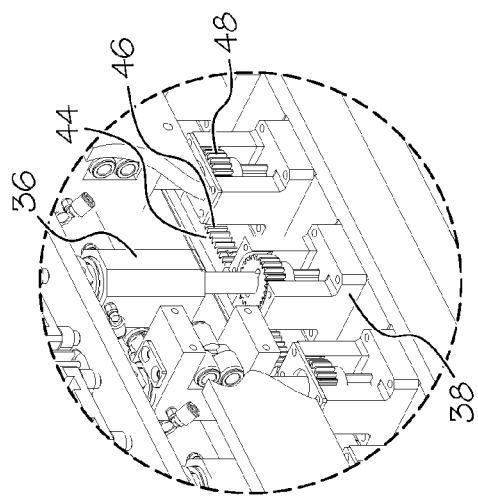
FIG. 22A shows a detailed view of a portion of the nesting assembly 16 of FIG. 22.
Figure 22:
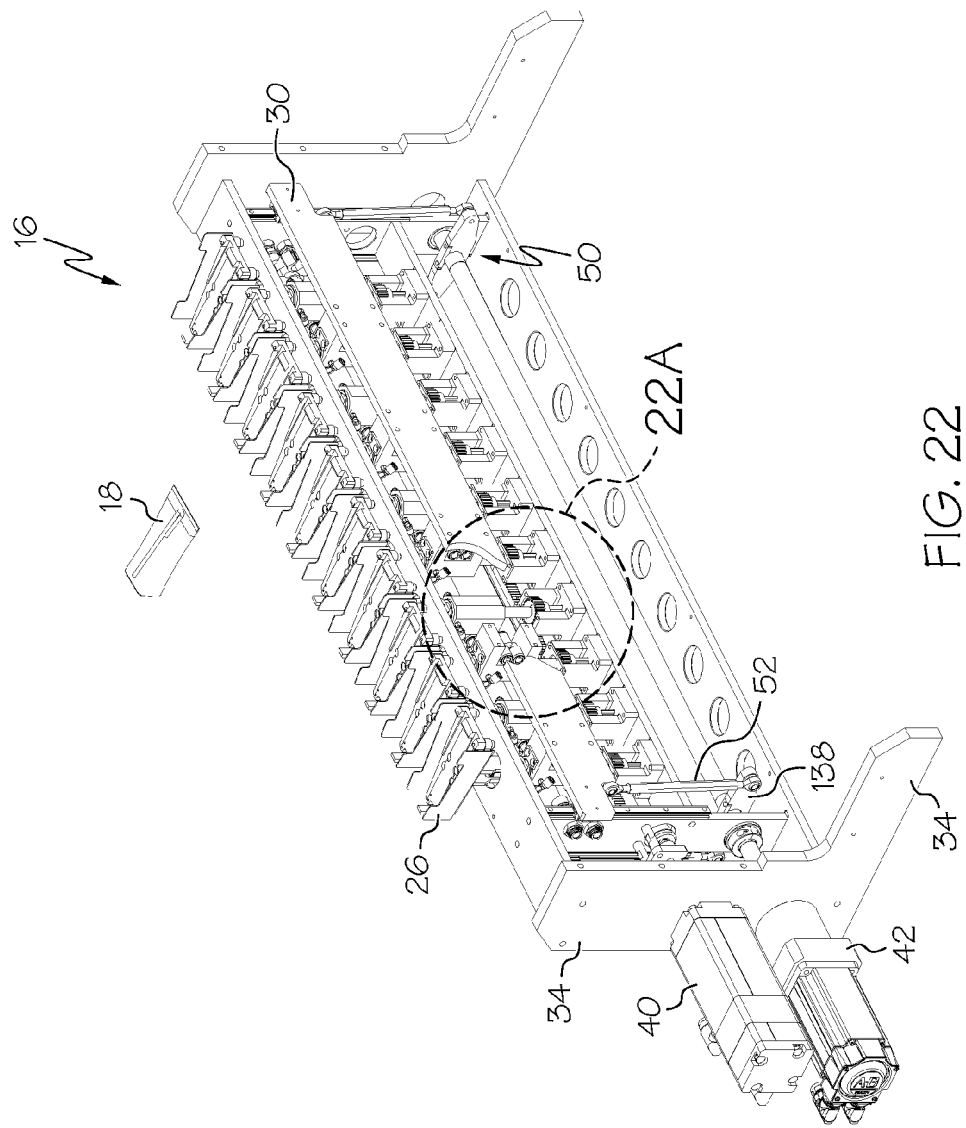
FIG. 22 shows a view of front of the nesting assembly 16.
Figure 22B:
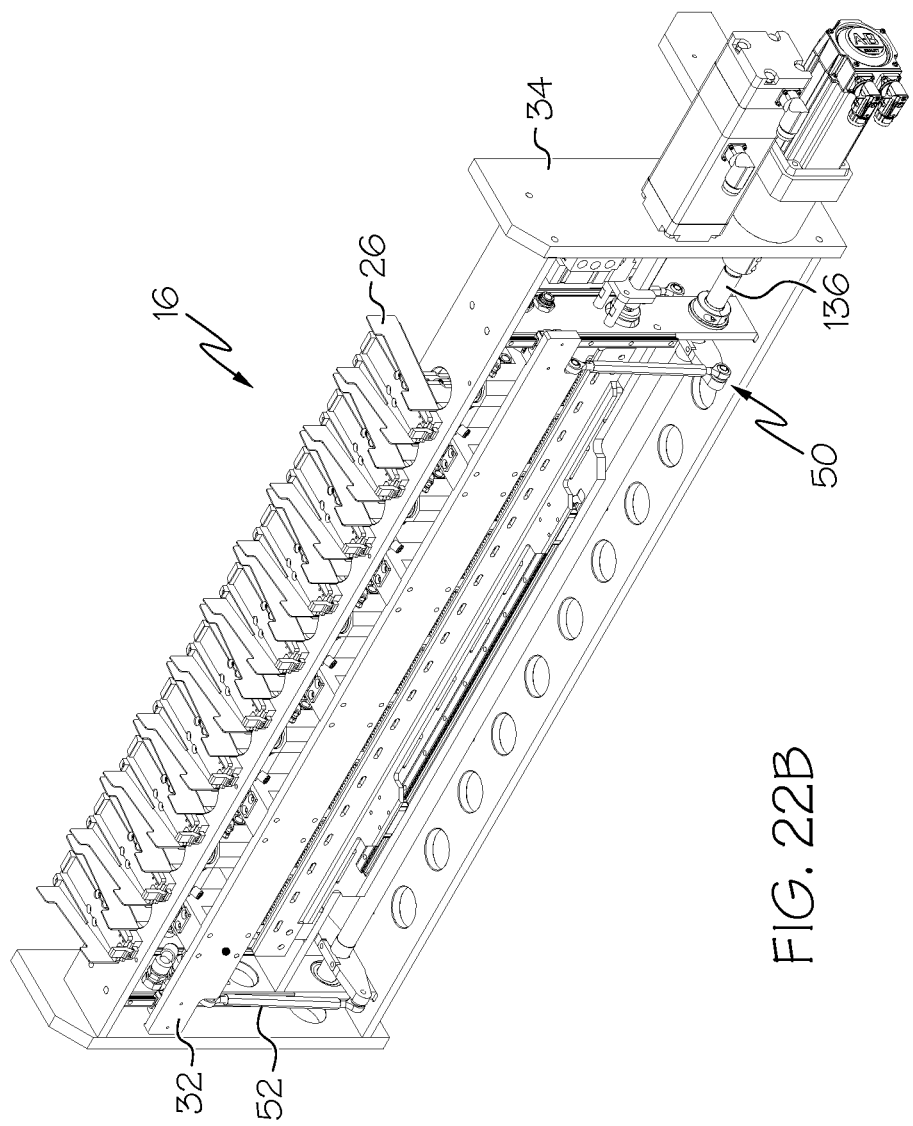
FIG. 22B shows a view of the back of the nesting assembly 16.

With regard to FIGS. 22, 22A, and 22B, the product nest 26 is part of the nesting assembly 16. In some embodiments, the product nests 26 are arranged in a row.

In some embodiments, the nesting assembly 16 further comprises a front lift plate 30, a back lift plate 32, a frame 34, mounting block 36 (FIGS. 42A, 42B), and a guide block 38. The guide block 38 is attached to the frame 34 and the mounting block 36 is attached to either a front lift plate 30 or back lift plate 32. In some embodiments, for example as shown in FIG. 22, every other mounting block 36 (e.g., $1^{st}$, $3^{rd}$, $5^{th}$, etc.) is attached to a front lift plate 30. Further, the mounting blocks 36 not attached to the front lift plate 30 (e.g., $2^{nd}$, $4^{th}$, $6^{th}$, etc.) are attached to the back lift plate 32.

In some embodiments, the nesting assembly 16 further comprises a rack drive 40 and a rocker drive 42, each of which is attached to the frame 34. The nesting assembly 16 also includes a rack 44 having teeth 46 which engage pinion gear 48. The pinion gear 48 resides within the guide block 38.

In some embodiments, the nesting assembly 16 further comprises a rocker assembly 50. The rocker assembly 50 is connected to the rocker drive 42 via rocker drive shaft 136. Additionally, the rocker assembly 50 comprises rocker arms 138 and connecting arms 52, which are attached to the rocker arms 138 and the front and back lift plates 30, 32. In this way, the rocker drive 42 can lift the front lift plate 30 while lowering the back lift plate 32 via connecting arms 52. The rocker drive 42 can further lift the back lift plate 32 while lowering the front lift plate 30.

The nesting assembly 16 is configured to reorient at least some of the products 18, along with product nests 26, in order to facilitate packing of the products 18 within packaging 62 (FIGS. 41A-C). In order to reorient the products 18, the nesting assembly 16 rotates the product nests 26 via the rack drive 40, rack 44, and pinion gears 48, as described, for example, below.

Figure 42A:
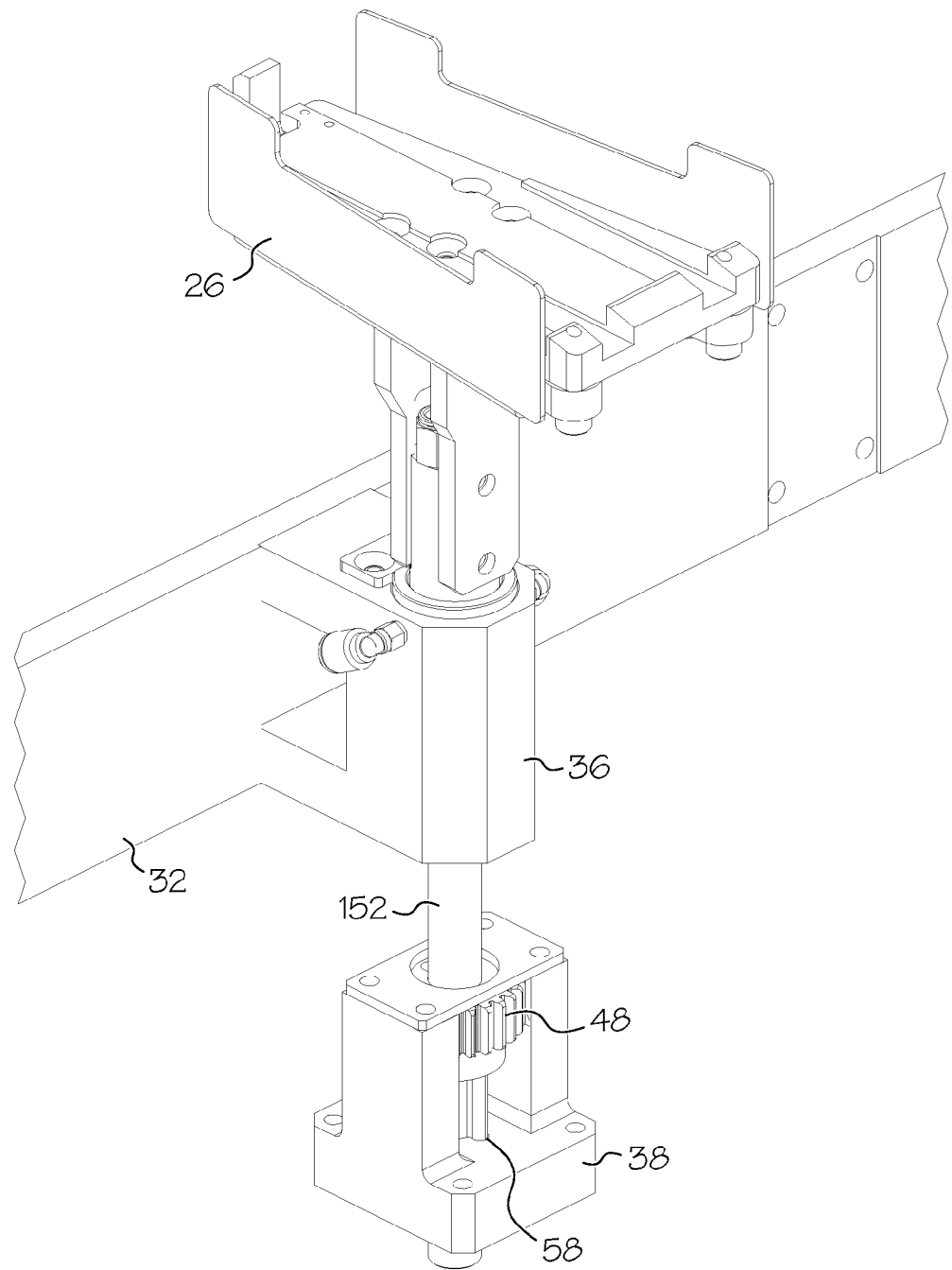
FIG. 42A shows a detailed view of a portion of the nesting assembly 16.
Figure 42B:
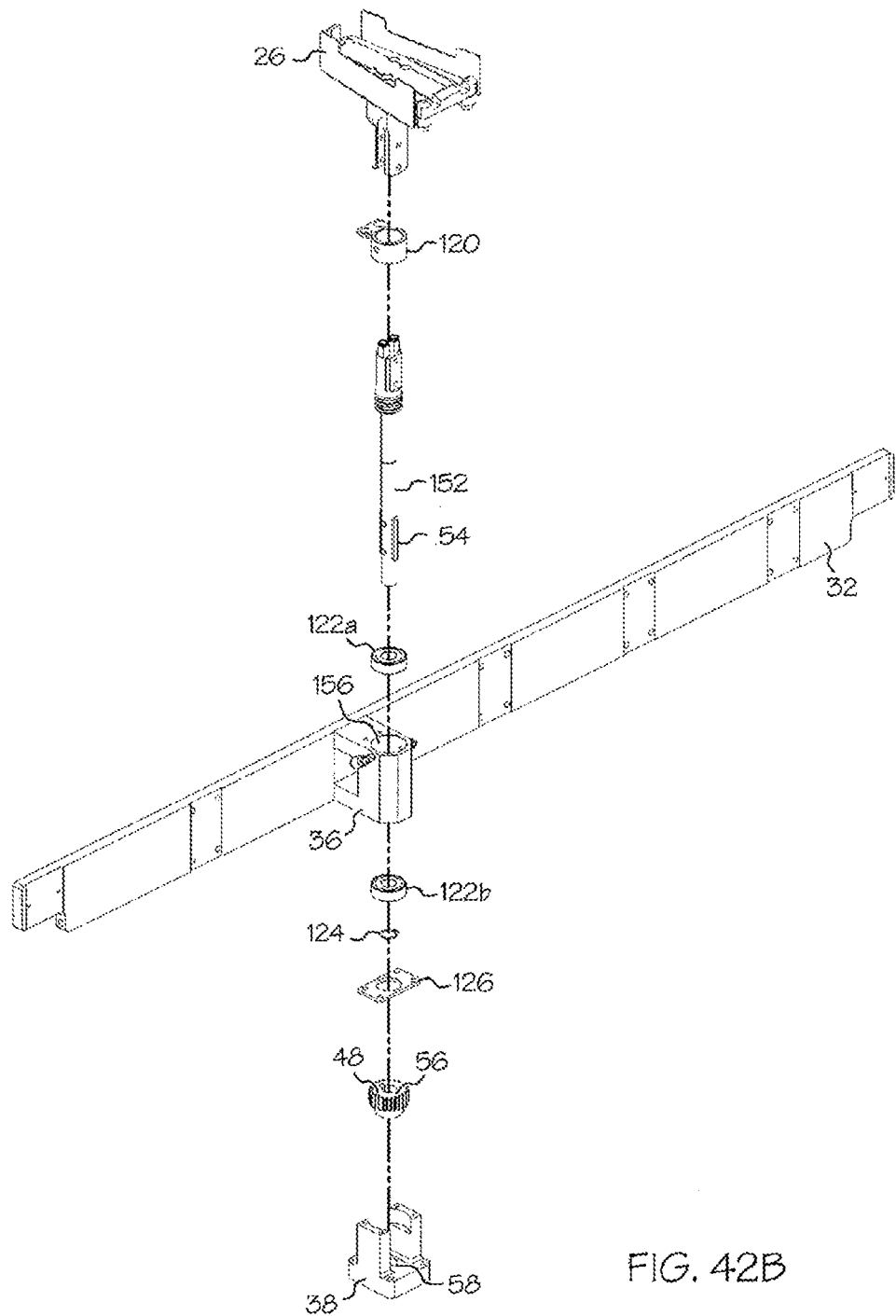
FIG. 42B shows an exploded view of the portion of the nesting assembly 16 of FIG. 42A.

With regard to FIGS. 42A and 42B, the pinion gear 48 has a spindle 152 extending therethough. The spindle 152, in turn, is attached to the product nest 26 and extends through the mounting block 36, for example through the bore 156. Consequently, when the mounting block 36 is raised or lowered, via the rocker assembly 50 (FIG. 22) and front or back lift plate 30, 32, the spindle 152 is accordingly raised or lowered.

With further regard to FIGS. 42A and 42B, in some embodiments, the nesting assembly 16 comprises a slip ring 120, attached to the mounting block 36, bearings 122a, 122b (e.g., ball bearings), a retaining ring 124, and a retaining plate 126. Additionally, in some embodiments, the spindle 152 has a drive key 54. The drive key 54 is configured to selectively engage the keyway 56 in pinion gear 48 and/or the keyway 58 in the guide block 38, as described in greater detail below.

Turning to FIGS. 23, 23A, and 23B, prior to deposit of the product 18 within the product nest 26, the nesting assembly 16 is in a first configuration 180, the rocker arms 138 are in a neutral (e.g., horizontal) configuration, the front lift plate 30 is level with the back lift plate 32, and all of the products nests 26 are level with one another. Further, the drive key 54 is at least partially engaged with the keyway 56 of the pinion gear 48 and the keyway 58 of the guide block 38. When the drive key 54 is at least partially engaged with the keyway 56 of the pinion gear 48 and the keyway 58 of the guide block 38, the pinion gear 48 is prevented from rotating. Moreover, the product nest 26, which is coupled to the pinion drive key 54 via spindle 152, is also prevented from rotating. In this first configuration 180, the nesting assembly 16 is ready to accept product 18 from the cross pusher 24, as shown in FIGS. 5 and 6.

Figure 24A:
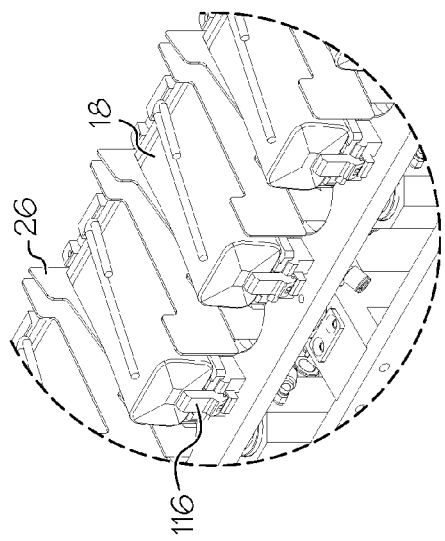
FIG. 24A shows a detailed view of a portion of the nesting assembly 16 of FIG. 24B.
Figure 24B:
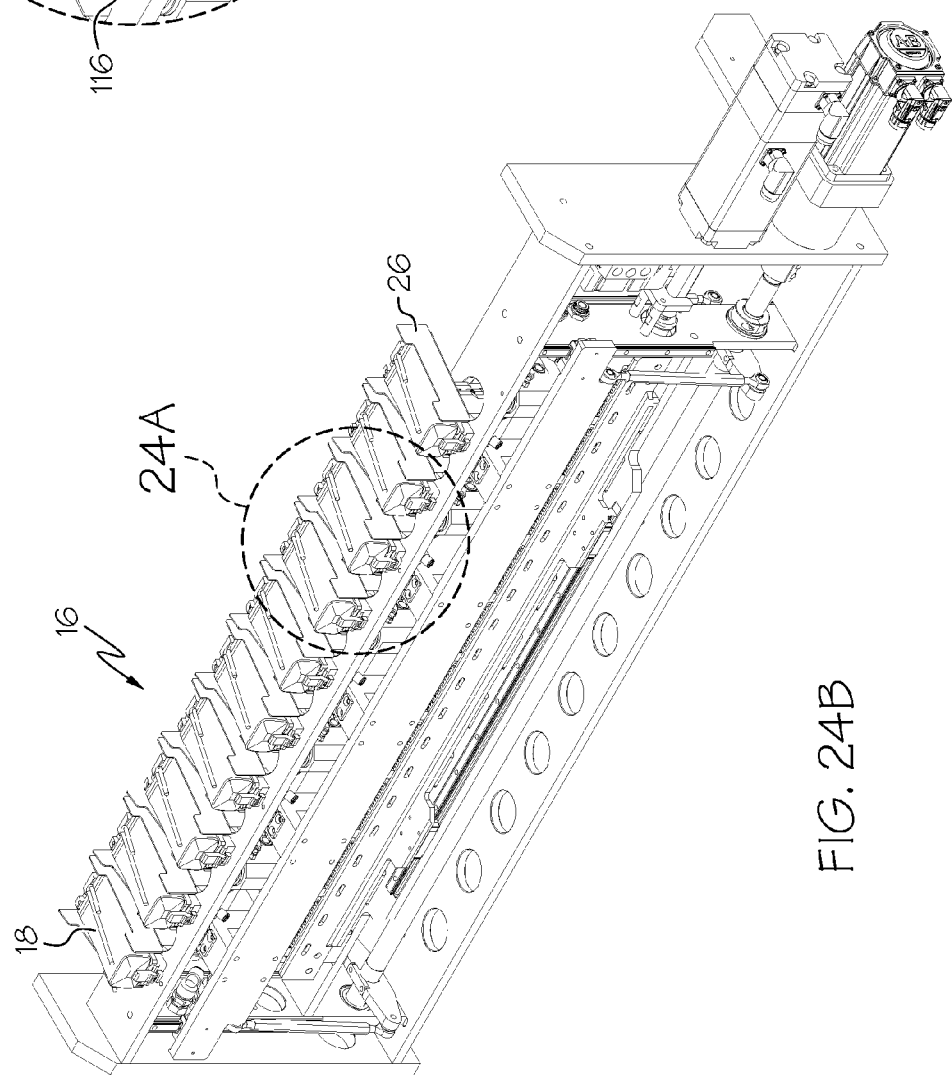
FIG. 24B shows a view of the back of the nesting assembly 16.

With regard to FIGS. 24, 24A, and 24B, the nesting assembly 16 is shown after product 18 has been pushed into the products nests 26, for example by cross pusher 24 (FIG. 6). In FIG. 24A, the product nests 26 are shown having product guides 116 in a closed position for locating the product 18 within the product nest 26. With the product 18 securely located within the product nests 26, the product nests 26, along with product 18, are ready to be reoriented.

Figure 25B:
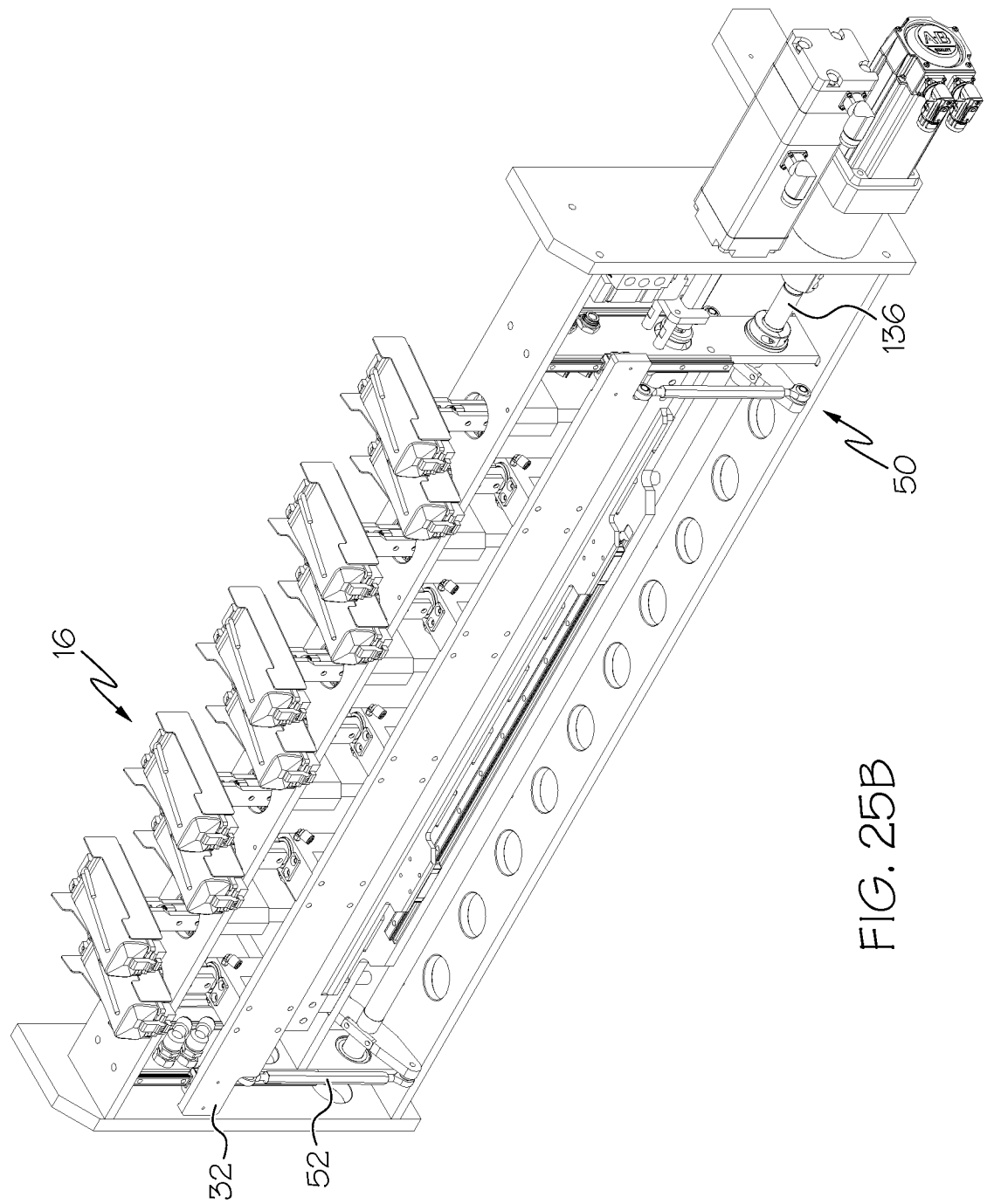
FIG. 25B shows a view of the back of the nesting assembly 16.

As shown in FIGS. 25, 25A, and 25B, in order to reorient (e.g., rotate) the product nests 26, the front lift plate 30 is moved upwardly via the rocker assembly 50. In particular, the rocker drive 42 rotates the rocker drive shaft 136 which, in turn, rotates the rocker arms 138. The rocker arms 138 push the front lift plate 30 upwardly via connecting arms 52 and simultaneously pull the back life plate 32 downwardly. Since the mounting blocks 36 are attached to the front lift plate 30 or back lift plate 32, they move in concert (upwardly or downwardly) with the respective lift plate 30, 32. In addition, the spindles 152 move upwardly or downwardly with their respective mounting blocks 36, as shown in FIG. 25A. As a consequence, the drive key 54 of the respective spindle 152 engages either the pinion gear 48 or, alternatively, the guide block 38. In some embodiments, for example as shown in FIG. 25A, adjacent spindles 152 move in opposite directions (upwardly or downwardly). The spindles 152a having drive keys 54 engaged with guide blocks 38 are prevented from rotating as the pinion gears 48 surrounding these spindles 152a rotate freely around the spindles 152a; in contrast, spindles 152b having drive keys 54 engaged with pinion gears 48 are configured to rotate with the pinion gear 48 and rack 44. In FIGS. 25, 25A, and 25B, the nesting assembly 16 is in a second configuration 182.

Figure 26B:
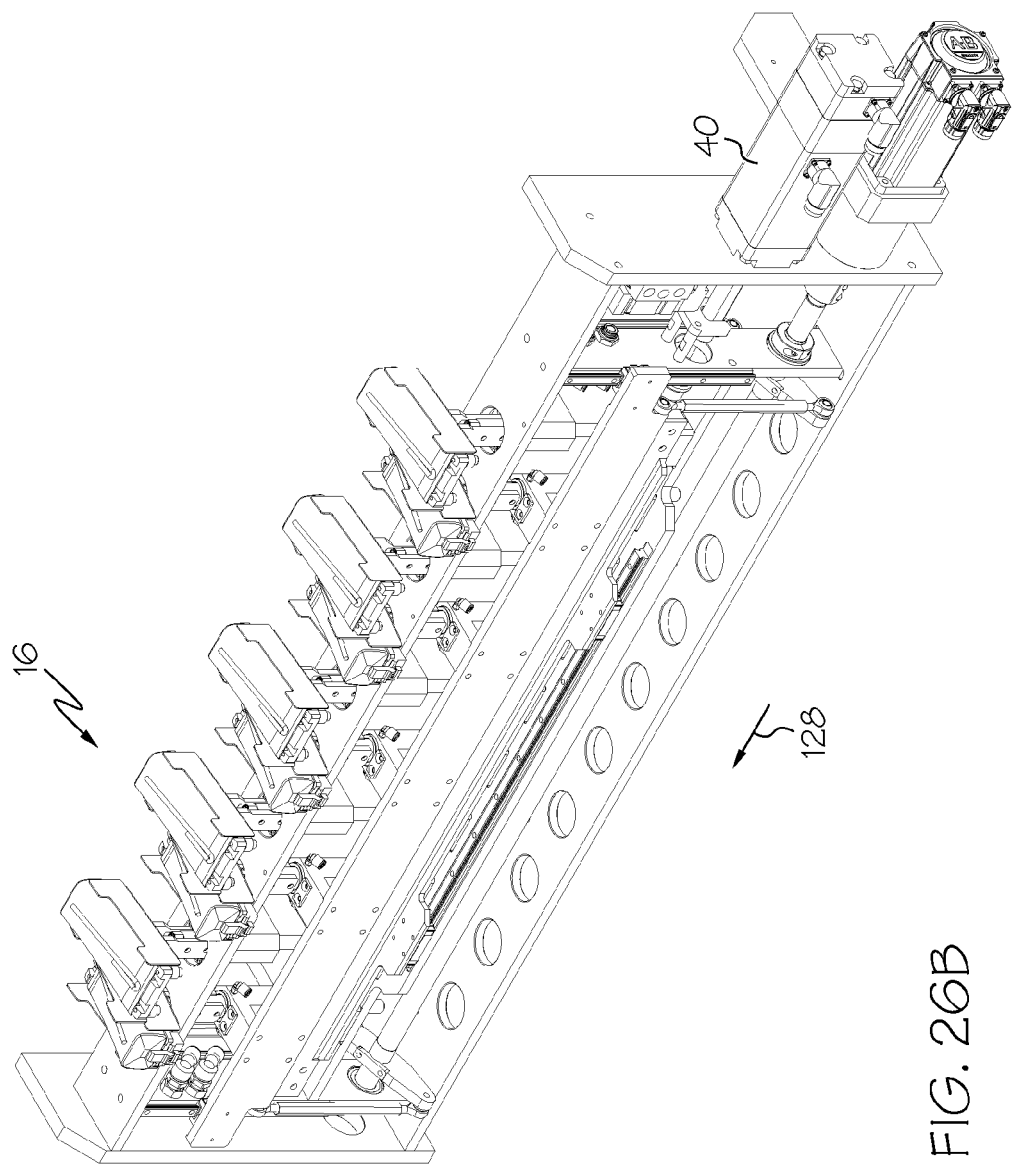
FIG. 26B shows a view of the back of the nesting assembly 16.

As shown in FIGS. 26 and 26B (there is no FIG. 26A), every other product nest 26 has been rotated 180° from its prior configuration (shown in FIGS. 25, 25A, and 25B) and the nesting assembly 16 is in a third configuration 184. The product nests 26 are rotated via rack drive 40, which moves the rack 44 (FIG. 25A) in the direction of arrow 128. The rack 44, in turn, causes pinion gears 48 to rotate. The pinion gears 48 engaged to spindles 152b via drive keys 54 thereby cause the spindles 152b to rotate. Although illustrated with a single rack 44, it will be appreciated that more than one rack can be employed in order to rotate some, or all, of the product nests 26 in any direction or combination of direction, with varying degrees of rotation (e.g., 0°-360°), in order to satisfy the ultimate packaging configuration.

Figure 27B:
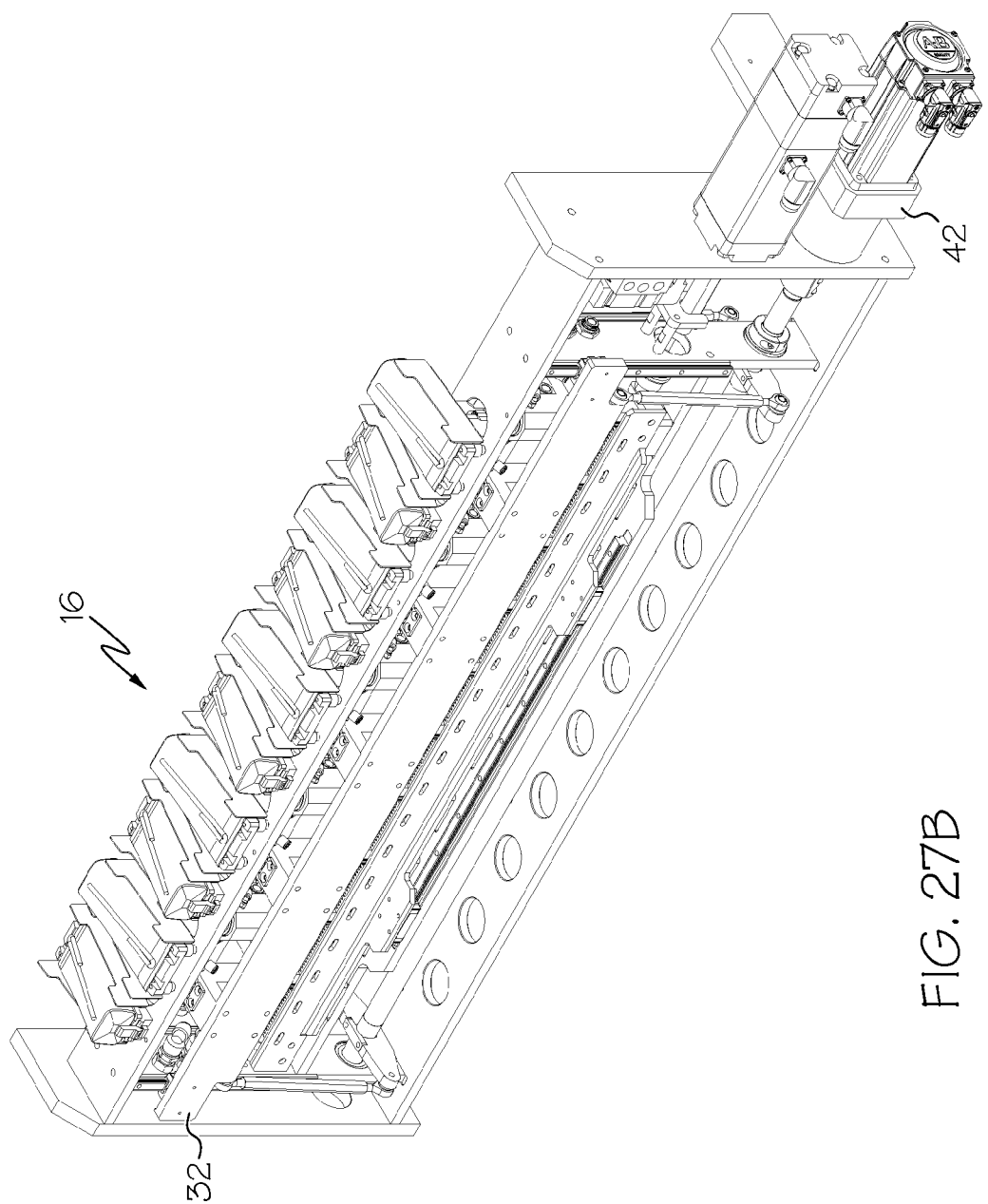
FIG. 27B shows a view of the back of the nesting assembly 16.

With regard to FIGS. 27, 27A, and 27B, the rocker arms 138 are returned to a neutral configuration and the nesting assembly 16 is in a fourth configuration 186. In particular, the rocker drive 42 moves the front lift plate 30 downwardly and the back lift plate 32 upwardly to bring the product nests 26 into alignment with one another. Additionally, as shown in FIG. 27A, the drive keys 54 are again engaged to both the pinion gears 48 and the guide blocks 38, thereby locking the spindles 152 in place and preventing inadvertent rotation of the product nests 26.

Turning to FIGS. 28 and 28 B (there is no FIG. 28A), the products 18 are picked from the product nests 26, for example via robot 60, as shown in FIGS. 11A, 11B, 12A, and 12B, and as discussed in greater detail below. The nesting assembly 16 remains in the fourth configuration 186 during this process.

With regard to FIGS. 29 and 29B, after the products 18 have been removed from the product nests 26, the rocker drive 42 raises the front lift plate 30 and lowers the back lift plate 32. As illustrated in FIGS. 29 and 29B, the nesting assembly 16 is in a fifth configuration 188. In some embodiments, the fifth configuration is the same as the third configuration 184 shown in FIG. 26.

Figure 30:
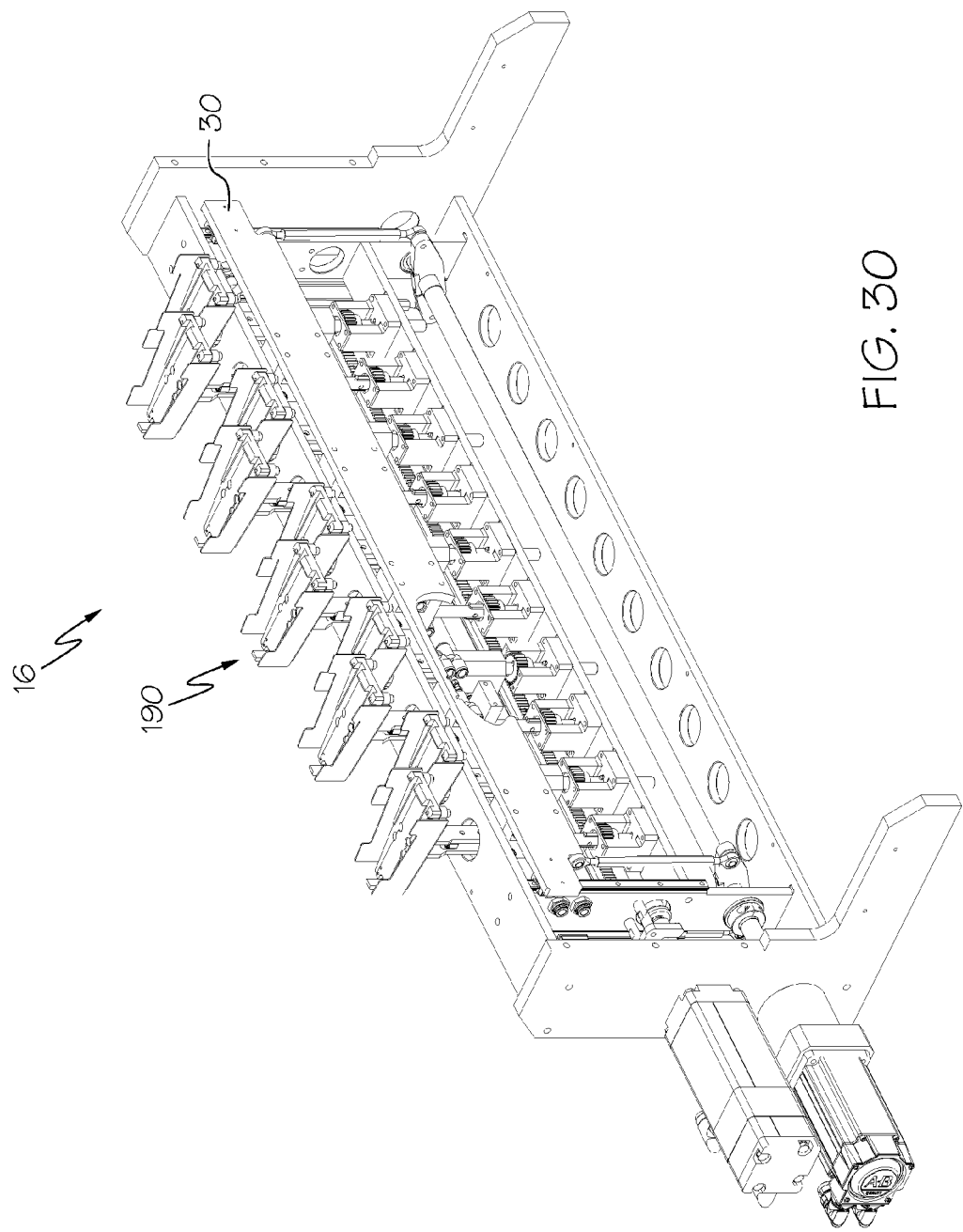
FIG. 30 shows a view of front of the nesting assembly 16.

In FIGS. 30 and 30B, the rack drive 40 moves the rack 44 (FIG. 25A) in the direction of arrow 130. This, in turn, rotates some of the product nests 26 (those in the upward position, e.g., coupled to the front mount plate 30) such that the nesting assembly 16 is in the sixth configuration 190, as shown in FIGS. 30 and 30B. In some embodiments, the sixth configuration 190 is the same as the second configuration 182 of FIG. 25.

Figure 31B:
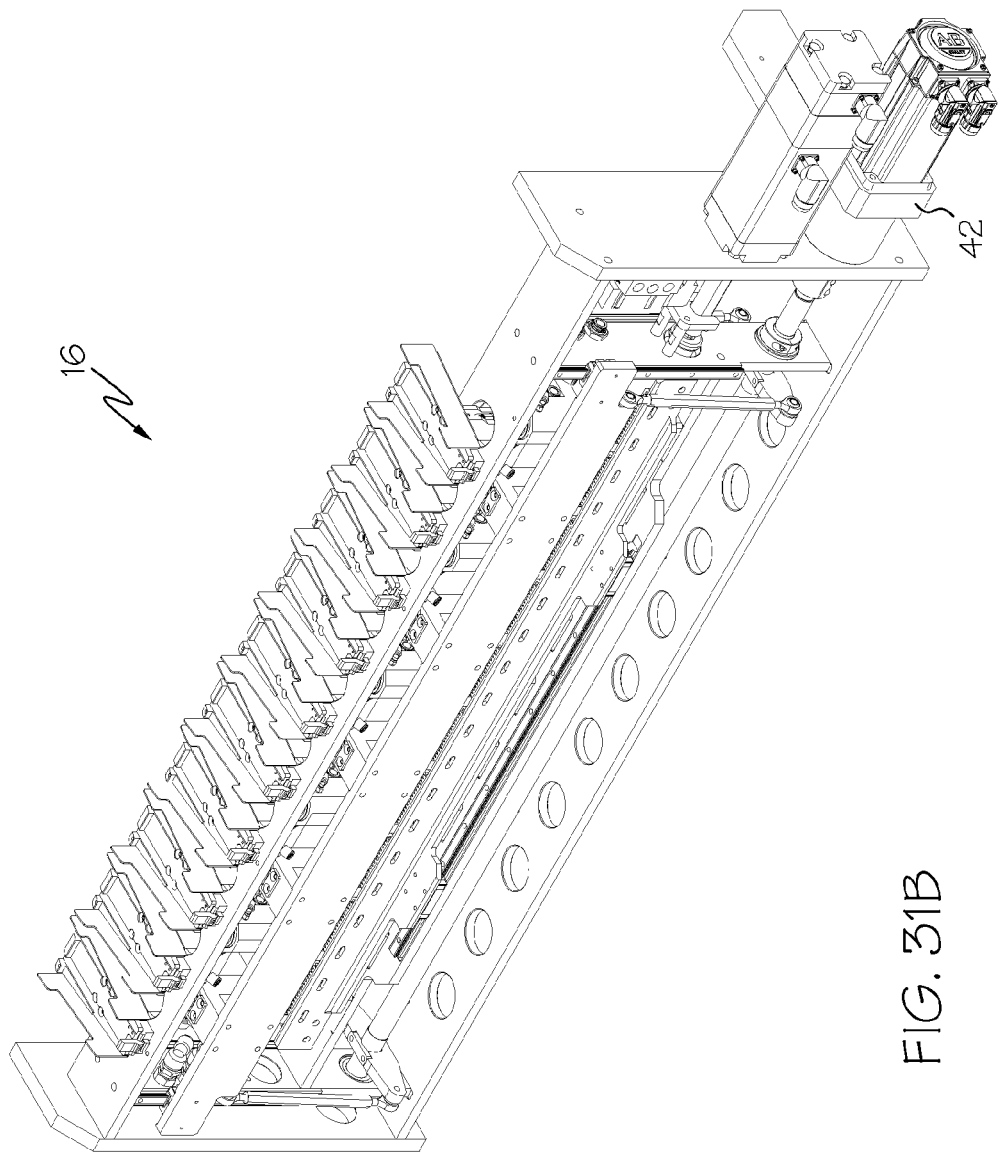
FIG. 31B shows a view of the back of the nesting assembly 16.

Next, as shown in FIGS. 31 and 31B, the rocker drive 42 rotates the rocker arms 138 and returns the product nests 26 to a natural configuration. As illustrated, the nesting assembly 16 is again ready to receive product 18 into the empty product nests 26; the nesting assembly 16 is shown in a seventh configuration 192. In some embodiments, the seventh configuration 192 is the same as the first configuration 180.

Figure 32B:
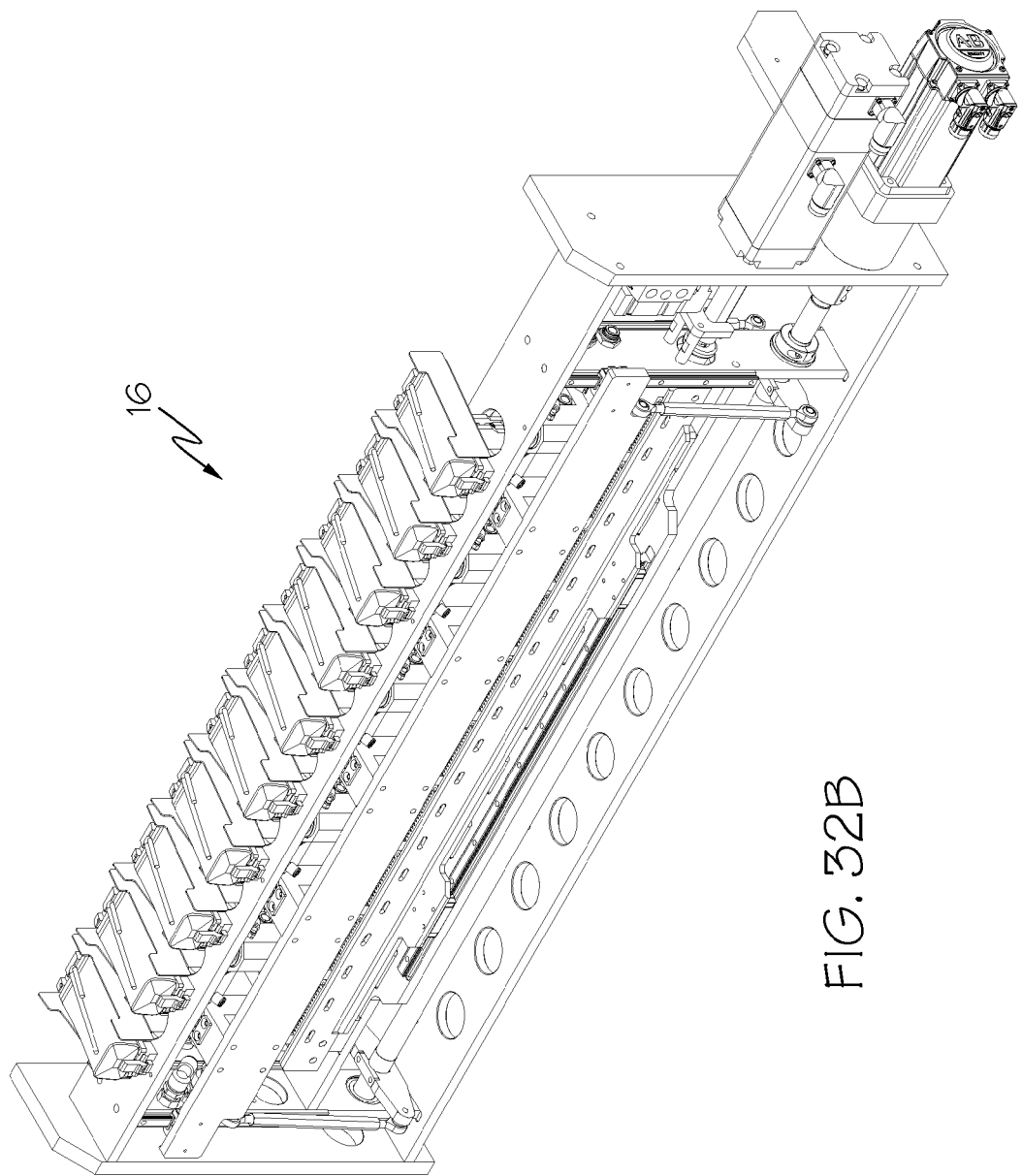
FIG. 32B shows a view of the back of the nesting assembly 16.

Turning to FIGS. 32 and 32B, the nesting assembly 16 remains in the seventh configuration 192 as the product 18 is again loaded into the product nests 26, for example via the cross pusher 24 (FIGS. 40A-40E).

Figure 33B:
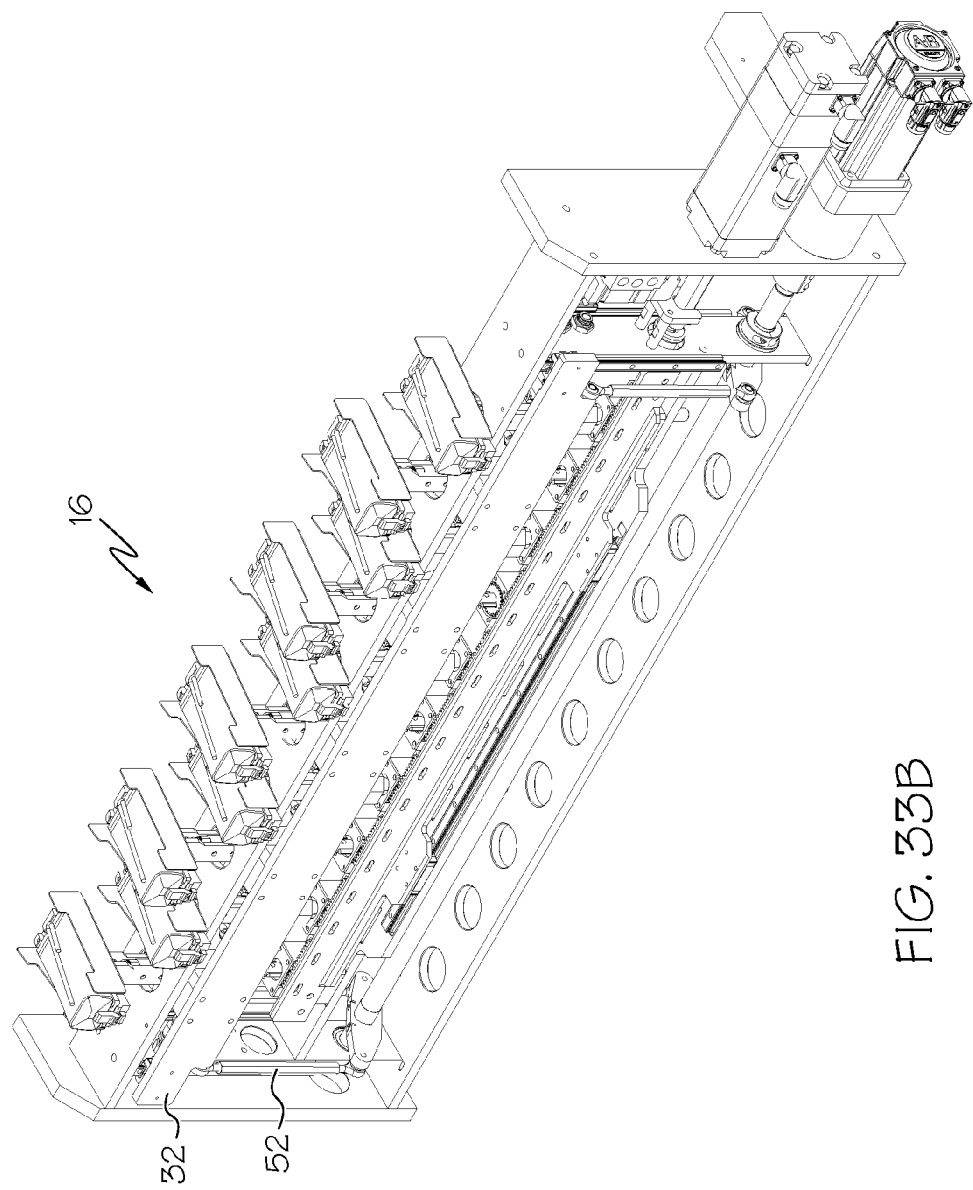
FIG. 33B shows a view of the back of the nesting assembly 16.

In FIGS. 33, 33A, and 33B, the nesting assembly 16 is shown in an eighth configuration 194. In the eighth configuration 194, the front lift plate 30 is moved downwardly via rocker drive 42, connecting arms 52, and rocker arms 138; the back lift plate 32 is moved upwardly. The mounting blocks 36 attached to the back lift plate 32 are raised along with the back lift plate 32 and the corresponding drive keys 54 are engaged the respective pinion gears 48, as shown in greater detail in FIG. 33A. Further, the mounting blocks 36 attached to the front lift plate 30 are lowered along with the front lift plate 30 and the corresponding drive keys 54 are engaged to the guide block 38, thereby preventing rotation of the respective spindles 152.

Figure 34B:
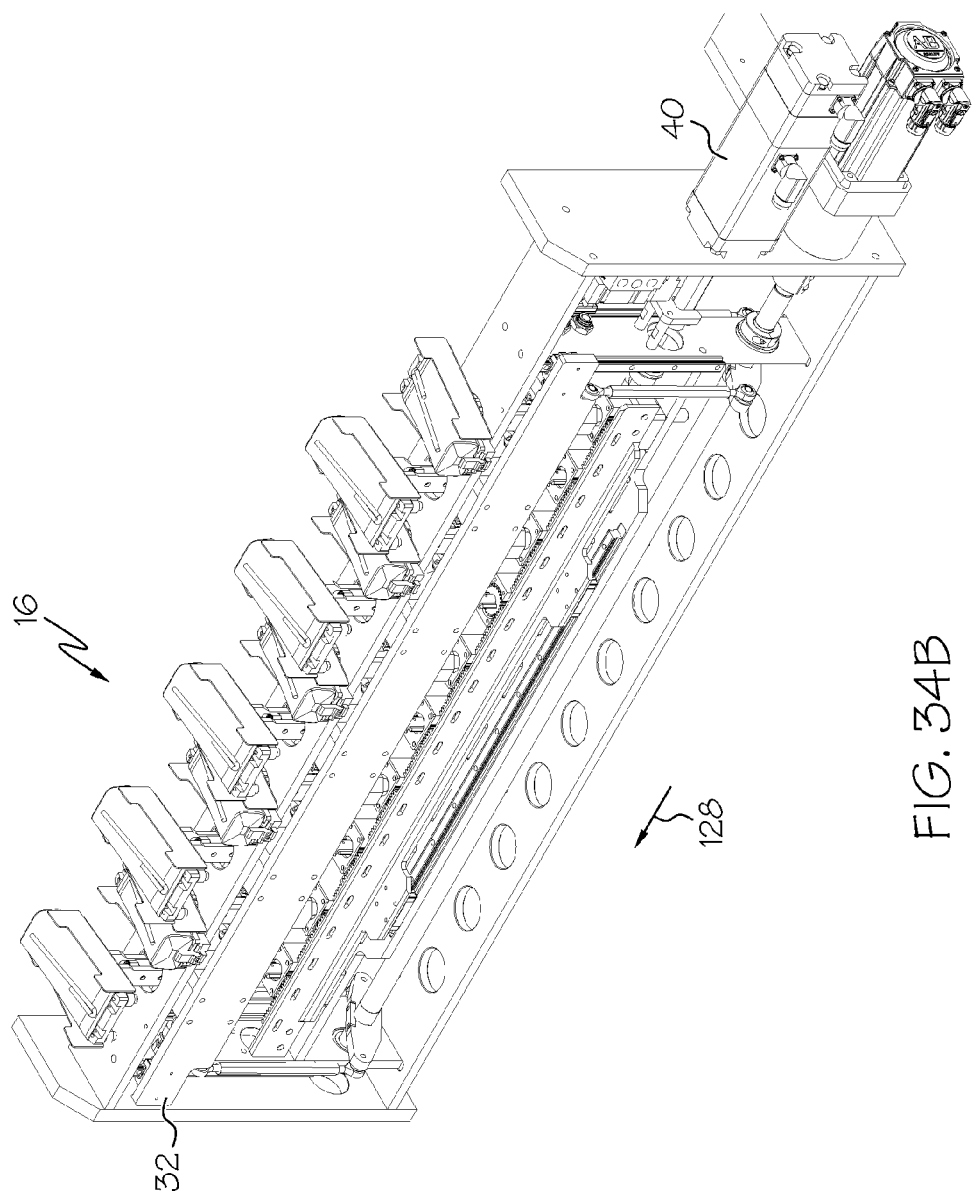
FIG. 34B shows a view of the back of the nesting assembly 16.
Figure 37B:
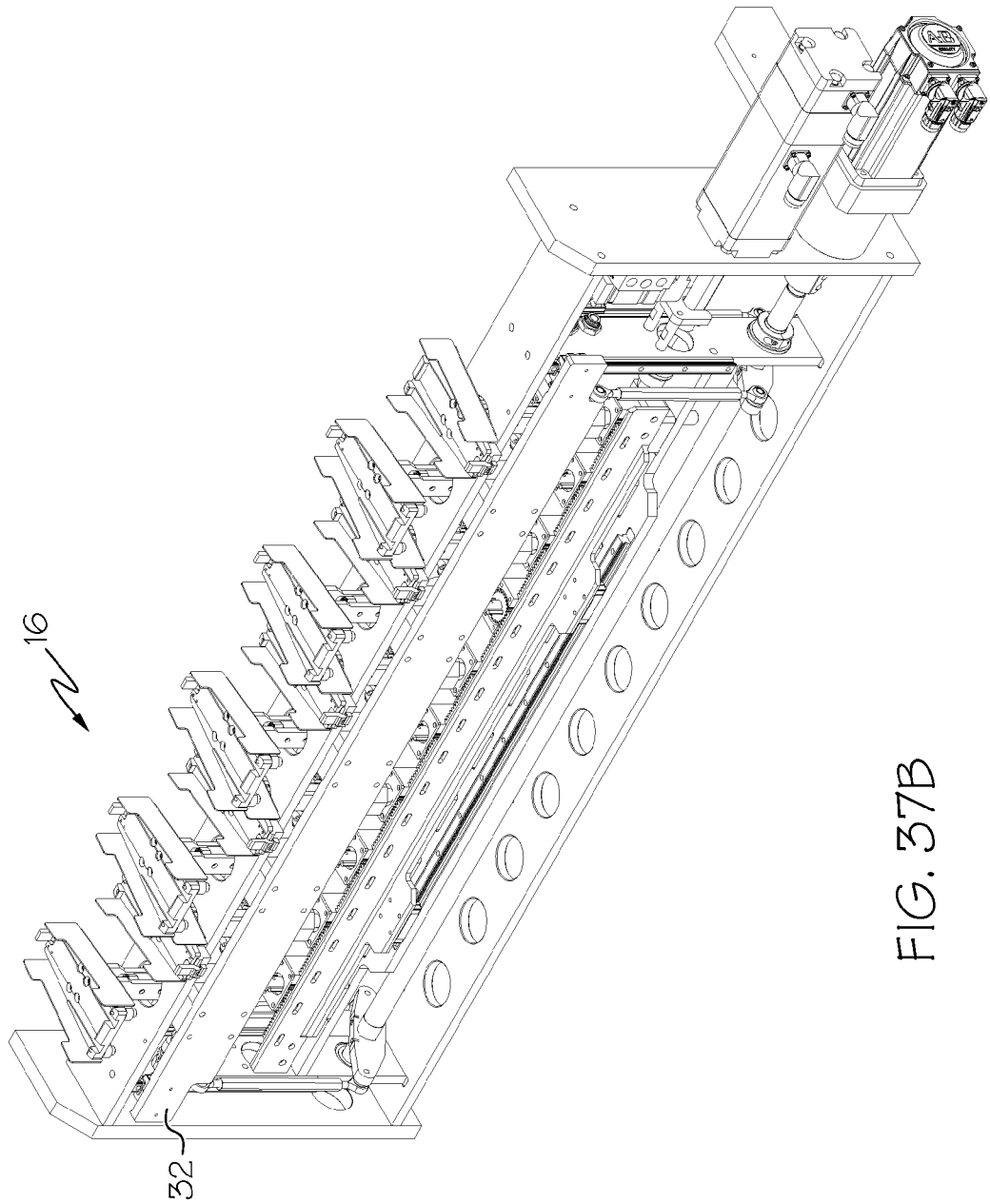
FIG. 37B shows a view of the back of the nesting assembly 16.

FIGS. 34 and 34B illustrate the product nests 26 coupled to the back lift plate 32 after they have been rotated 180° from their previous orientation. As shown in FIGS. 34 and 34B, the nesting assembly 16 is in a ninth configuration 196. The product nests 26 are rotated via rack drive 40, which moves the rack 44 (FIG. 33A) in the direction of arrow 128 (FIG. 34B). The rack 44, in turn, causes pinion gears 48 to rotate. The pinion gears 48 engaged to spindles 152a via drive keys 54 thereby cause the spindles 152a to rotate. Meanwhile, spindles 152b (FIG. 25A) are held stationary, as their drive keys 54 are engaged to the respective guide blocks 38. Although illustrated with a single rack 44, it will be appreciated that more than one rack can be employed in order to rotate some, or all, of the product nests 26 in any direction or combination of direction, with varying degrees of rotation (e.g., 0°-360°), in order to satisfy the ultimate packaging configuration.

FIGS. 35 and 35B show the nesting assembly 16 after the rocker drive 42 has returned the rocker arms 138 to a neutral position. In FIGS. 35 and 35B, the nesting assembly 16 is in a tenth configuration 198.

Figure 19:
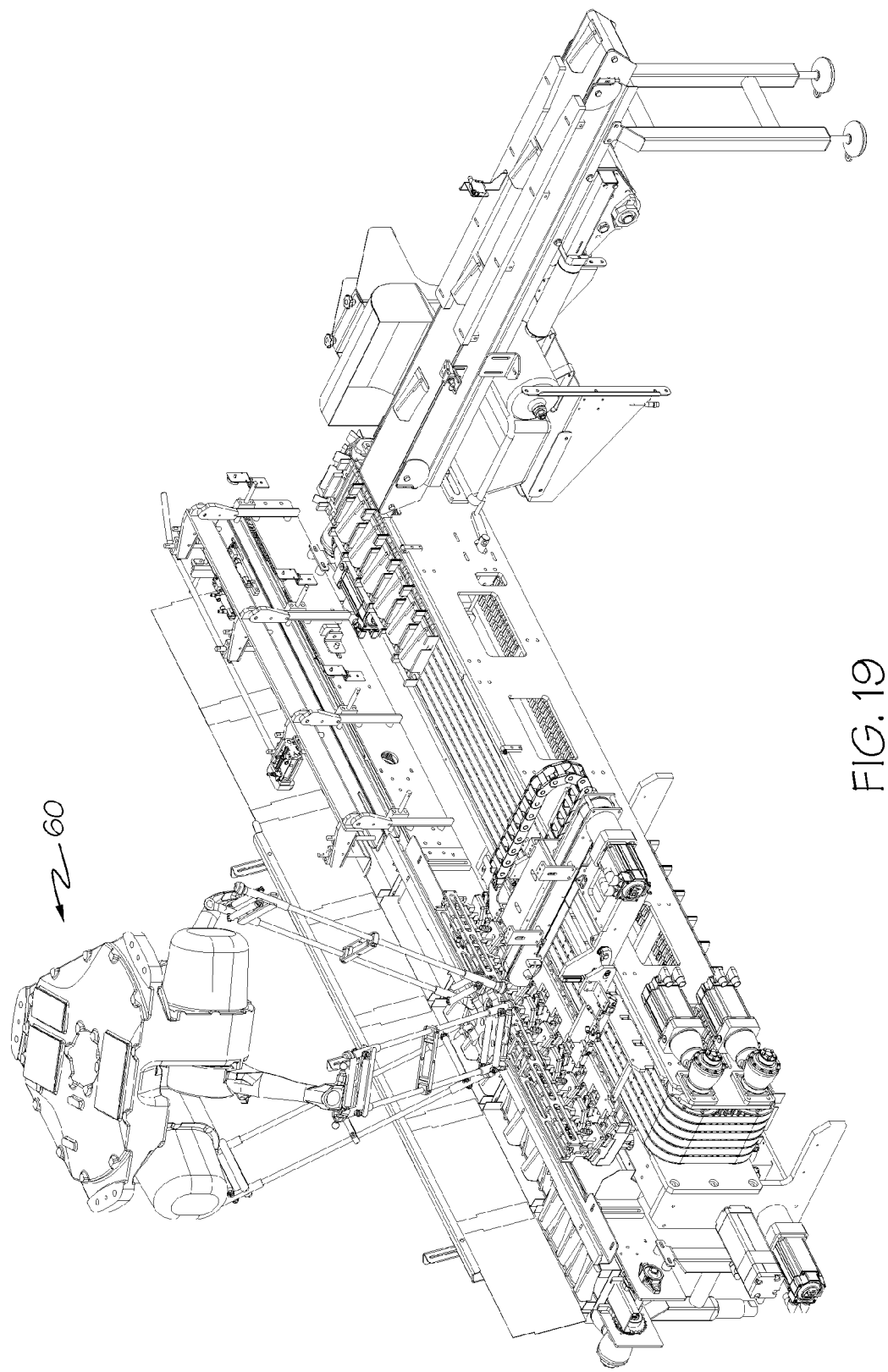
Figure 20:
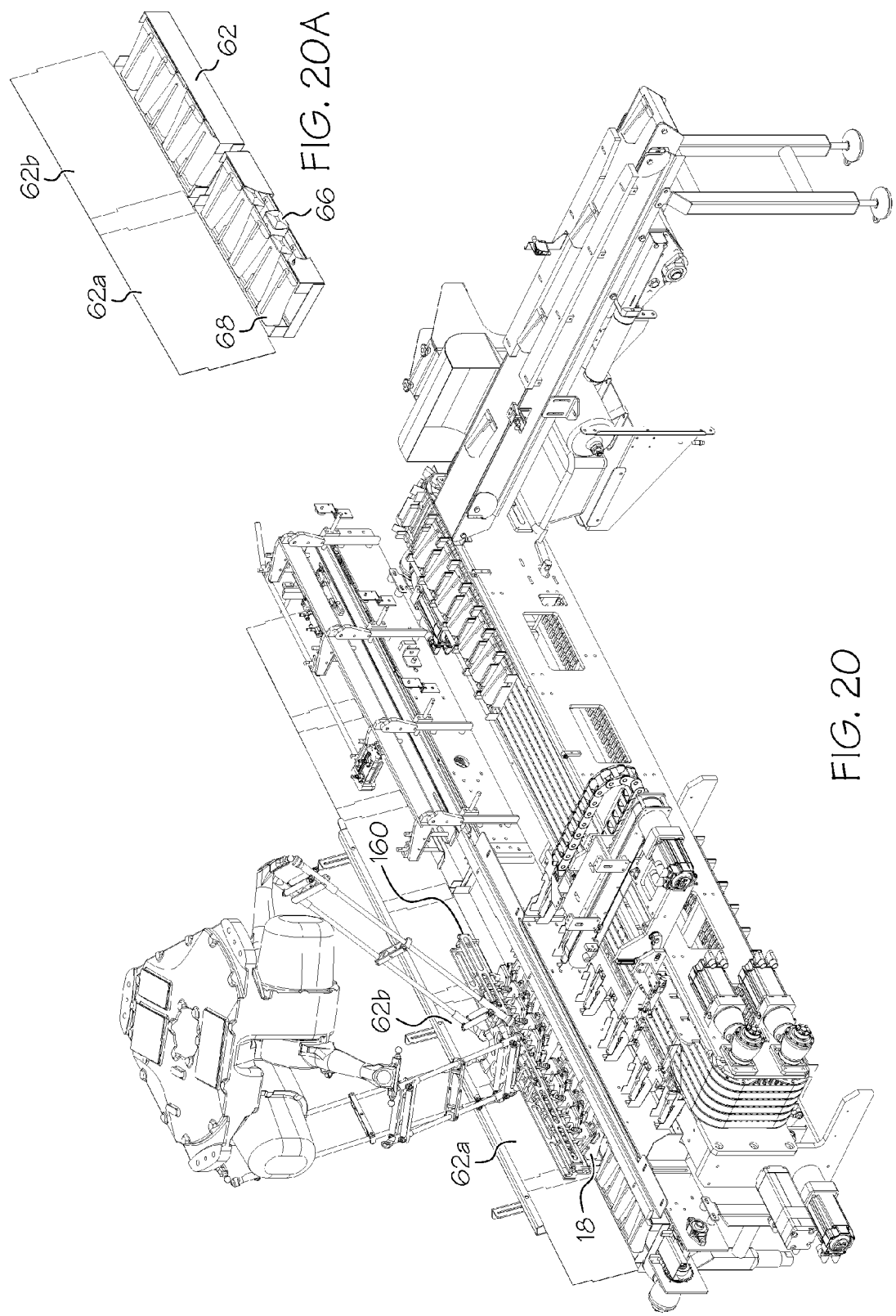

In FIGS. 36 and 36B, the nesting assembly 16 is again shown in the tenth configuration 198 after the products 18 have been removed from the product nests 26, for example via robot 60, as illustrated in FIGS. 19, 20, and 20A, and as discussed in greater detail below. As further shown in FIGS. 20, 20A, and 36, the second layer 68 of product 18 is placed on top of the first layer 66 of FIG. 28. It will be appreciated that the products 18 of the second layer 68 are oriented in a direction opposite the products 18 of the first layer 66 so that the products 18 can be stacked. It will further be appreciated that other orientations of products 18 may be used, depending upon the shape of the products 18, shape of the packaging 62 (FIG. 41A), and desired organization of the products 18 within the packaging 62.

After the products 18 have been removed from the product nests 26, the product nests 26 need to be reoriented in order to accept new products from the cross pusher 24 (FIG. 6). Consequently, and with regard to FIGS. 37 and 37B, the front lift plate 30 is moved downwardly and the back lift plate 32 is moved upwardly; in this configuration, the nesting assembly 16 is in the eleventh configuration 200. In some embodiments, the eleventh configuration 200 is the same as the ninth configuration 196 (FIGS. 33 and 33B).

Figure 38:
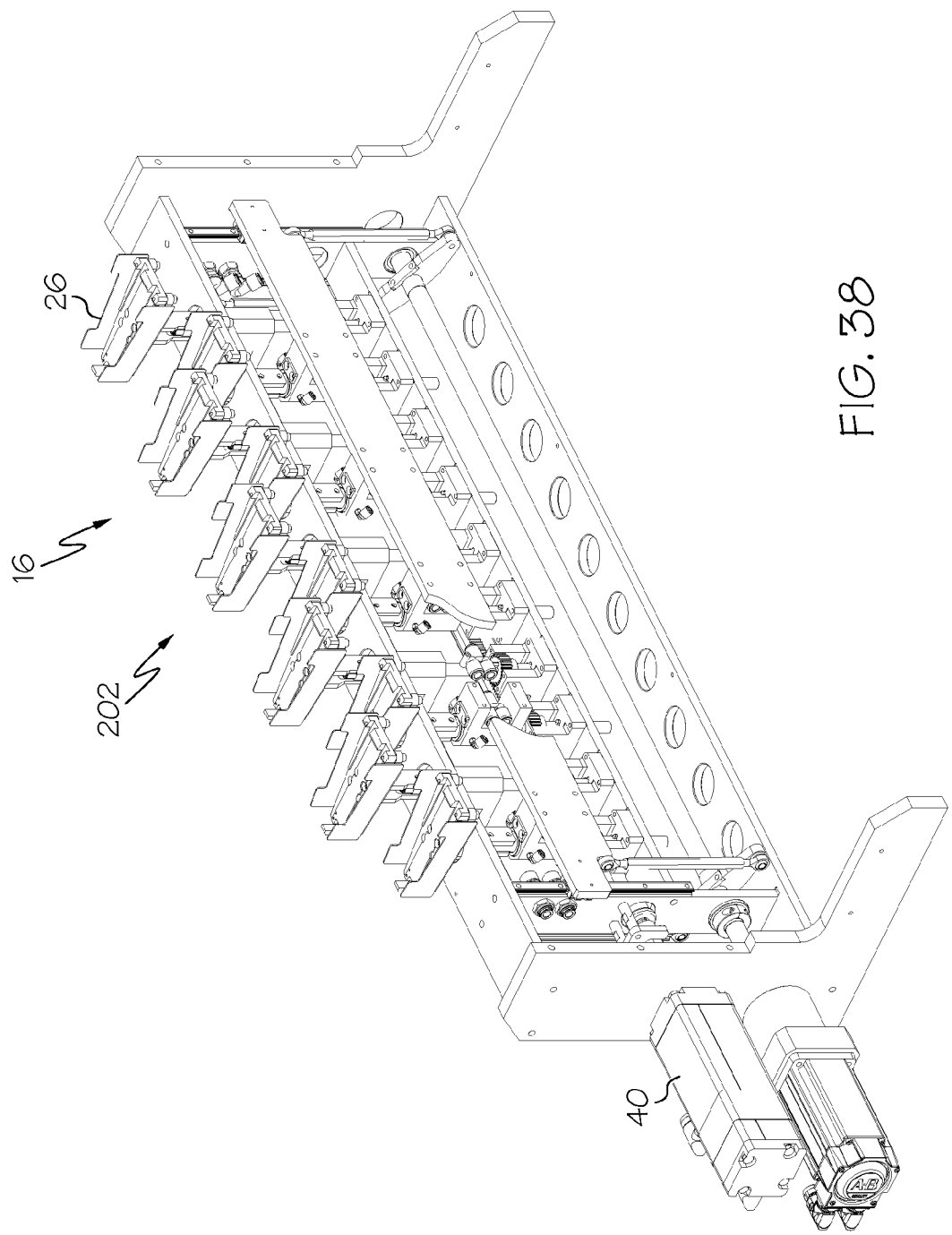
FIG. 38 shows a view of front of the nesting assembly 16.

As shown in FIGS. 38 and 38B, product nests 26 have been rotated such that they are all oriented in the same direction. To rotate the respective product nests (those in the up position), the rack drive 40 moves the rack 44 (FIG. 33A) in the direction of arrow 130. In FIGS. 38 and 38B, the nesting assembly 16 is in the twelfth configuration 202. In some embodiments, the twelfth configuration 202 is the same as the eighth configuration 194 (FIG. 33).

With regard to FIG. 39, the rocker arms 138 are returned to a neutral position and the nesting assembly 16 is once again ready to receive product 18 (FIG. 24). As shown in FIG. 39, the nesting assembly 16 is in a thirteenth configuration 204. In some embodiments, the thirteenth configuration 204 is the same as the seventh configuration 192 (FIG. 31) and first configuration 180 (FIG. 23).

FIGS. 10-21 illustrate the operation of the robot 60. With particular regard to FIG. 10, once the products 18 (FIG. 22)

are oriented in the desired configuration, the robot 60 picks the products 18 from the product nests 26 and places them in the packaging 62. In some embodiments, the robot 60 comprises a tool arm 160 that is movable by the robot 60. Although shown with a robot 60, the skilled artisan will appreciate that an x-y loader or x-y-z loader could also be used, for example, depending upon the set-up.

Figure 11A:
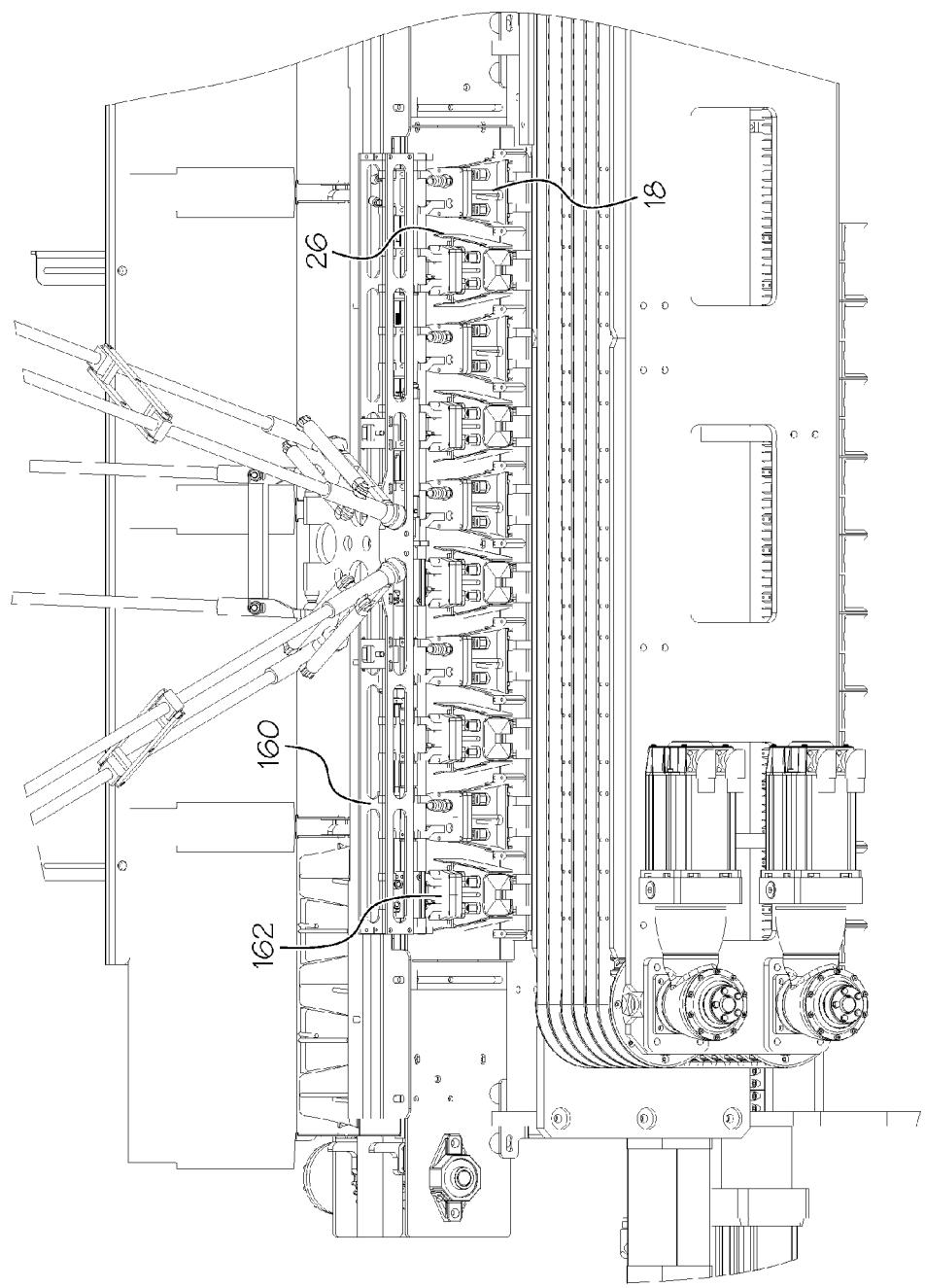

In FIGS. 11A and 11B, the robot 60 lowers the tool arm 160 to pick the products 18 from the product nests 26. The products 18 are oriented in FIGS. 11A and 11B to form the first layer 66 (FIG. 36). In some embodiments, the tool arm 160 comprises a plurality of pick-up heads 162; each pick-up head 162 is configured to pick one of the products 18 from one of the product nests 26. In some embodiments, the pick-up heads 162 comprise one or more vacuum cups 164, which are used to pick up the products 18. In some embodiments, the pick-up heads 162 use a mechanical gripper or other suitable mechanism to grasp the products 18. It is noted that the cross pusher 24 (FIG. 10) is not shown in FIGS. 11A, 11B, 12A, 12B, 13A, and 13B.

Figure 12B:
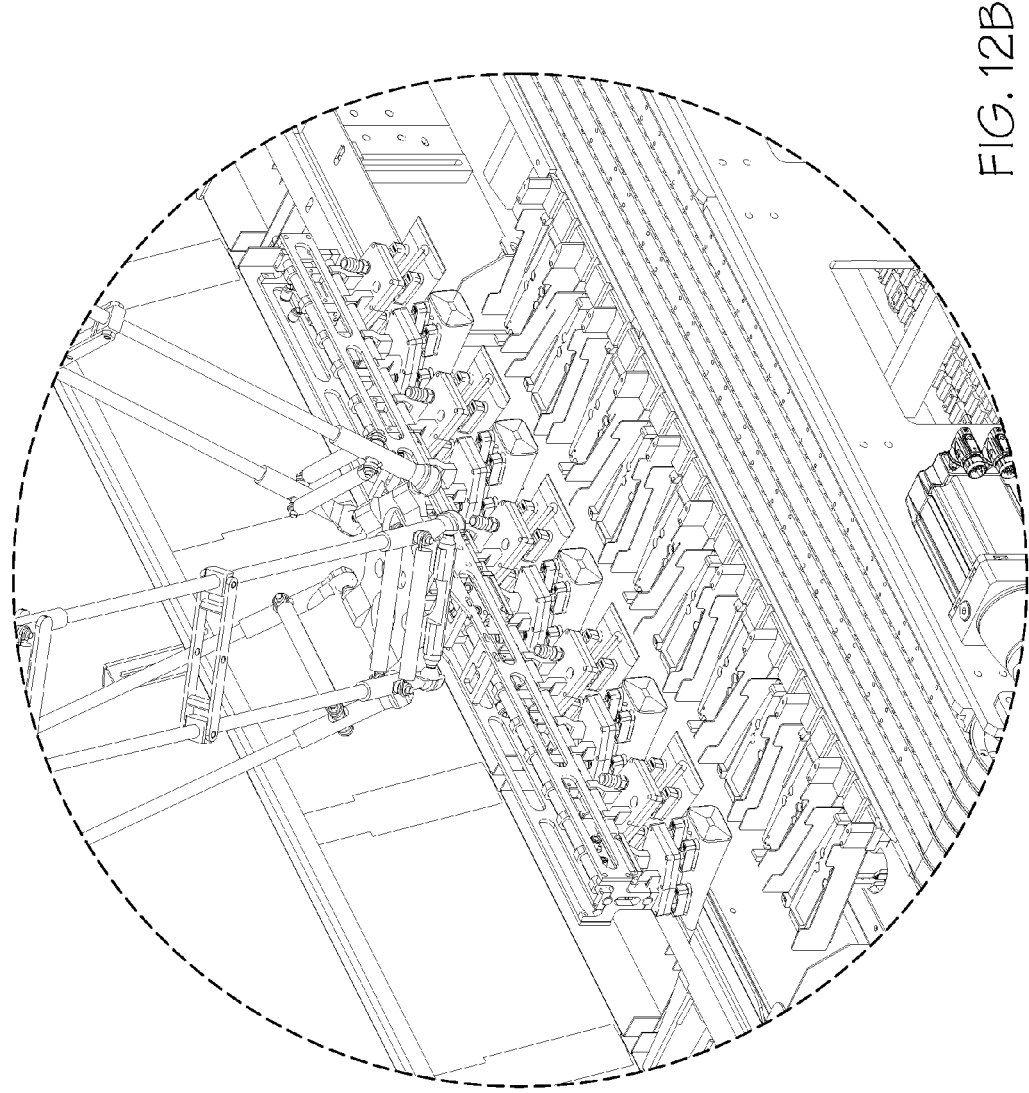

In FIGS. 12A and 12B, the products 18 are being moved from the product nesters 26 toward the packaging 62. When removed from the product nests 26, the products 18 are spaced apart from one another a first distance, $d_1$, as are the product nests 26 and pick-up heads 162.

Turning to FIGS. 13A and 13B, in order to provide the proper spacing of products 18 within the packaging 62, in some embodiments, at least some of the products 18 are moved closer to one another. In particular, in some embodiments, the pick-up heads 162 are spaced apart by a distance of $d_2$. At least some of the pick-up heads 162 can be moved individually along the length of the tool arm 160, in order to accommodate the desired spacing of products 18 within the packaging 62. Additionally, in some embodiments, more than one container of the packaging 62 can be loaded with the products 18 at a time. As illustrated in FIGS. 13A, 13B, 14, and 14A, for example, two containers of packaging 62 can be loaded with products 18 simultaneously. Referring specifically to FIGS. 13A and 13B, the products 18 are arranged along the tool arm 160 into two sets, each of the two sets consisting of five products 18. The first set 166 of five products 18 is to be placed in one container of packaging 62a and the second set 168 of five products 18 is to be placed in an adjacent container of packaging 62b. In some embodiments, for example as shown in FIG. 13A, the first set 166 is separated from the second set 168 by a distance greater than $d_2$. This separation between the first and second sets 166, 168 is determined, at least in part, by the dimensions of the packaging 62. Stated differently, because the first and second sets 166, 168 are placed in adjacent packaging 62a, 62b, the spacing between the sets 166, 168 is dependent upon the location of the packaging 62a, 62b.

While the robot 60 is loading the packaging 62 with products 18, it will be appreciated that the nesting assembly 16 (FIG. 14) reorients the product nests 26, as discussed above.

In FIG. 15, after the products 18 have been placed in the packaging 62 and the robot 60 awaits the batch of products 18.

Figure 16:
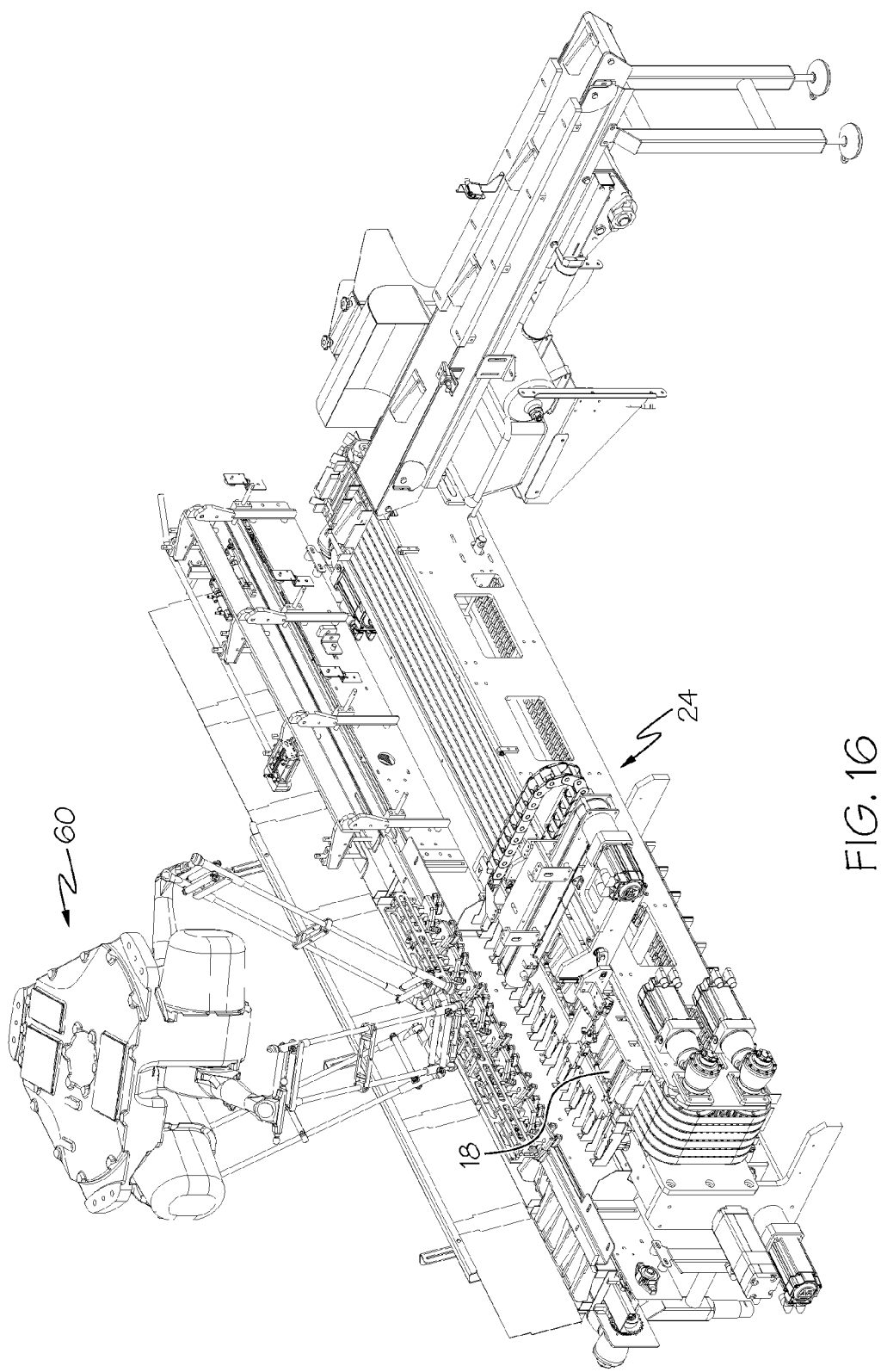
Figure 17:
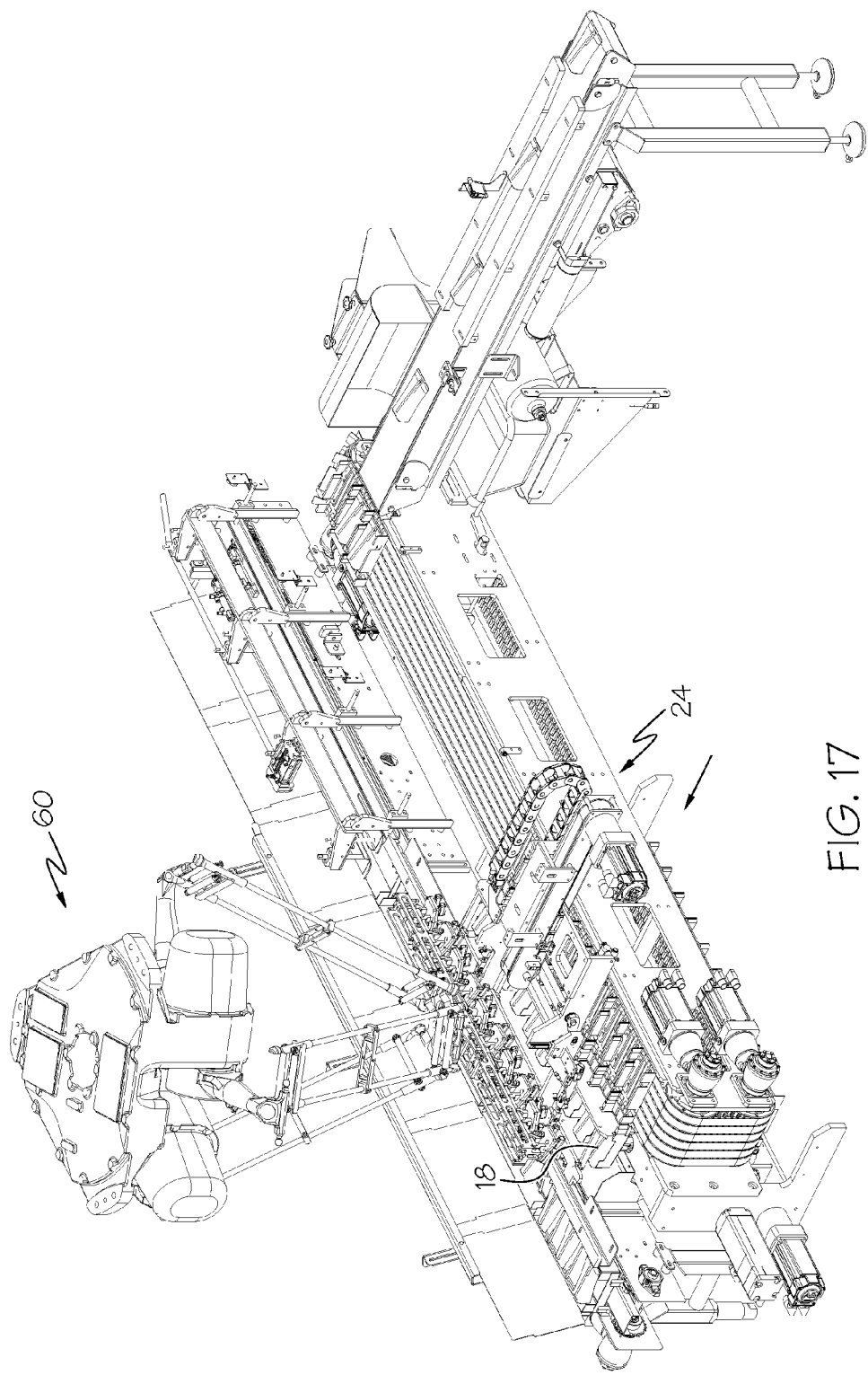

In FIG. 16, the next batch of products 18 arrives at the cross pusher 24. Subsequently, as shown in FIG. 17, the cross pusher 24 moves the products 18 into the product nests 26.

Figure 18:
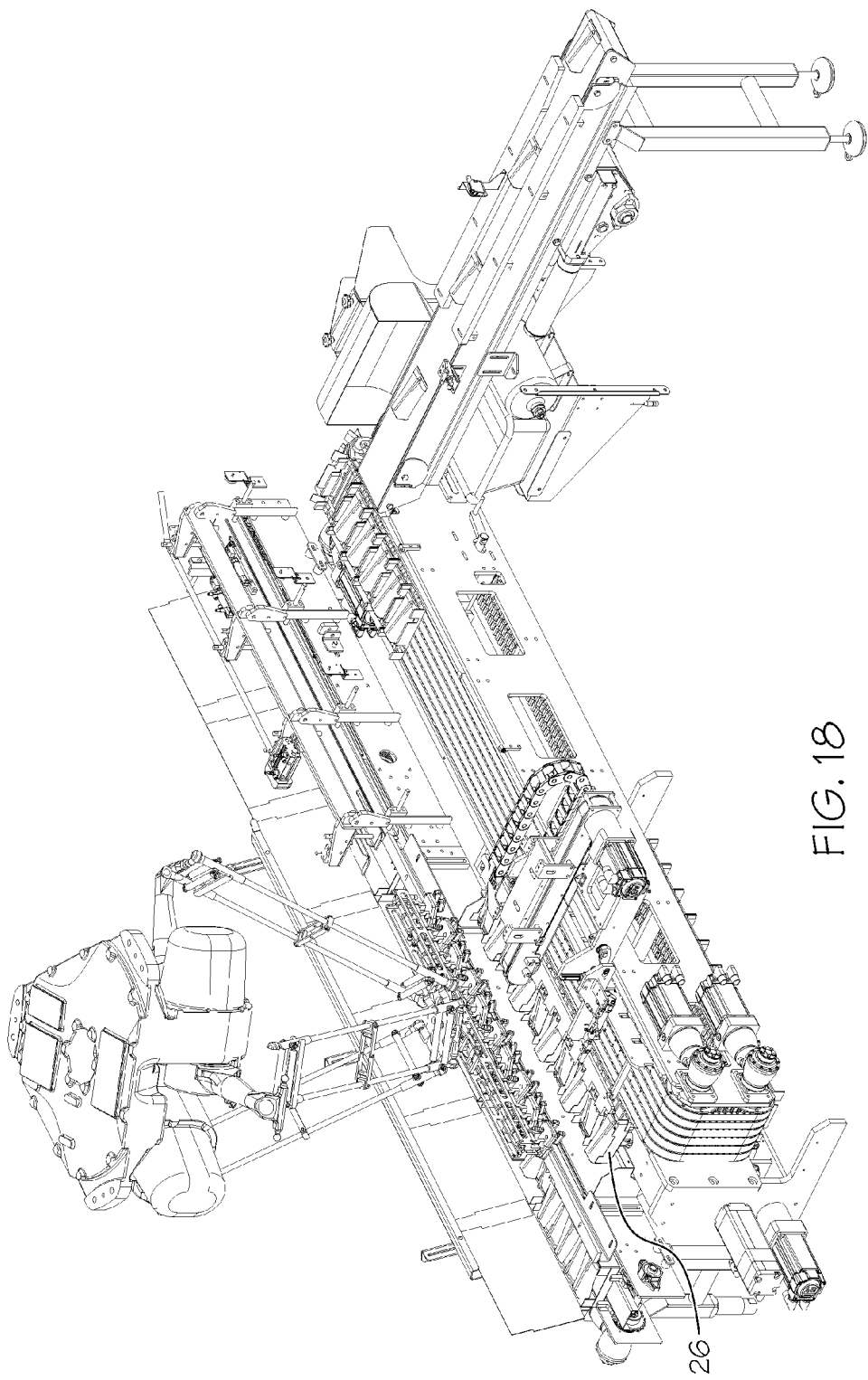

Next, in FIG. 18, some of the product nests 26 are reoriented in accordance with the second layer 68 (FIG. 20A).

Thereafter, as shown in FIG. 19, the robot 60 picks the products 18 out of the product nests 26 and, in FIG. 20, the products 18 are moved together along the tool arm 160 and, subsequently, placed in the packaging 62a, 62b. With regard to FIG. 20A, the second layer 68 of products 18 is shown on top of the first layer 66.

Figure 21:
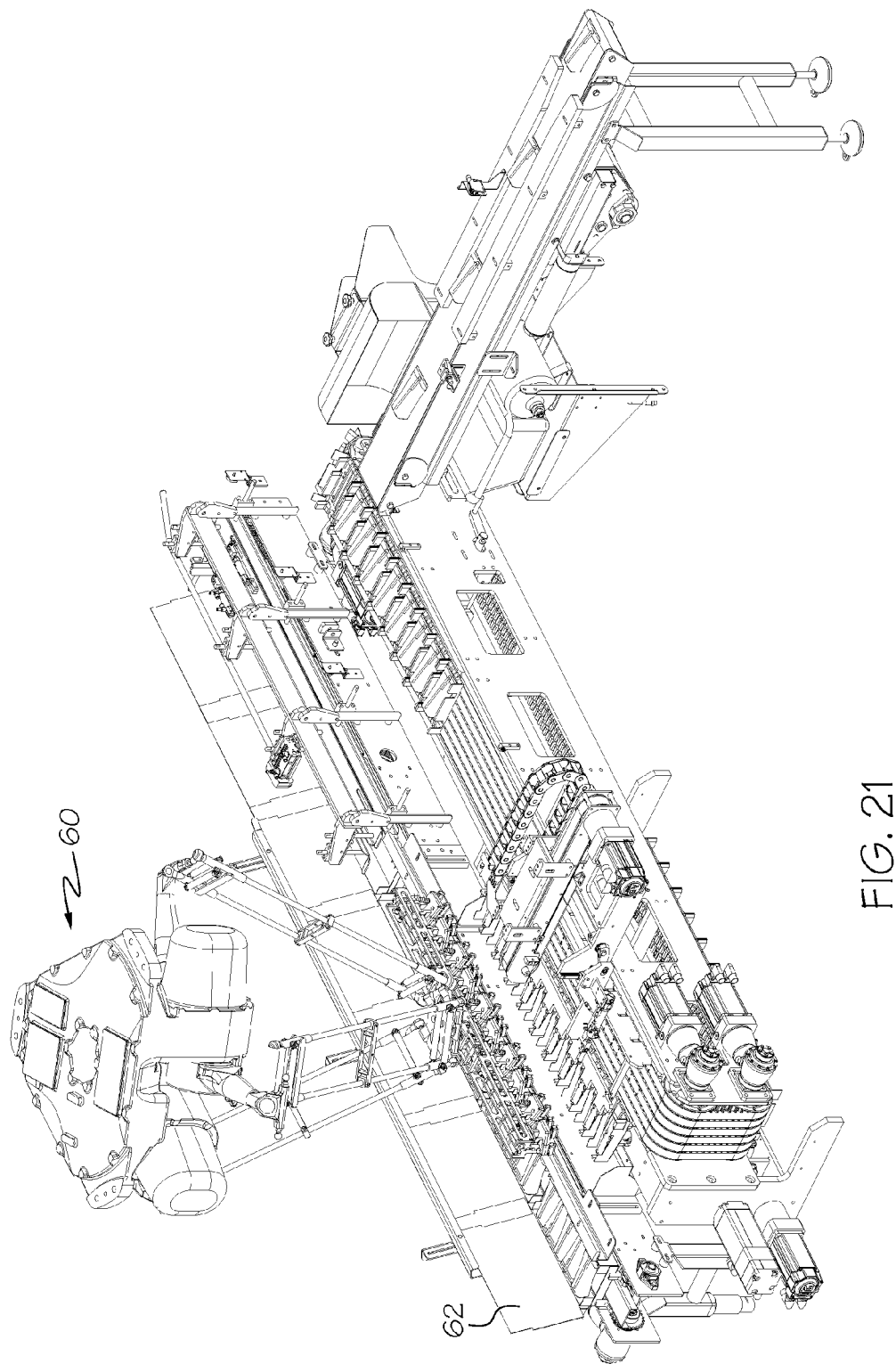
FIG. 21 shows the packaging loader 10 of FIG. 1 in an additional stage.

Finally, as shown in FIG. 21, the robot 60 moves to a home position, the filled packaging 62 is moved down the line, and the entire cycle repeats.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A packaging loader assembly comprising: a frame; a front lift plate and a plurality of mounting blocks attached thereto; a rocker drive attached to the frame and configured to lift the front lift plate; a plurality of product nests; a plurality of spindles attached to at least some of the product nests, at least some of the plurality of spindles extending through the plurality of mounting blocks; pinion gears selectively rotatably coupled to the plurality of spindles; a rack having gear teeth, the gear teeth being engaged to the pinion gears; and a rack drive mounted to the frame, the rack drive attached to the rack.

2. The packaging loader assembly of claim 1 further comprising a back lift plate and a plurality of mounting blocks attached thereto, wherein the rocker drive is configured to raise the back lift plate.

3. The packaging loader assembly of claim 1, wherein the spindles comprise drive keys and the pinion gears define pinion gear keyways, the pinion gears being rotatably coupled to the spindles when the drive keys engage the pinion gear keyways.

4. A packaging loader assembly comprising:
a frame;
a plurality of guide blocks attached to the frame wherein the guide blocks define guide block keyways;

a plurality of product nests;
a plurality of spindles attached to at least some of the product nests, the spindles comprise drive keys, the drive keys at least partially insertable into the guide block keyways;
pinion gears selectively rotatably coupled to the spindles;
a rack having gear teeth, the gear teeth being engaged to the pinion gears; and
a rack drive mounted to the frame, the rack drive attached to the rack.

\* \* \* \* \*